United States Patent
Lefiles et al.

(10) Patent No.: US 11,457,624 B2
(45) Date of Patent: *Oct. 4, 2022

(54) ADJUVANT COMPOSITIONS FOR PLANT TREATMENT CHEMICALS

(71) Applicant: CORBET SCIENTIFIC, LLC, Briarcliff, NY (US)

(72) Inventors: James Holt Lefiles, Valdosta, GA (US); Bill Davis, Rye, NY (US)

(73) Assignee: CORBET SCIENTIFIC, LLC, Briarcliff, NY (US)

( * ) Notice: Subject to any disclaimer, the term of this patent is extended or adjusted under 35 U.S.C. 154(b) by 209 days.

This patent is subject to a terminal disclaimer.

(21) Appl. No.: 16/346,931

(22) PCT Filed: Oct. 26, 2017

(86) PCT No.: PCT/US2017/058476
§ 371 (c)(1),
(2) Date: May 2, 2019

(87) PCT Pub. No.: WO2018/085106
PCT Pub. Date: May 11, 2018

(65) Prior Publication Data
US 2020/0253197 A1 Aug. 13, 2020

Related U.S. Application Data

(60) Provisional application No. 62/606,130, filed on Nov. 2, 2016, provisional application No. 62/440,794, filed on Dec. 30, 2016, provisional application No. 62/445,124, filed on Jan. 11, 2017.

(51) Int. Cl.
| | | |
|---|---|---|
| *A01N 25/16* | (2006.01) | |
| *A01N 43/84* | (2006.01) | |
| *A01N 47/04* | (2006.01) | |
| *A01N 47/14* | (2006.01) | |
| *A01N 59/20* | (2006.01) | |

(52) U.S. Cl.
CPC .......... *A01N 25/16* (2013.01); *A01N 43/84* (2013.01); *A01N 47/04* (2013.01); *A01N 47/14* (2013.01); *A01N 59/20* (2013.01)

(58) Field of Classification Search
None
See application file for complete search history.

(56) References Cited

U.S. PATENT DOCUMENTS

| | | |
|---|---|---|
| 3,698,133 A | 10/1972 | Schreiber |
| 3,947,996 A | 4/1976 | Watts |
| 4,249,343 A | 2/1981 | Dannelly |
| 4,301,620 A | 11/1981 | Koslow et al. |
| 4,783,342 A | 11/1988 | Polovina |
| 5,093,198 A | 3/1992 | Speaker et al. |
| 5,405,425 A | 4/1995 | Pieh et al. |
| 5,627,132 A | 5/1997 | Lebeau |
| 5,649,495 A | 7/1997 | Salestrom |
| 5,868,087 A | 2/1999 | Salestrom |
| 5,888,597 A | 3/1999 | Frey et al. |
| 6,077,605 A | 6/2000 | McGowan et al. |
| 6,130,304 A | 10/2000 | Sumiya et al. |
| 6,162,475 A | 12/2000 | Hagenmaier et al. |
| 6,851,219 B2 | 2/2005 | Kosta et al. |
| 6,905,711 B1 | 6/2005 | Tullo et al. |
| 6,948,276 B2 | 9/2005 | Petrea et al. |
| 7,160,580 B2 | 1/2007 | Hettiarachchy et al. |
| 7,222,455 B2 | 5/2007 | Schrader |
| 7,306,406 B2 | 12/2007 | Putnam et al. |
| 7,399,730 B2 | 7/2008 | Kostka et al. |
| 7,503,143 B2 | 3/2009 | Krysiak et al. |
| 7,541,386 B2 | 6/2009 | Kostka et al. |
| 7,749,332 B2 | 7/2010 | Jonke et al. |
| 7,758,888 B2 | 7/2010 | Lapidot et al. |
| 7,874,101 B2 | 1/2011 | Krysiak et al. |
| 7,951,853 B2 | 5/2011 | Ismail et al. |
| 7,972,084 B2 | 7/2011 | Bassett |
| 7,988,992 B2 | 8/2011 | Omidian et al. |
| 8,752,328 B2 | 6/2014 | Kaiser et al. |
| 8,765,160 B2 | 7/2014 | Guyon et al. |
| 8,784,681 B2 | 7/2014 | Chen et al. |
| 8,895,686 B2 | 11/2014 | Chen et al. |

(Continued)

FOREIGN PATENT DOCUMENTS

| | | |
|---|---|---|
| CN | 102127456 A | 7/2011 |
| CN | 102696665 A | 10/2012 |

(Continued)

OTHER PUBLICATIONS

First Office Action in China Patent Application No. 201780068164. X, dated Feb. 20, 2021 (English Translation).
First Examination Report in Israel Application No. 266367, dated Mar. 16, 2021 (English Translation).
First Office Action in El Salvador Application No. 2019005881, dated Apr. 27, 2020 (English Translation).
Second Office Action and Search Report in Chile Patent Application No. 201901210, dated Apr. 19, 2021 (English Translation).

(Continued)

*Primary Examiner* — Alton N Pryor

(74) *Attorney, Agent, or Firm* — Troutman Pepper Hamilton Sanders LLP (Rochester)

(57) ABSTRACT

The present invention is directed to an adjuvant premix composition for use with plant treatment chemicals. The adjuvant premix composition includes a thickener, a water soluble divalent salt, a foam control agent, a complexing agent, and a film forming agent. The present invention also relates to adjuvant compositions for use with plant treatment chemicals, plant treatment chemical formulations, methods of treating plants or plant seeds using the compositions of the present invention, and methods of treating a plant seed or growing plant using a plant treatment chemical and a coating material.

51 Claims, 32 Drawing Sheets

(56) References Cited

U.S. PATENT DOCUMENTS

| | | |
|---|---|---|
| 9,096,793 B2 | 8/2015 | Cristobal et al. |
| 9,115,307 B2 | 8/2015 | Birthisel et al. |
| 9,238,774 B2 | 1/2016 | Carlson et al. |
| 9,309,462 B1 | 4/2016 | Curtis et al. |
| 9,426,948 B2 | 8/2016 | Pullen et al. |
| 9,476,175 B2 | 10/2016 | Chen et al. |
| 9,487,502 B2 | 11/2016 | Phadte et al. |
| 9,686,979 B2 | 6/2017 | Norton et al. |
| 2002/0042346 A1 | 4/2002 | Hamersky et al. |
| 2004/0053788 A1 | 3/2004 | Hayashi et al. |
| 2004/0166183 A1 | 8/2004 | Ruseler-van Embden et al. |
| 2004/0192555 A1 | 9/2004 | Hawk et al. |
| 2005/0113255 A1 | 5/2005 | Schrader et al. |
| 2006/0110413 A1 | 5/2006 | Lintner |
| 2007/0037711 A1 | 2/2007 | Pluta et al. |
| 2007/0166440 A1 | 7/2007 | Davie et al. |
| 2007/0190097 A1 | 8/2007 | Schrader |
| 2007/0295670 A1 | 12/2007 | Bassett |
| 2008/0107696 A1 | 5/2008 | Czech et al. |
| 2008/0172937 A1 | 7/2008 | Palmer et al. |
| 2010/0024072 A1 | 1/2010 | Justmann et al. |
| 2010/0054072 A1 | 3/2010 | Stansfield |
| 2011/0105333 A1 | 5/2011 | Israels et al. |
| 2011/0166022 A1 | 7/2011 | Israels et al. |
| 2012/0042420 A1 | 2/2012 | Kaiser et al. |
| 2012/0157634 A1 | 6/2012 | Lopez Villanueva |
| 2012/0225783 A1 | 9/2012 | Harris |
| 2014/0080708 A1 | 3/2014 | Buyse et al. |
| 2014/0148339 A1 | 5/2014 | Smejkal et al. |
| 2014/0202557 A1 | 7/2014 | Bullin |
| 2015/0031539 A1 | 1/2015 | Schnabel et al. |
| 2015/0051076 A1 | 2/2015 | Schnabel et al. |
| 2015/0051077 A1 | 2/2015 | Schnabel et al. |
| 2015/0051078 A1 | 2/2015 | Schnabel et al. |
| 2015/0056259 A1 | 2/2015 | Sharma et al. |
| 2015/0113873 A1 | 4/2015 | Balastre et al. |
| 2015/0359221 A1 | 12/2015 | Li et al. |
| 2015/0366186 A1 | 12/2015 | Li et al. |
| 2016/0244562 A1 | 8/2016 | Lindner |
| 2016/0262375 A1 | 9/2016 | Raman et al. |
| 2016/0316759 A1 | 11/2016 | Bougoure et al. |
| 2017/0006859 A1 | 1/2017 | Raman et al. |
| 2019/0364887 A1 | 12/2019 | Lefiles et al. |

FOREIGN PATENT DOCUMENTS

| | | |
|---|---|---|
| CN | 103857661 A | 6/2014 |
| CN | 104261988 B | 1/2015 |
| CN | 104478624 B | 4/2015 |
| CN | 105638715 A | 6/2016 |
| CN | 105694898 A | 6/2016 |
| CN | 106035349 A | 10/2016 |
| CN | 104478624 B | 7/2017 |
| EP | 2601834 A2 | 6/2013 |
| EP | 1771531 B1 | 5/2014 |
| HU | 197168 B | 3/1989 |
| JP | S56-133202 A | 10/1981 |
| JP | 3754755 B2 | 3/2006 |
| PL | 154145 B1 | 1/1990 |
| WO | 97/33890 A1 | 9/1997 |
| WO | 00/07938 A1 | 2/2000 |
| WO | 2000/027904 A1 | 5/2000 |
| WO | 2006/124606 A2 | 11/2006 |
| WO | 2007/059107 A2 | 5/2007 |
| WO | 2010/043447 A2 | 4/2010 |
| WO | 2010/080891 A1 | 7/2010 |
| WO | 2010/100039 A2 | 9/2010 |
| WO | 2010/144243 A1 | 12/2010 |
| WO | 2012/022046 A1 | 2/2012 |
| WO | 2014/033159 A2 | 3/2014 |
| WO | 2014/056780 A1 | 4/2014 |
| WO | 2014/086747 A2 | 6/2014 |
| WO | 2015/015087 A1 | 2/2015 |
| WO | 2015065805 A1 | 5/2015 |
| WO | 2015/127051 A1 | 8/2015 |
| WO | 2015/129729 A1 | 9/2015 |
| WO | 2016/193073 A1 | 12/2016 |
| WO | 2018/156457 A1 | 8/2018 |
| WO | 2019/210403 A1 | 11/2019 |

OTHER PUBLICATIONS

Velickova et al., "Impact of Chitosan-Beeswax Edible Coatings on the Quality of Fresh Strawberries (*Fragaria ananassa* cv *Camarosa*) Under Commercial Storage Conditions," Food Science and Technology 52(2):80-92 (2013).

PCT International Search Report and Written Opinion for PCT/US2018/018628, dated Apr. 23, 2018.

First Examination Report in Indian Application No. 201917020765, dated Dec. 9, 2020.

First Office Action in Colombia Application No. NC2019/0004543, dated Nov. 25, 2020 (English Translation).

PCT International Search Report and Written Opinion for corresponding PCT/US2017/058476, dated Jan. 18, 2018.

Official Communication in Ukraine Patent Application No. a 2019 06012, dated Sep. 11, 2020.

Official Communication in Eurasia Patent Application No. 201991104, dated Aug. 28, 2020.

Supplementary European Search Report and Search Opinion in Europe Patent Application No. 17866707.7, dated Aug. 13, 2020.

First Office Action and Search Report in Chile Patent Application No. 201901210, dated Jul. 20, 2020.

First Office Action in Panama Application No. 92652, dated Jun. 4, 2021 (English Translation).

First First Notice of Reasons for Rejection in Japan Application No. 2019-544784, dated Aug. 2, 2021 (English Translation).

First Examination Report in Australia Application No. 2017355326, dated Jul. 20, 2021.

Restriction Requirement in U.S. Appl. No. 16/480,250, dated Oct. 21, 2021.

First Office Action in Costa Rica Application No. 2019-0216, dated Oct. 4, 2021 (English Translation).

Hearing Notice in Indian Application No. 201917020765, dated Aug. 8, 2021.

Second Office Action in Colombia Application No. NC2019/0004543, dated Sep. 3, 2021 (English Translation).

Second Office Action in China Patent Application No. 201780068164.X, dated Oct. 11, 2021 (English Translation).

Shay, G., "Alkali-Swellable and Alkali-Soluble Thickener Technology A Review," Polymers in Aqueous Media, Chapter 25, pp. 457-494 (1989).

Maitra & Shukla, "Cross-Linking in Hydrogels—A Review," American Journal of Polymer Science 4(2): 25-31 (2014).

Richey, W.D., "Chelating Agents—A Review," Studies in Conservation 20(sup1): 229-234 (1975).

Sojka et al. (2002) Irrigation: An historical perspective. In: Lal, R., (ed.) Encyclopedia of Soil Science (1st Edition), pp. 745-749. Marcel Dekker, Inc., New York.

"Agriculture at a Crossroads: Finding and Recommendations for Future Farming" accessed at: https://www.globalagriculture.org/report-topics/water.html (accessed on Nov. 22, 2021).

Schlosser et al., "The Future of Global Water Stress: An Integrated Assessment" MIT Joint Program on the Science and Policy of Global Change, Report No. 254, pp. 1-31 (2014).

Taylor & Zilberman, "The Diffusion of Process Innovation: The Case of Drip Irrigation in California," Selected Paper prepared for presentation at the 2015 Agricultural & Applied Economics Association and Western Agricultural Economics Association Annual Meeting, San Francisco, CA, Jul. 26-28, 2015.

Müller & Deurer, "Review of the Remediation Strategies for Soil Water Repellency," Agriculture, Ecosystems & Environment 144: 208-221 (2011).

Saha et al., "Superabsorbent Hydrogel (SAH) as a Soil Amendment for Drought Management: A Review," Soil & Tillage Research 204:104736 (2020).

Coates et al., "Water Demand: What Drives Consumption?" In Managing Water under Uncertainty and Risk, The United Nations World Water Development Report 4 (vol. 1), Chapter 2. UNESCO (2012).

(56) References Cited

OTHER PUBLICATIONS

"OECD Environmental Outlook to 2050: The Consequences of Inaction," Organisation for Economic Co-Operation and Development (2012).
Turral et al., "Climate Change, Water and Food Security," FAO Water Report 36. Food and Agriculture Organization of the United Nations (2011).
USGS, "Irrigation Water Use" (Accessed at: https://www.usgs.gov/mission-areas/water-resources/science/irrigation-water-use?qt-science_center_objects=0#qt-science_center_objects on Nov. 22, 2021).
Office Action in Argentine Application No. P 17 01 03015 (dated Nov. 5, 2021).
Preliminary Office Action in Brazil National Application No. 1120190089535 (dated Oct. 29, 2021).
Official Communication in Eurasia Patent Application No. 201991104 (dated Dec. 8, 2021).
Office Action in Vietnam Application No. 1-2019-02727 (dated Mar. 30, 2022).
O'Neil, M.J. (ed.). The Merck Index—An Encyclopedia of Chemicals, Drugs, and Biologicals. Cambridge, UK: Royal Society of Chemistry, 2013., p. 290.
Third Office Action in China Patent Application No. 201780068164.X (dated Feb. 18, 2022).
Office Action in U.S. Appl. No. 16/480,250, dated Mar. 11, 2022.
Official Communication in Eurasia Patent Application No. 201991104 (dated Jun. 24, 2022).
Notice of Reasons for Rejection in Japan Application No. 2019-544784 (dated Jun. 20, 2022).
Third Office Action and Search Report in Chile Patent Application No. 201901210, dated Aug. 8, 2022 (English Translation).
Rejection Decision for CN 201780068164.X, dated Aug. 18, 2022 (with machine translation).

| Trt | Code | Description |
|---|---|---|
| 1 | CHK | Untreated check |
| 2 | | Spraytex M 100% S.L 5 L/ha; IMBREX CR 80 SL 0.05 L/ha |
| 3 | | Volley 88 OL 0.7 L/ha; Banazeb 60 SC 2L/ha; Adjuvant 0.1L/ha; IMBREX CR 80 SL |
| 4 | | Volley 88 OL 0.7 L/ha; Banazeb 60 SC 2L/ha; IMBREX CR 80 SL 0.05L/ha; Spraytex |
| 5 | | Volley 88 OL 0.7 L/ha; Banazeb 60 SC 2L/ha; Adjuvant 0.1L/ha; IMBREX CR 80 SL |
| 6 | | Banazeb 60 SC 1.5L/ha; Adjuvant 0.1L/ha |
| 7 | | Banazeb 60 SC 2L/ha |
| 8 | | Volley 88 OL 0.5 L/ha; Adjuvant 0.1L/ha; IMBREX CR 80 SL 0.05 L/ha; Spraytex M |
| 9 | | Volley 88 OL 0.7 L/ha; IMBREX CR 80 SL 0.05 L/ha; Spraytex M 100% S.L 5 L/ha |

*FIG. 6A (cont.)*

| Trt | Code | Description |
|---|---|---|
| 1 | CHK | Untreated check |
| 2 | | Spraytex M 100% S.L 5 L/ha; IMBIREX CR 80 SL 0.05 L/ha |
| 3 | | Volley 88 OL 0.7 L/ha; Banazeb 60 SC 2L/ha; Adjuvant 0.1L/ha; IMBREX CR 80 SL |
| 4 | | Volley 88 OL 0.7 L/ha; Banazeb 60 SC 2L/ha; IMBREX CR 80 SL 0.05L/ha; Spraytex |
| 5 | | Volley 88 OL 0.7 L/ha; Banazeb 60 SC 2L/ha; Adjuvant 0.1L/ha; IMBREX CR 80 SL |
| 6 | | Banazeb 60 SC 1.5L/ha; Adjuvant 0.1L/ha |
| 7 | | Banazeb 60 SC 2L/ha |
| 8 | | Volley 88 OL 0.5 L/ha; Adjuvant 0.1L/ha; IMBREX CR 80 SL 0.05 L/ha; Spraytex M |
| 9 | | Volley 88 OL 0.7 L/ha; IMBREX CR 80 SL 0.05 L/ha; Spraytex M 100% S.L 5 L/ha |

Note: DA1A = days after first application

FIG. 6B (cont.)

ADJUVANT COMPOSITIONS FOR PLANT TREATMENT CHEMICALS

This application is a national stage application under 35 U.S.C. § 371 of PCT International Application Serial No. PCT/US2017/058476, filed Oct. 26, 2017, which claims the priority benefit of U.S. Provisional Patent Application Ser. No. 62/606,130, filed Nov. 2, 2016, 62/440,794, filed Dec. 30, 2016, and 62/445,124, filed Jan. 11, 2017, which are hereby incorporated by reference in their entirety.

FIELD OF THE INVENTION

The present application relates to an adjuvant composition for plant treatment chemicals.

BACKGROUND OF THE INVENTION

Agricultural agents, such as insecticides, fungicides, herbicides, miticides, and plant growth regulators, are often applied to a plant in the form of a liquid composition. To aid in the distribution or dispersal of the agricultural agent, such liquid compositions typically include one or more adjuvant compounds intended to improve one or more properties of the liquid composition.

Adjuvants can augment the physical properties of the liquid composition leading to a final product having increased storage stability, ease of handling, or improved efficacy. Adjuvants, when used with the active agricultural ingredient formulation, are designed to increase efficacy of the agricultural product or to improve the application characteristics of the pesticide. Thus, adjuvants have been designed to improve the "wetting" of drops during spraying, to alter the volatility of the spray mixture, to improve the rain-fastness of the herbicide on the plant, to improve the penetration or distribution of the active ingredient, to regulate the pH of the spray mix, to improve compatibility of the various components in a mix tank, and to reduce drift during spraying. Since the adjuvant acts in some manner to improve the effectiveness of the active ingredient, the amount of active ingredient needed to be effective can be reduced in many cases, without a loss in efficacy.

However, depending on the type of agricultural ingredient used, different adjuvants will have different effects on the ability of the agricultural ingredient to efficiently treat the plant. What is needed is an adjuvant that allows for improved agricultural ingredient dispersal on a plant surface, and provides an improved covering to the plant that promotes the distribution of the agricultural ingredient. Furthermore, what is needed in the art is a composition that contains an adjuvant and an active ingredient that, when applied to the surface of a plant, improves the efficacy of the active ingredient.

The present invention is directed to overcoming the above-noted deficiencies in the art.

SUMMARY OF THE INVENTION

One aspect of the present invention is directed to an adjuvant premix composition for use with plant treatment chemicals. The adjuvant premix composition includes a thickener, a water soluble divalent salt, a foam control agent, a complexing agent, and a film forming agent.

A further aspect of the present invention relates to an adjuvant composition for use with plant treatment chemicals. This composition includes the adjuvant premix composition of the present invention and water.

The present invention also relates to a plant treatment chemical formulation. This formulation includes the adjuvant composition of the present invention and one or more plant treatment chemicals.

Another aspect of the present invention pertains to a method of treating plants or plant seeds. This method involves providing a plant seed or a growing plant and applying the plant treatment chemical formulation of the present invention to the plant seed or a growing plant.

Yet another aspect of the present invention relates to a method of treating a plant seed or growing plant. This method involves providing a plant seed or growing plant. The method further involves applying a mixture of a plant treatment chemical and a coating material to surfaces of the plant seed or plant, where, after the applied coating material dries on the surfaces of the plant seed or growing plant, the dried coating material is characterized by adhering to the surfaces of the plant seed or growing plant and permitting permeation of aqueous material to the plant seed or growing plant while minimizing loss of moisture or loss of plant treatment chemical from the plant seed or growing plant.

The adjuvant composition of the present invention achieves many benefits. Treatment of plants with pesticide formulations comprising adjuvant resulted in enhanced disease protection compared to treatment with pesticides alone. Treatment of plants with reduced-strength herbicide formulations comprising adjuvant resulted in enhanced herbicidal effects compared to the use of full strength herbicide formulations alone. The use of adjuvant in various pesticide formulations also increased marketable fruit yield and reduced the amount of pesticide and/or pesticide applications required to achieve a particular effect.

The adjuvant composition of the present invention is a polymer-based plant protectant that provides improved agricultural product efficiency by: (i) increasing spray efficiency; (ii) improving chemical and nutritional effectiveness; (iii) reducing spray program cost; (iv) retaining moisture more efficiently; (v) enabling products to remain on longer periods of time by reducing runoff and waste; (vi) providing freeze protection by lowering the threshold at which freeze damage occurs; and (vii) providing long lasting adhesion.

The adjuvant composition of the present invention improves the efficiency of chemical usage by: (i) increasing the duration between applications, thereby reducing the number of applications needed; (ii) maximizing the effectiveness of pesticides and plant growth regulators, allowing the use of lower labeled rates and longer spray intervals; and (iii) increasing the uptake of foliar fertilizer resulting in improved plant health and vigor by reducing "run off."

The adjuvant composition of the present invention also provides anti-transpiration and wetting agent properties to attract and retain moisture, thereby reducing the demand on water supplies and increasing the retention rate of the water applied. Application of the adjuvant composition of the present invention to a plant leaf provides a "wax-like" coating that shields the plant from the environment, which by its very chemical nature loves water. The "pH balancing" properties of the adjuvant composition of the present invention thicken this coating, allowing more room to draw moisture into itself. In other words, the adjuvant composition traps moisture every time it comes into contact with humidity, dew, rain, or irrigation.

BRIEF DESCRIPTION OF THE DRAWINGS

FIGS. 1A-1B are images of pepper plants treated with a chemical formulation comprising silicon and adjuvant (FIG. 1A) or silicon alone (FIG. 1B) on Day 66.

FIGS. 2A-2H are Day 83 images of woody shrubs (FIG. 2A) and mixed grasses (FIG. 2B) treated with adjuvant enhanced triclopyr and imazapyr formulations comprising a 30% reduction in herbicide volumes, woody shrubs (FIG. 2C) and mixed grasses (FIG. 2D) treated with enhanced triclopyr and imazapyr formulation comprising a 15% reduction in herbicide volumes, woody shrubs (FIG. 2E) and mixed grasses (FIG. 2F) treated with enhanced triclopyr and imazapyr formulation comprising customary herbicide volumes, and woody shrubs (FIG. 2G) and mixed grasses (FIG. 2H) treated with triclopyr and imazapyr formulation comprising customary herbicide volumes.

Figure 5A:
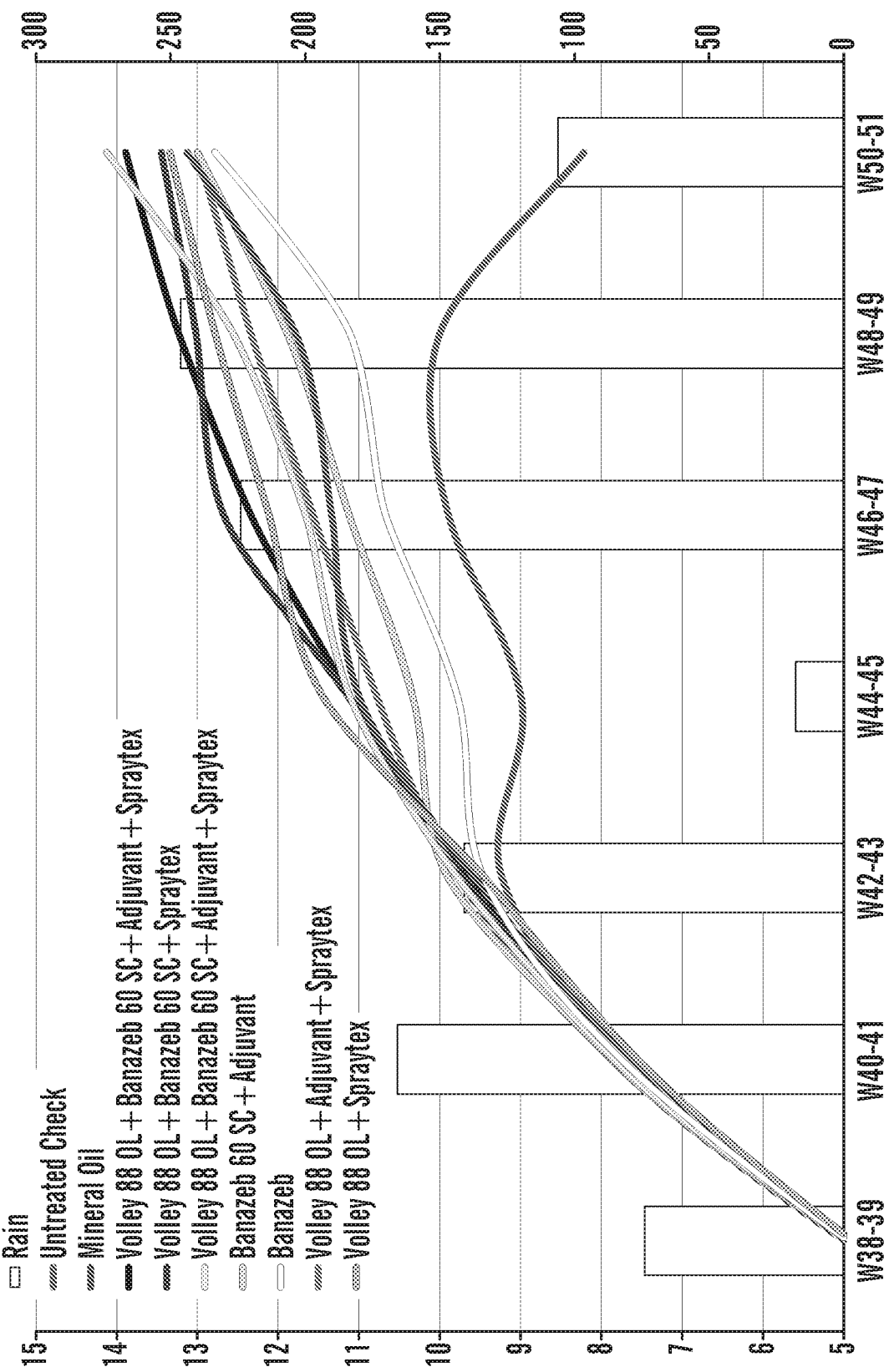
Figure 5B:
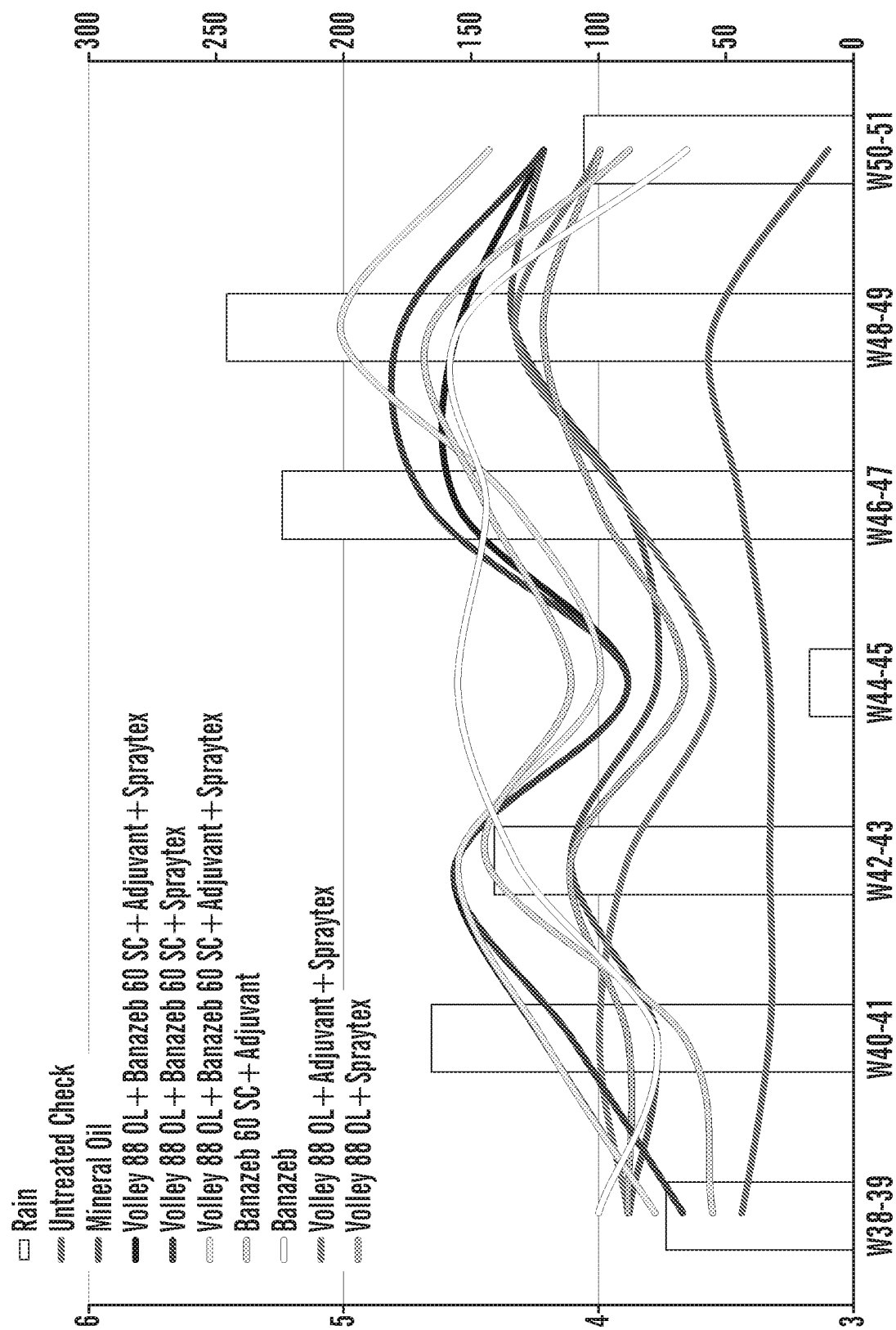
Figure 5C:
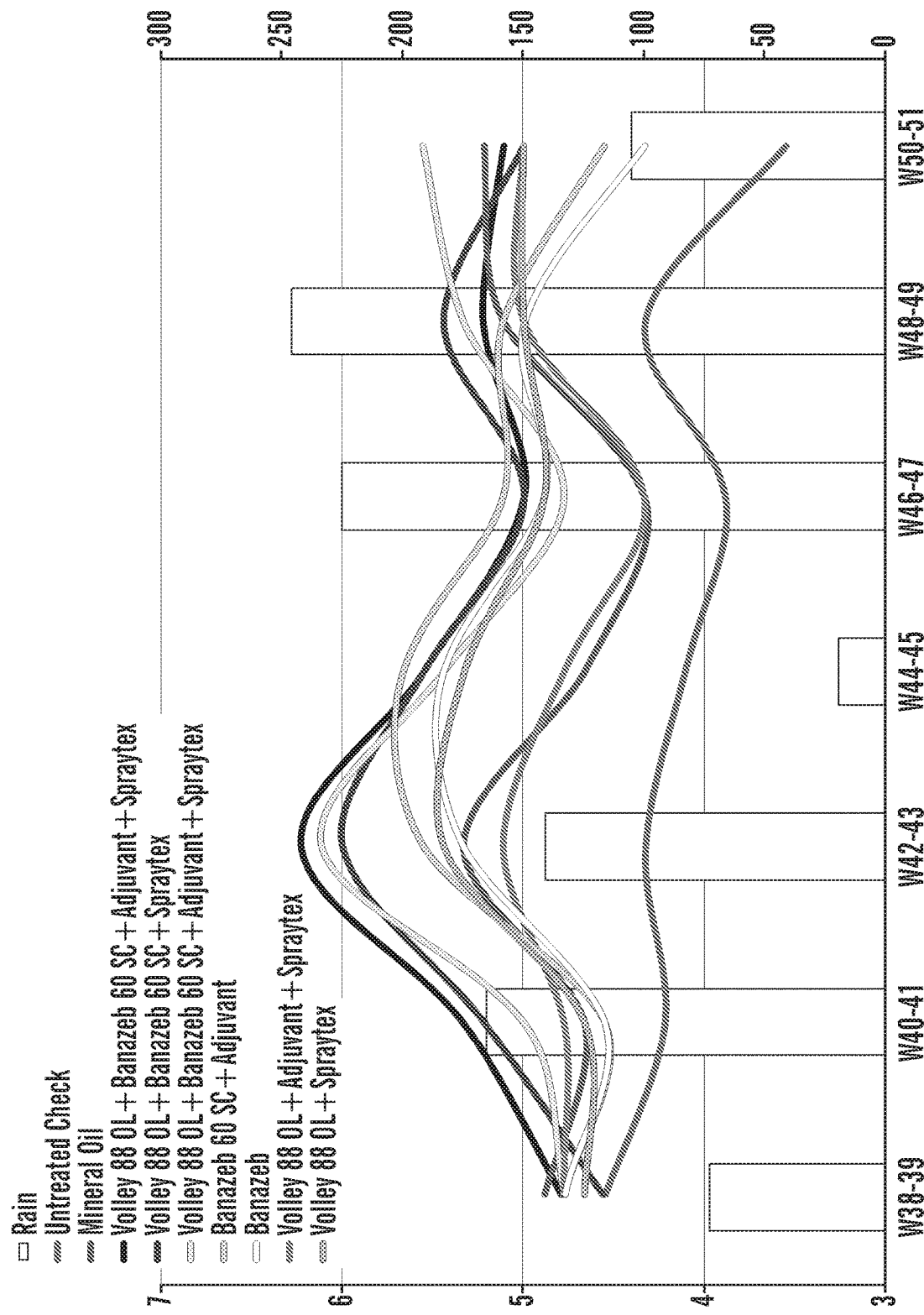

FIGS. 5A-C show the total number of banana leaves (FIG. 5A), youngest leaves with infection (FIG. 5B), and youngest leaves with spot (FIG. 5C) in each treatment group.

Figure 6A:
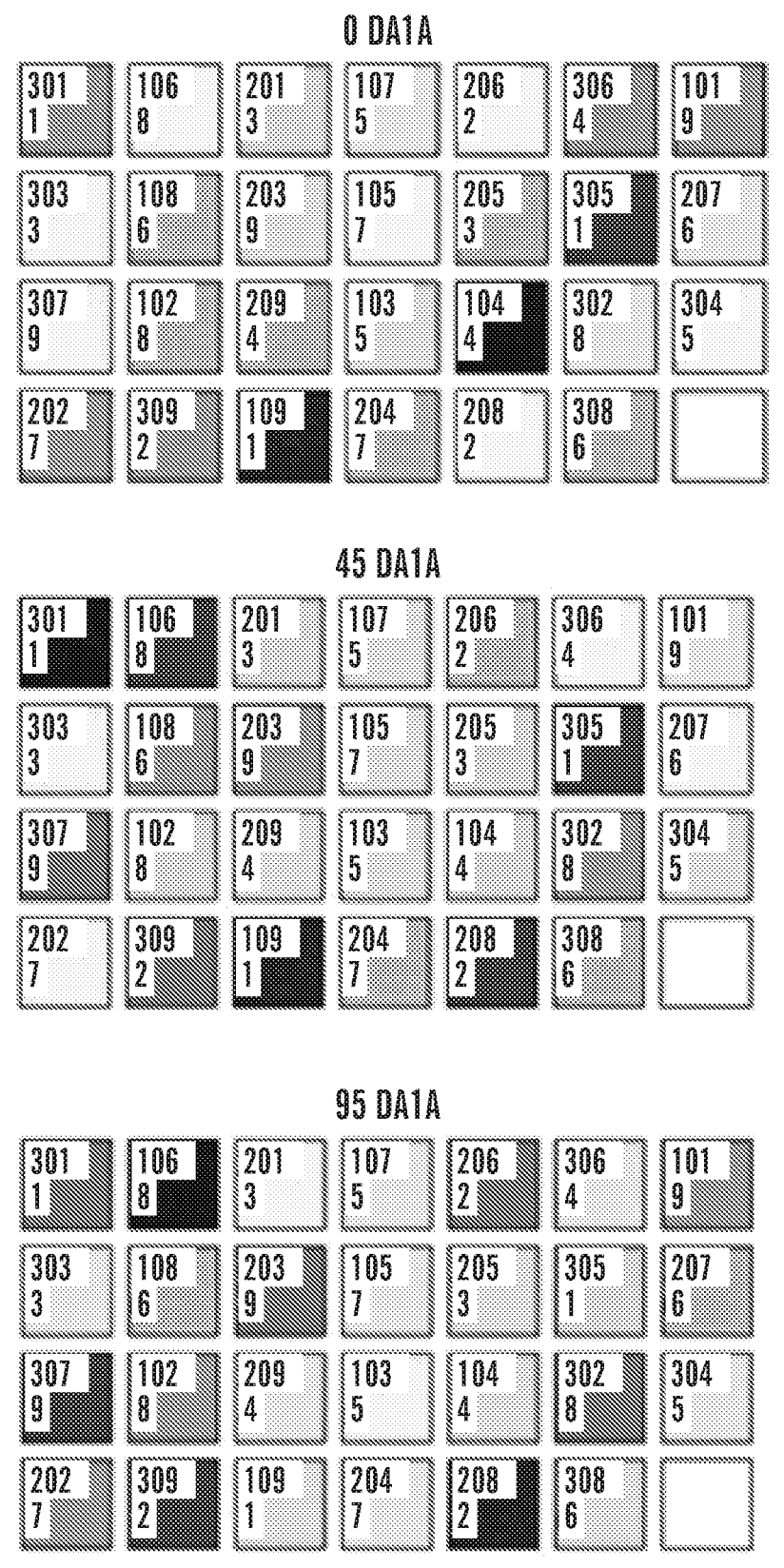
Figure 6A:
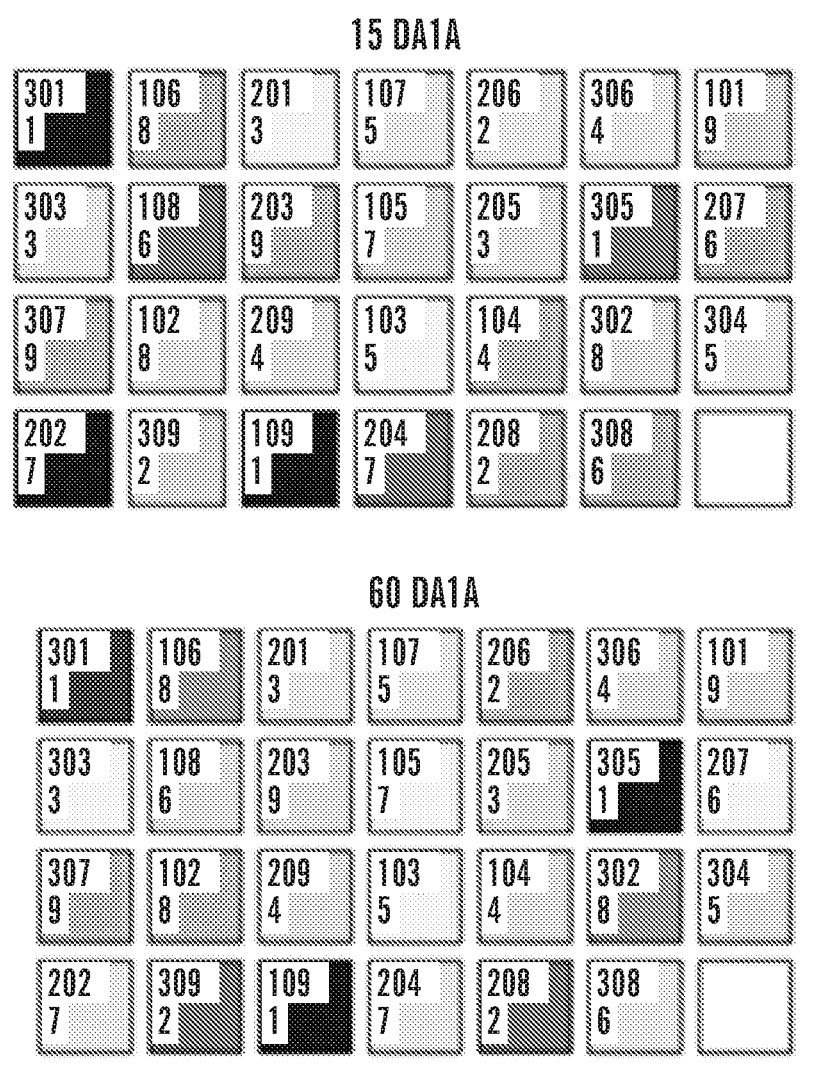
Figure 6A:
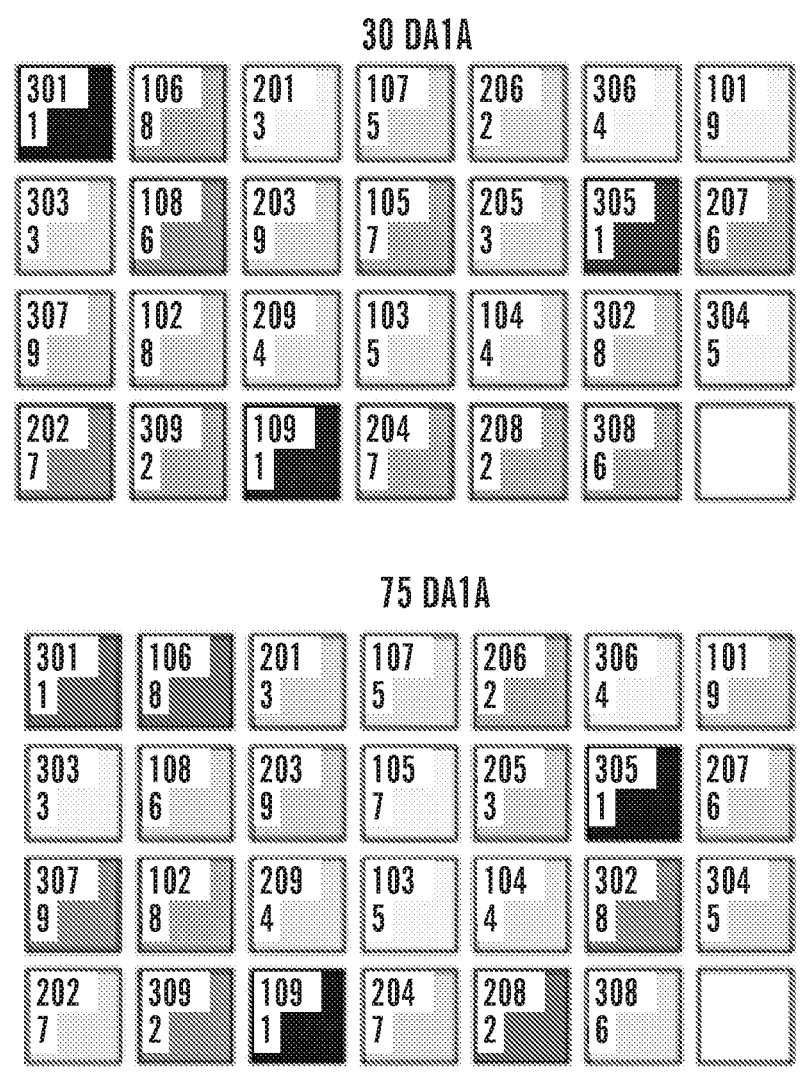
Figure 6B:
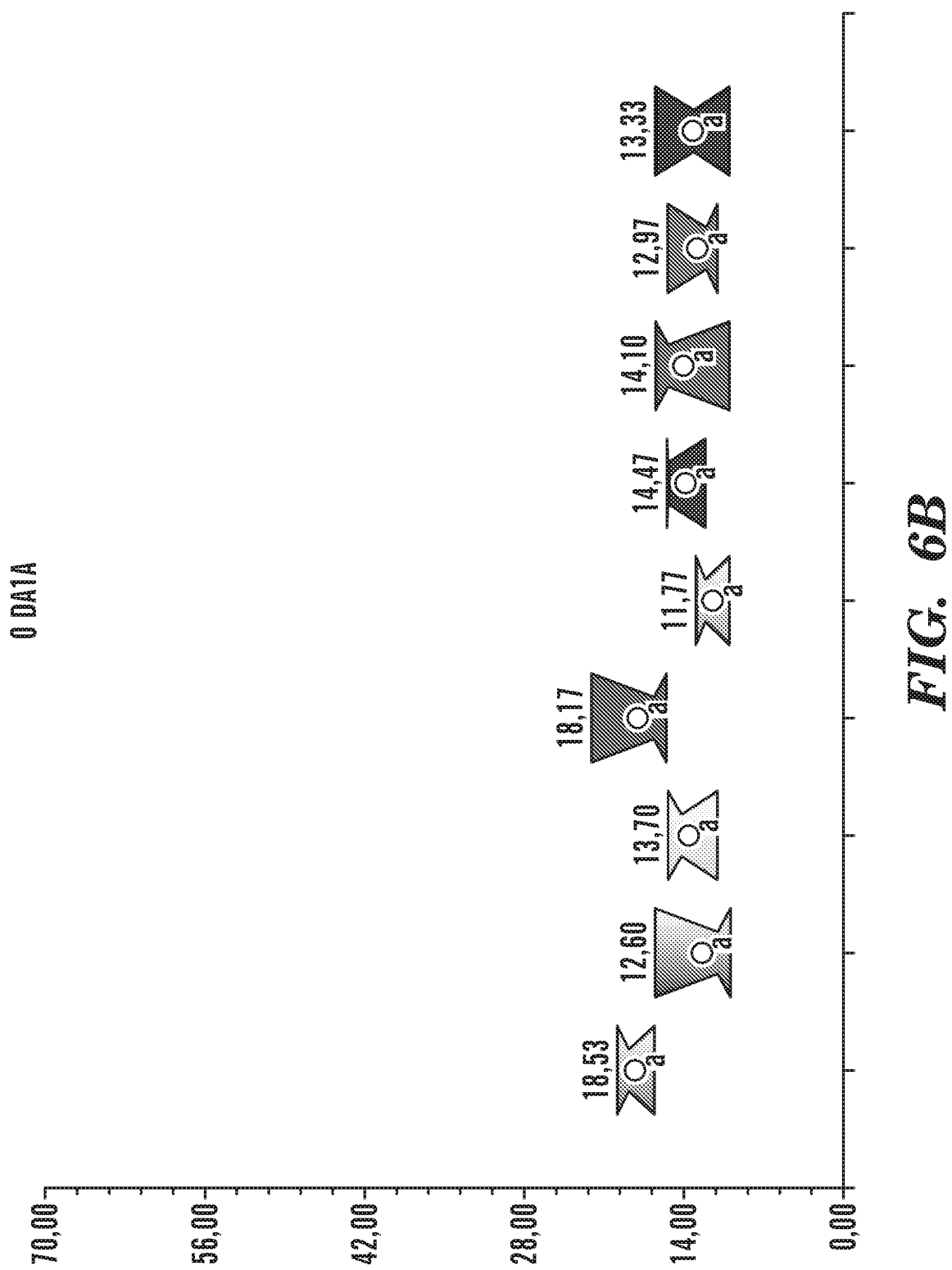
Figure 6B:
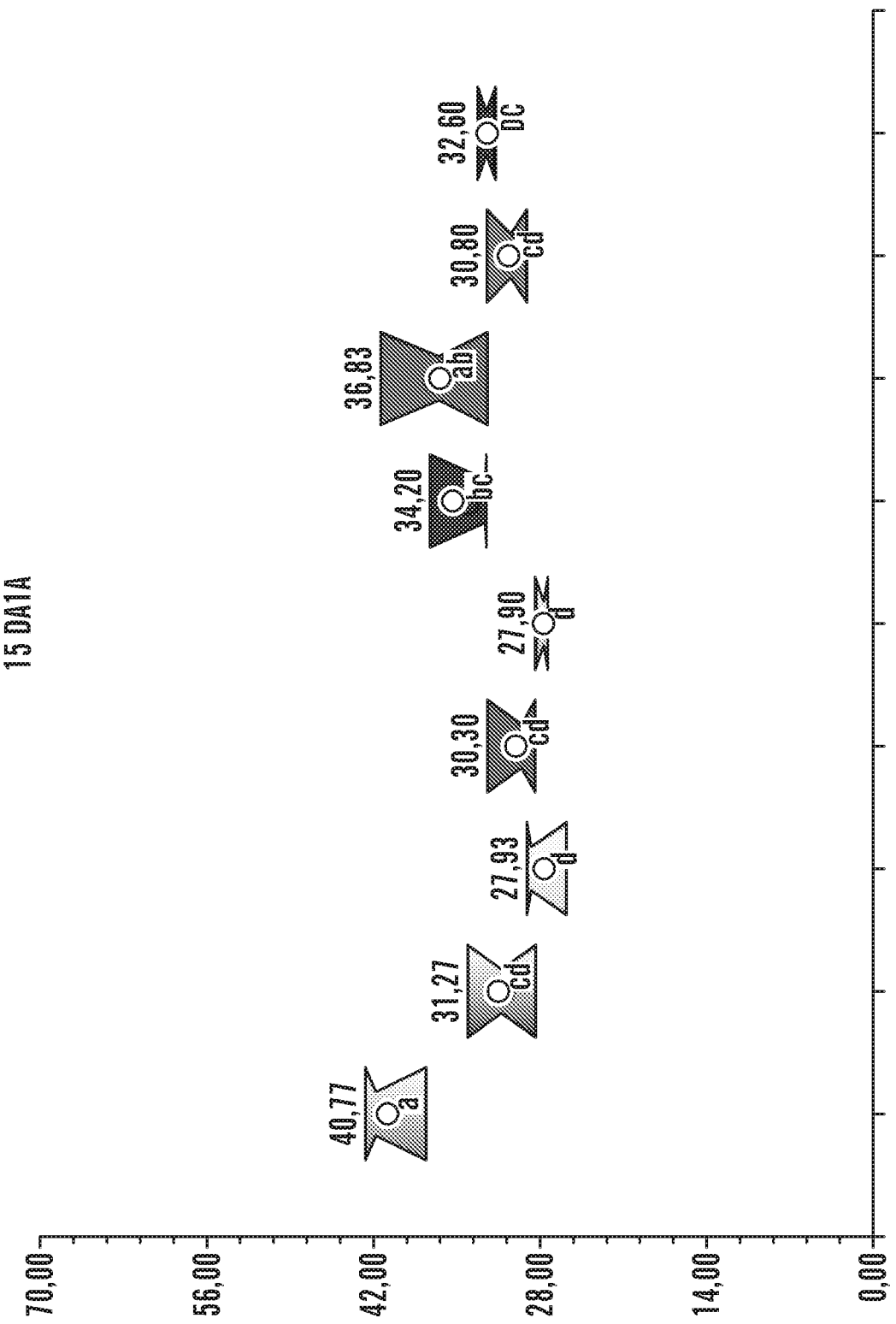
Figure 6B:
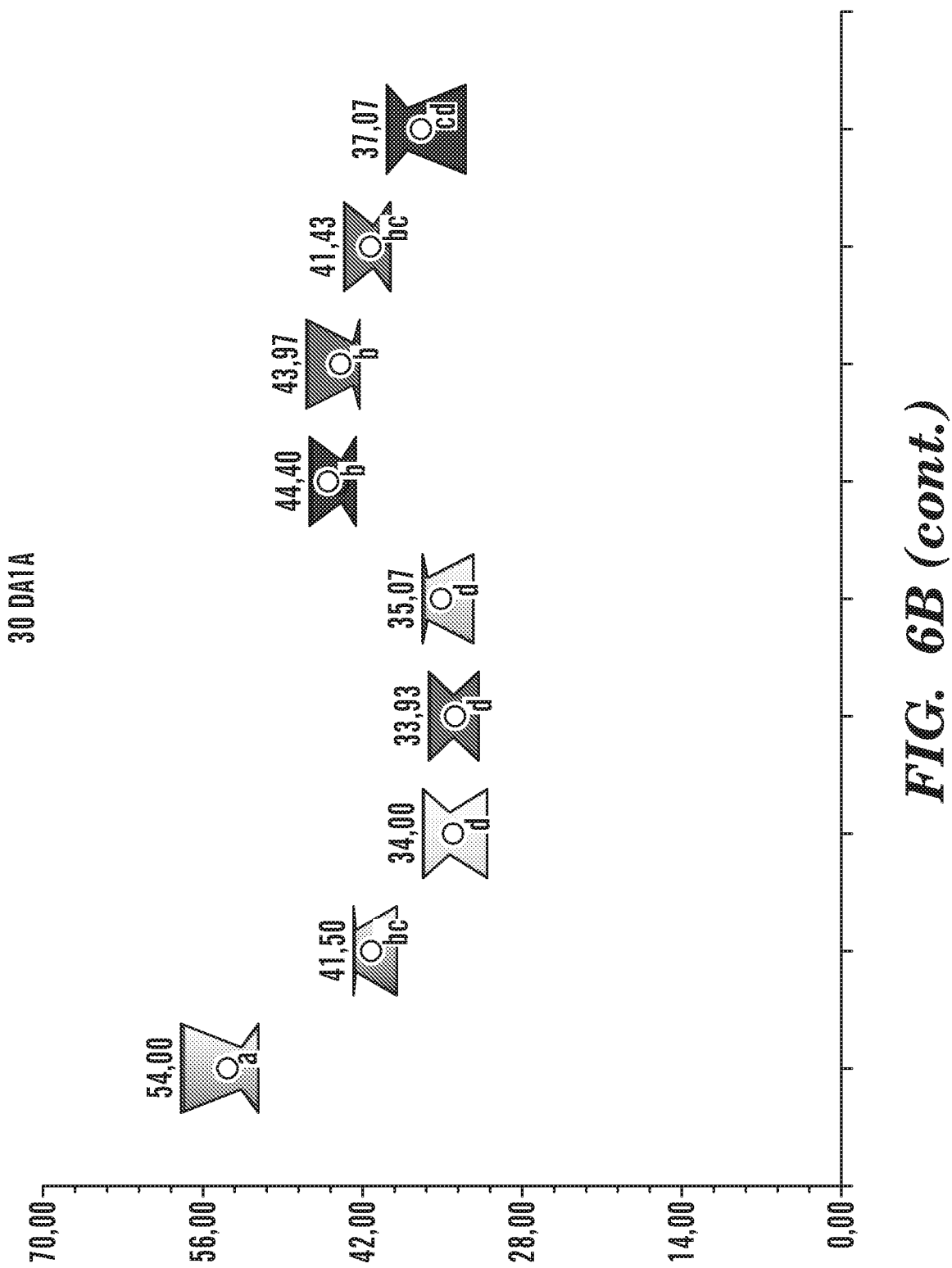
Figure 6B:
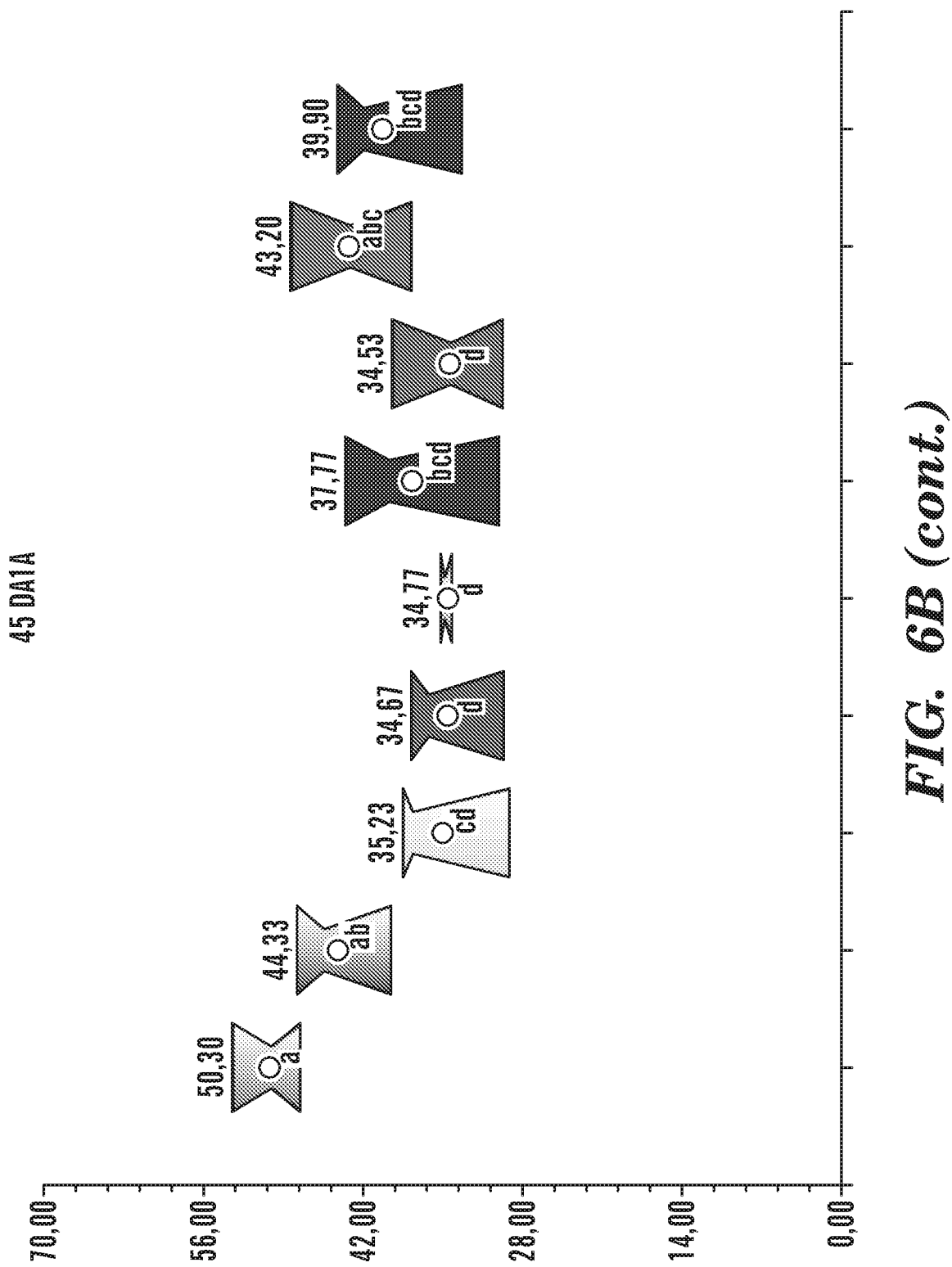
Figure 6B:
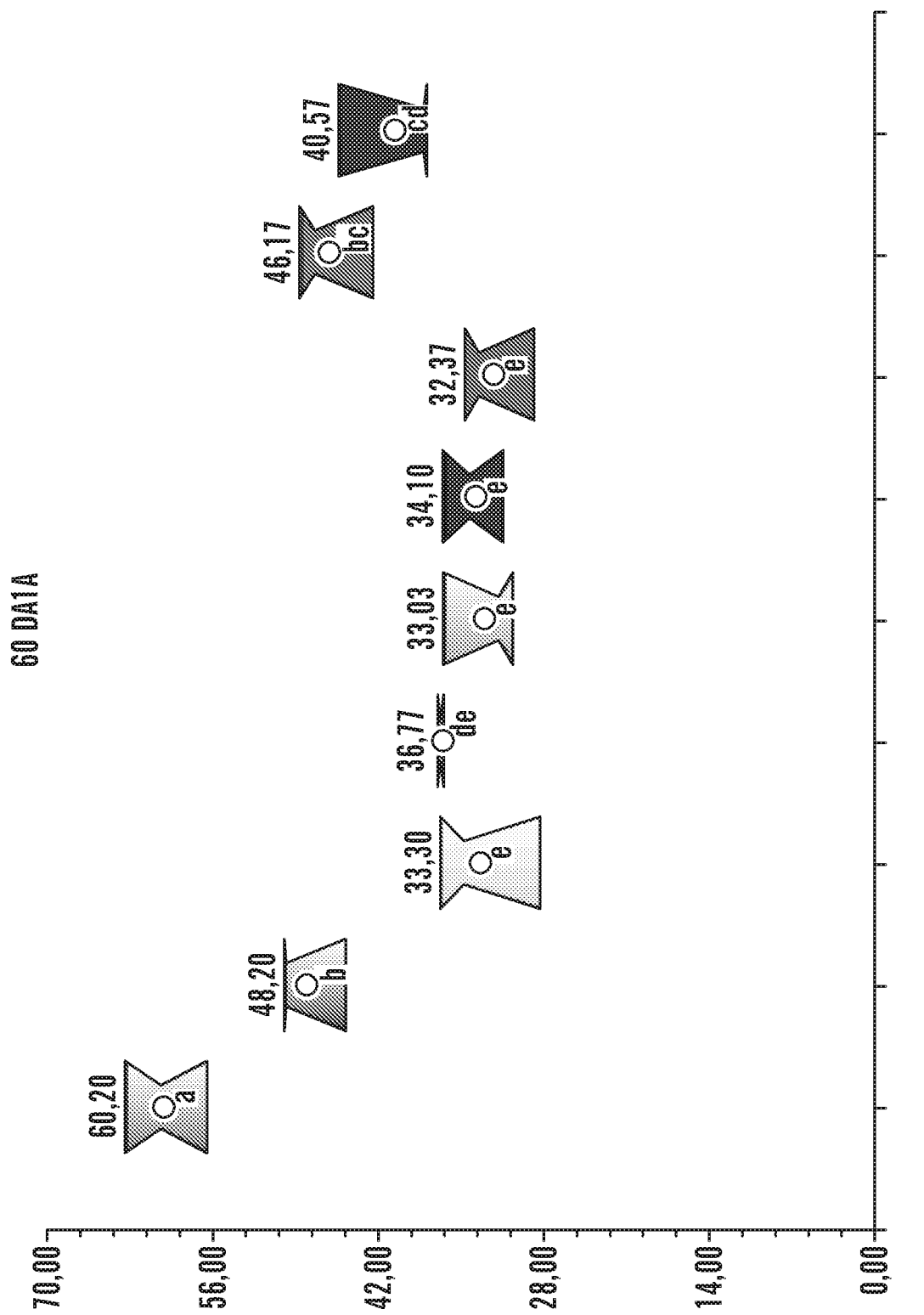
Figure 6B:
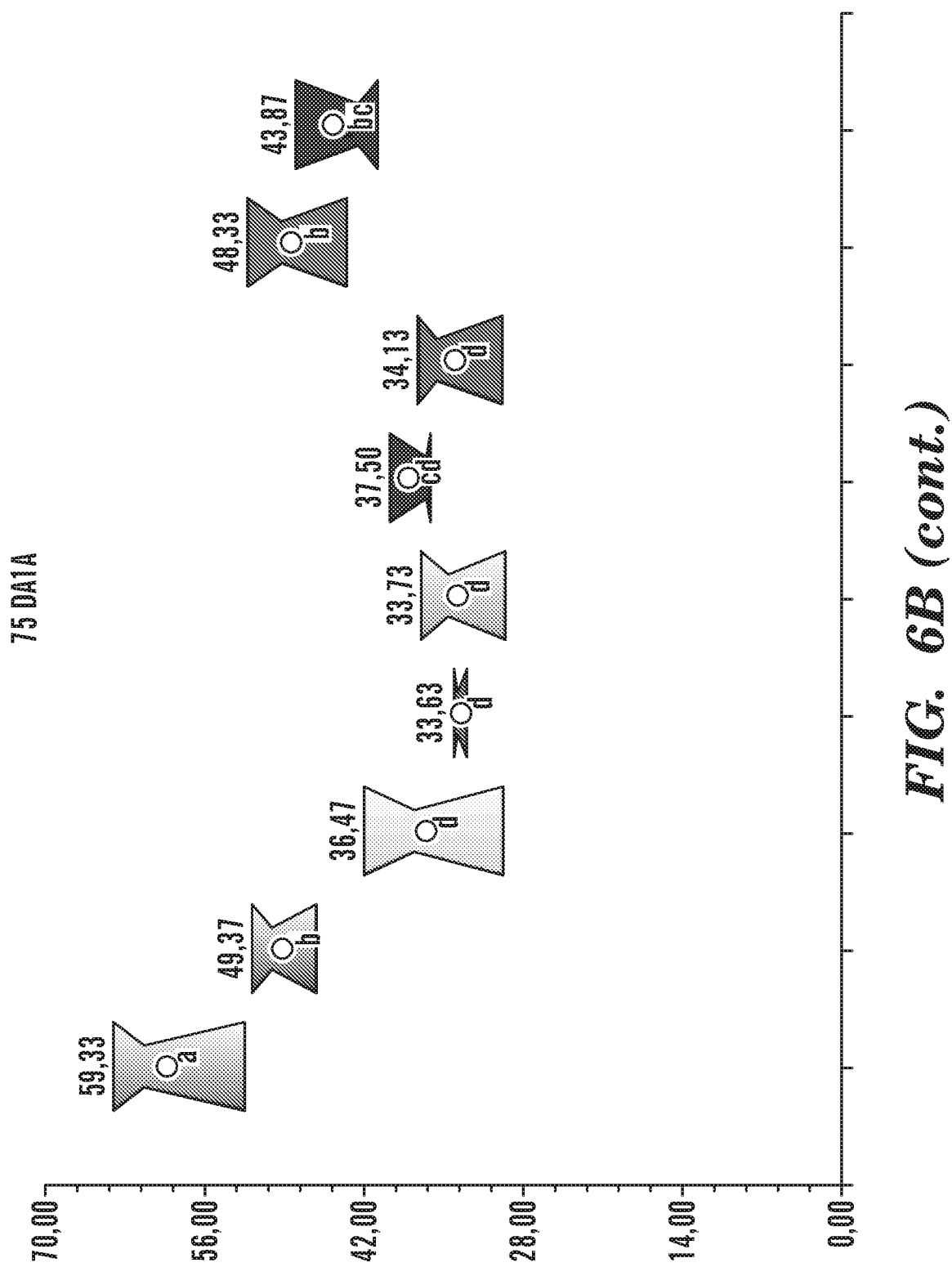
Figure 6B:
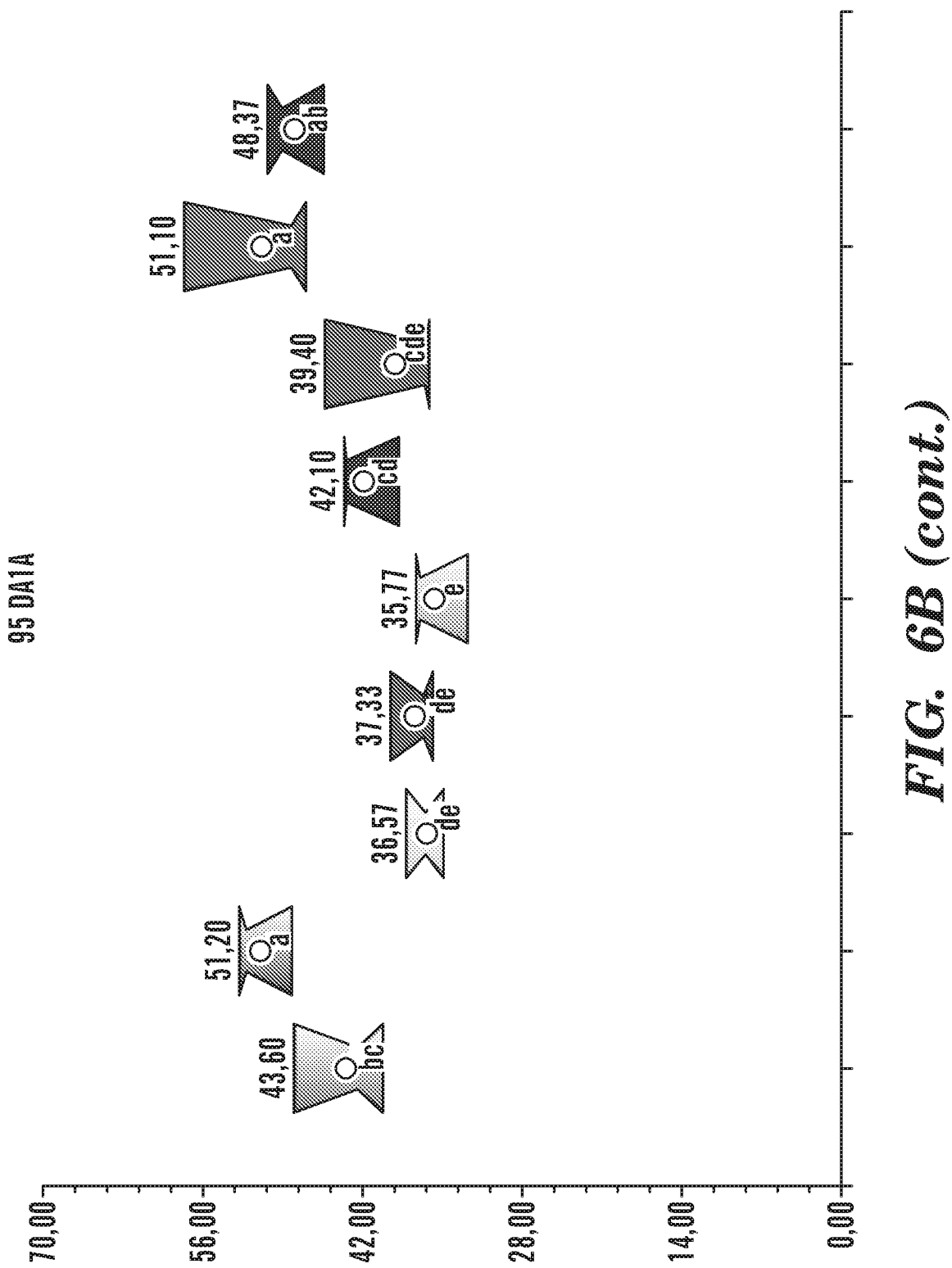

FIGS. 6A-6B show the spatial distribution and treatments over time ("DA1A"=days after first application).

Figure 7A:
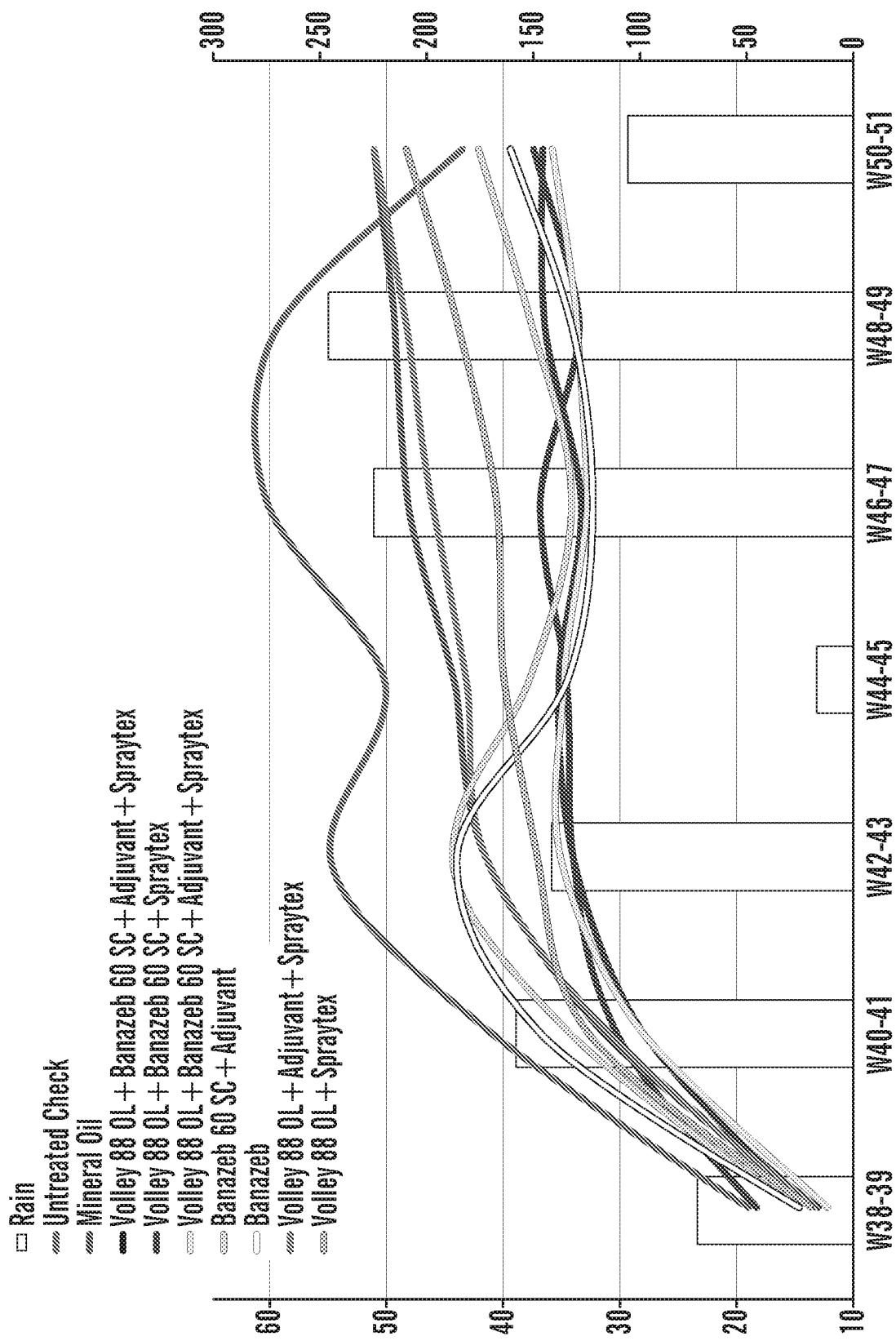
Figure 7B:
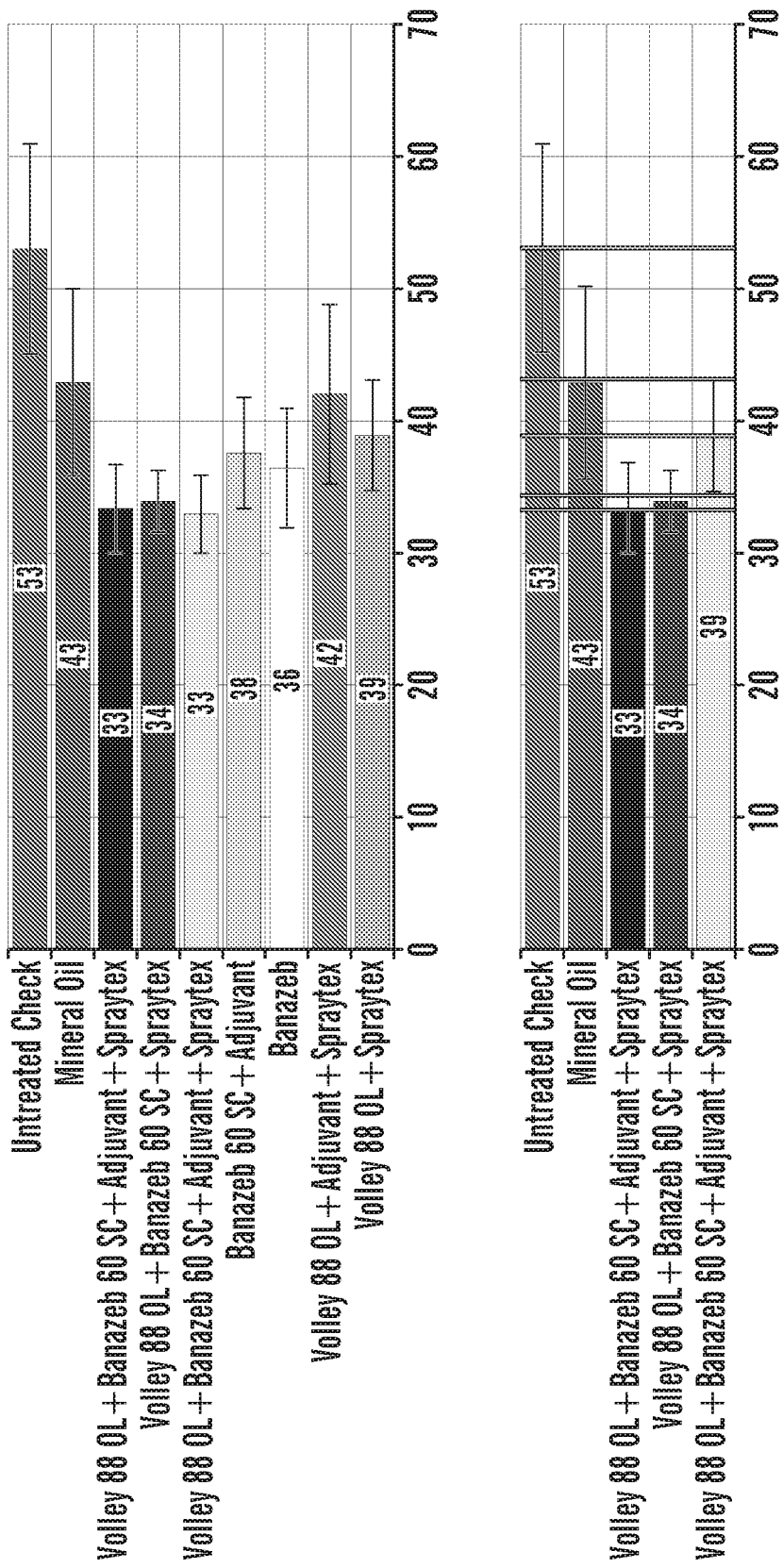

FIGS. 7A-7B show the evaluation of the control of Black Sigatoka (*Mycosphaerella fijiensis*) in banana Grand Naine.

Figure 8:
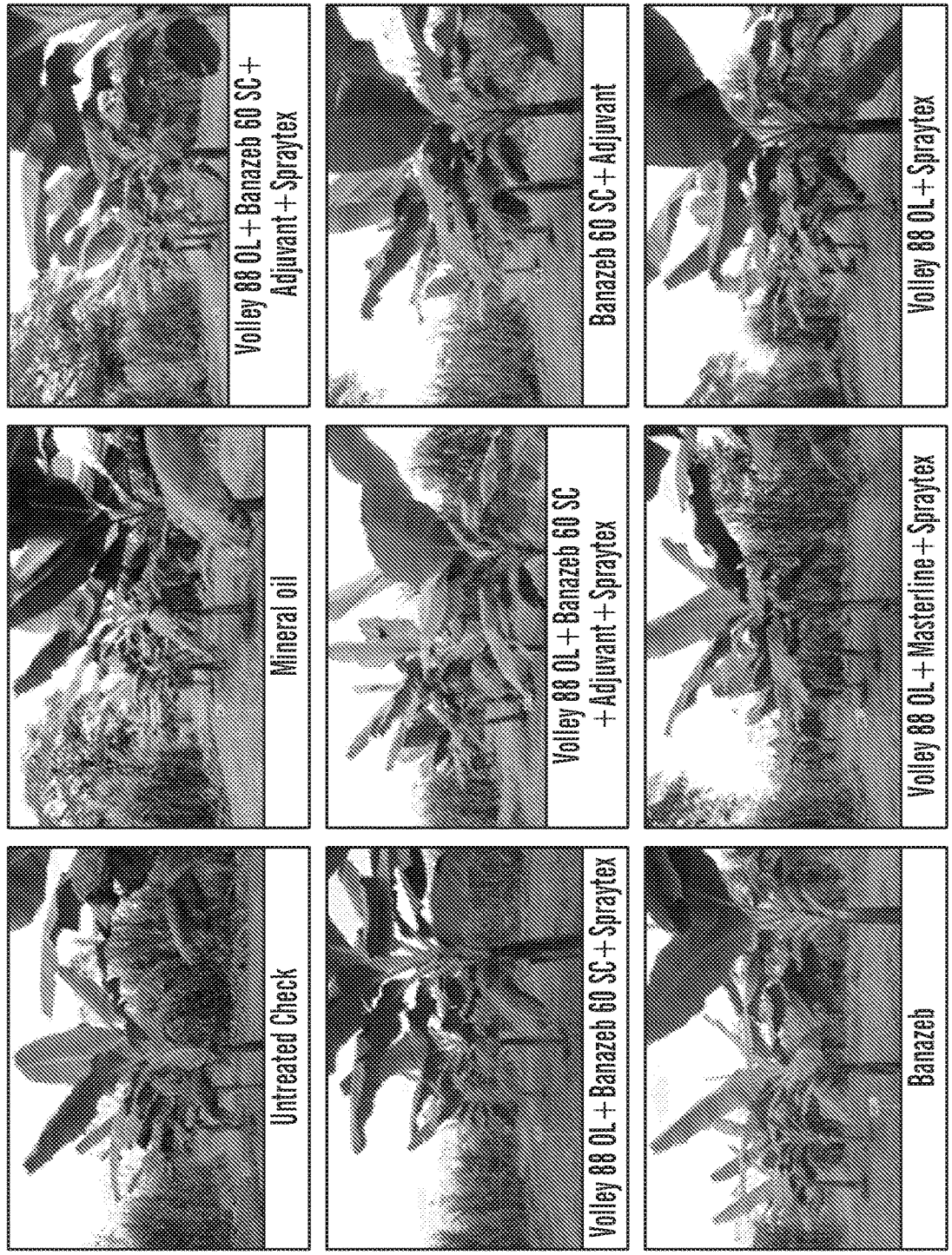

FIG. 8 shows images of banana trees 75 days after first application, 20 days after last protectant fungicide application, and 5 days after last systemic fungicide application for each of the nine treatment conditions.

Figure 9A:
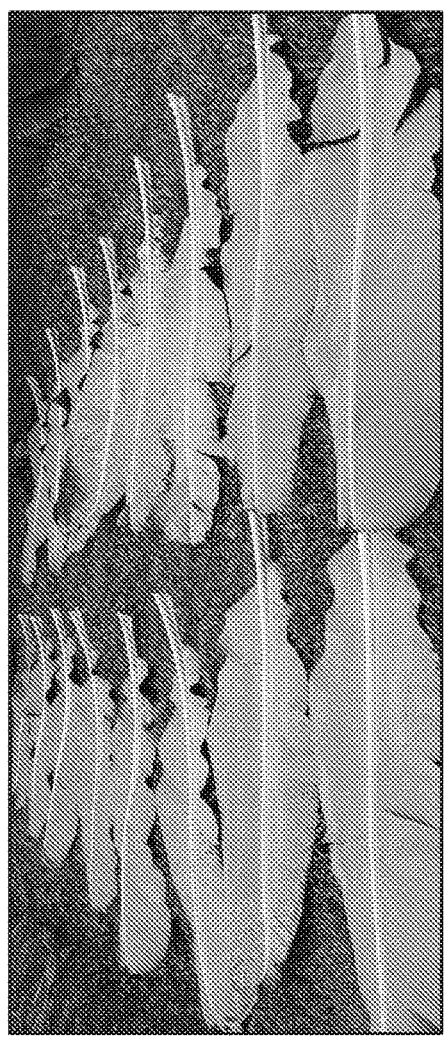
Figure 9B:
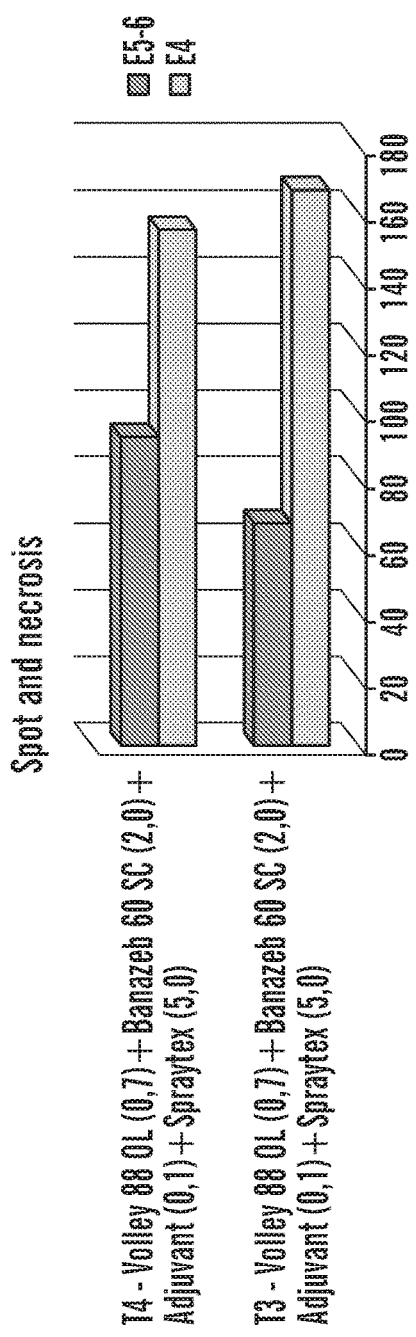

FIGS. 9A-9B show images of banana leaves showing the effect of treatments on the spot and necrotic tissue with (FIG. 9A, left) and without adjuvant (FIG. 9A, right) 30 days after the last application and a graph of the spot and necrosis detected on banana leaves from treatment groups 3 and 4 (FIG. 9B).

Figure 10A:
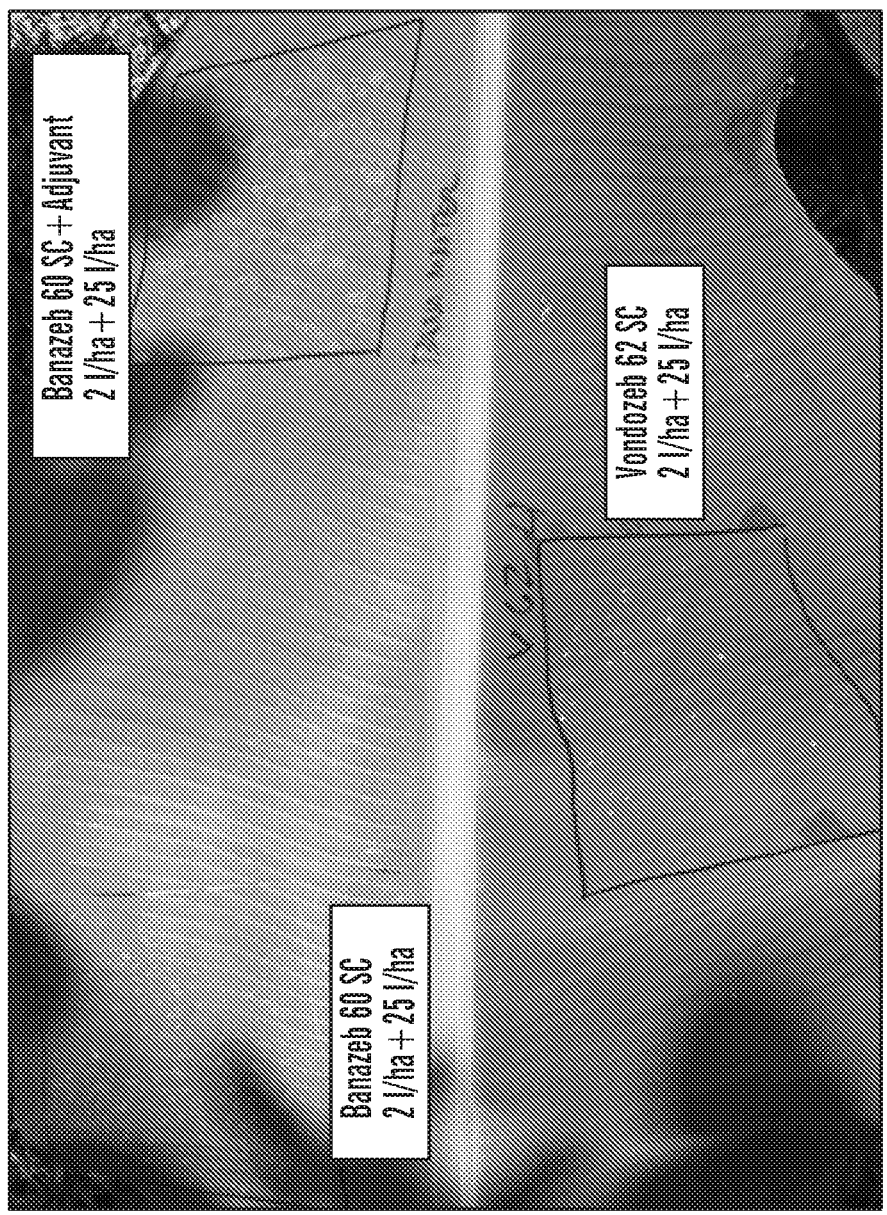
Figure 10C:
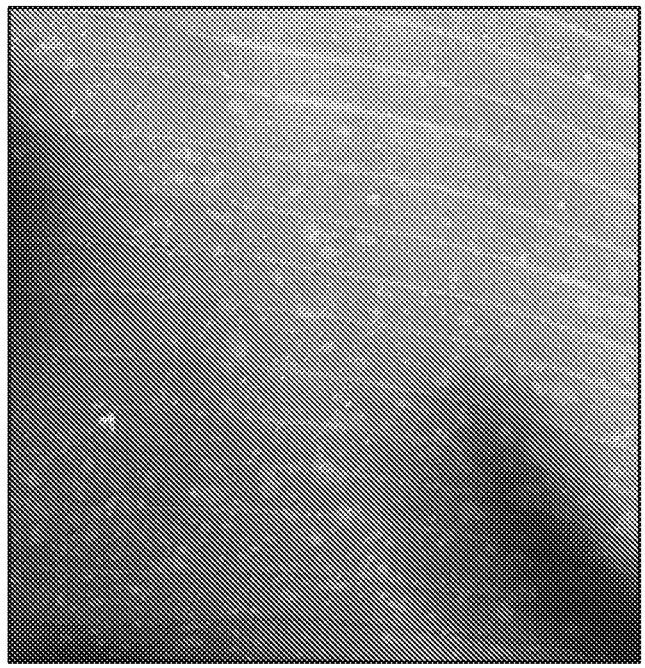
Figure 10B:
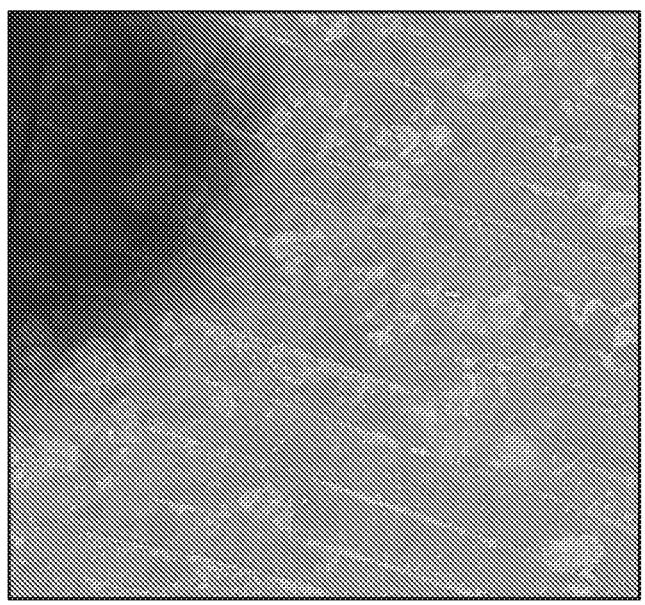
Figure 10E:
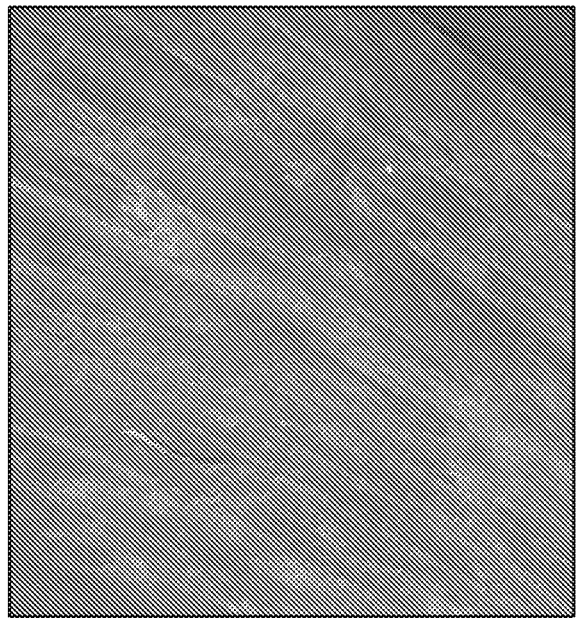
Figure 10D:
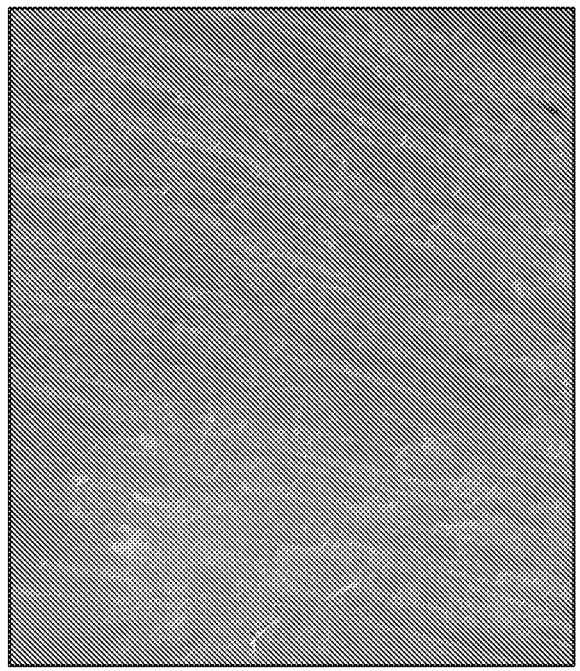
Figure 10G:
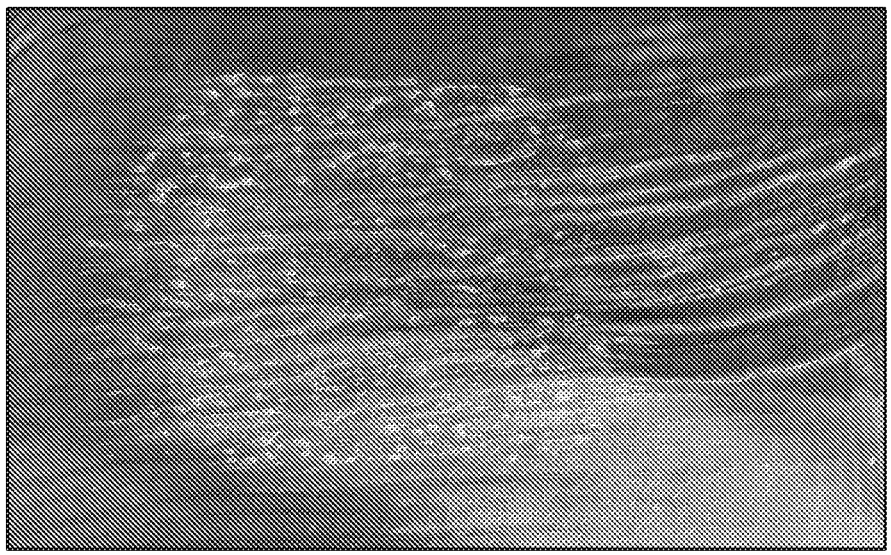
Figure 10F:
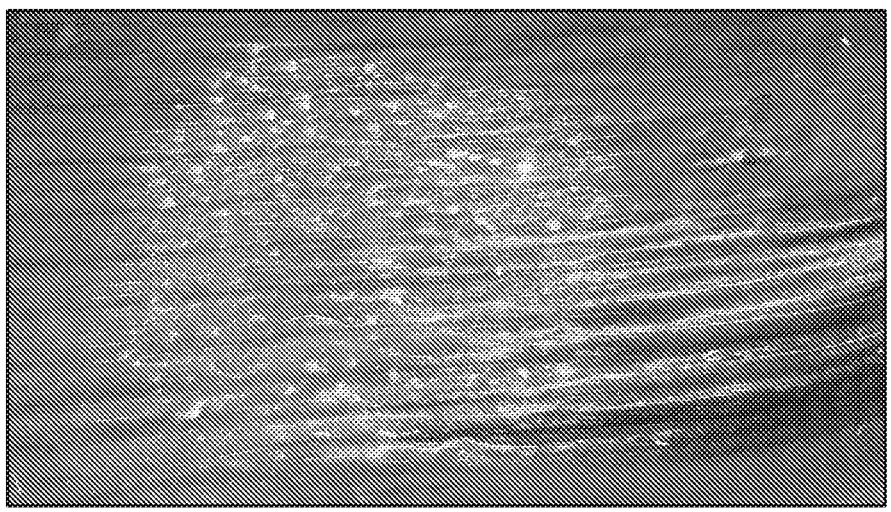

FIGS. 10A-10G show the results of the application of various plant treatment formulations to banana leaves. FIG. 10A shows the effect of applying Banazeb®60SC alone (top left square), Banazeb®60SC plus Adjuvant (top right square), and Vondozeb® 62 SC (bottom square) to wet banana leaves. Detailed images of leaves treated with Banazeb®60SC plus Adjuvant (FIG. 10B) and Banazeb®60SC in the absence of Adjuvant (FIG. 10C) are also shown. The effect of washing water on the application of Banazeb®60SC plus Adjuvant (FIG. 10D) and Banazeb®60SC in the absence of Adjuvant (FIG. 10E) is also shown. FIGS. 10F-10G show the effect of washing water on the use of Banazeb®60SC (FIG. 10F) and Banazeb®60SC plus Adjuvant (FIG. 10G) on sunburned banana leaves.

Figure 11B:
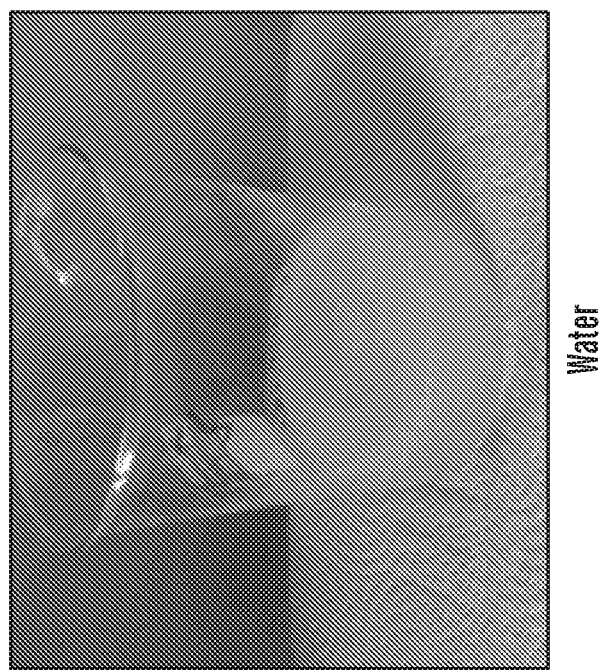
Figure 11A:
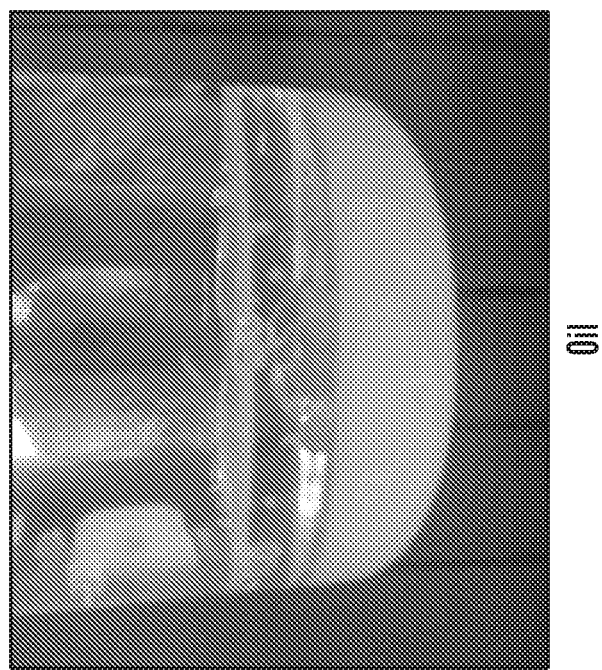

FIGS. 11A-11B show images of a mixture of oil with adjuvant (FIG. 11A) and water with adjuvant (FIG. 11B).

Figure 12B:
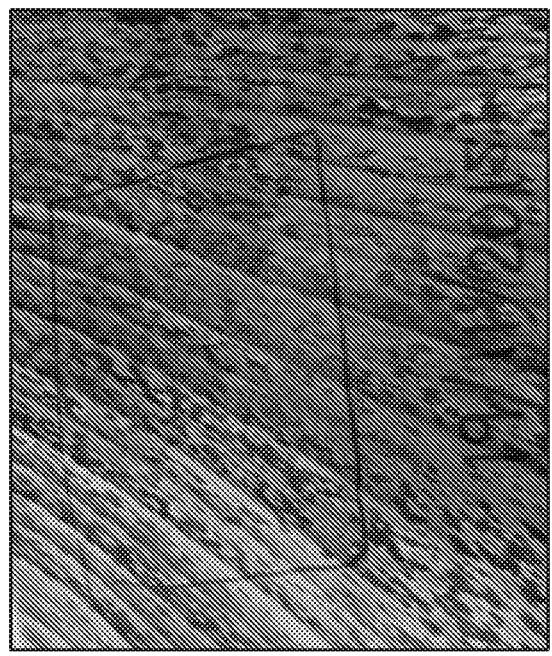
Figure 12A:
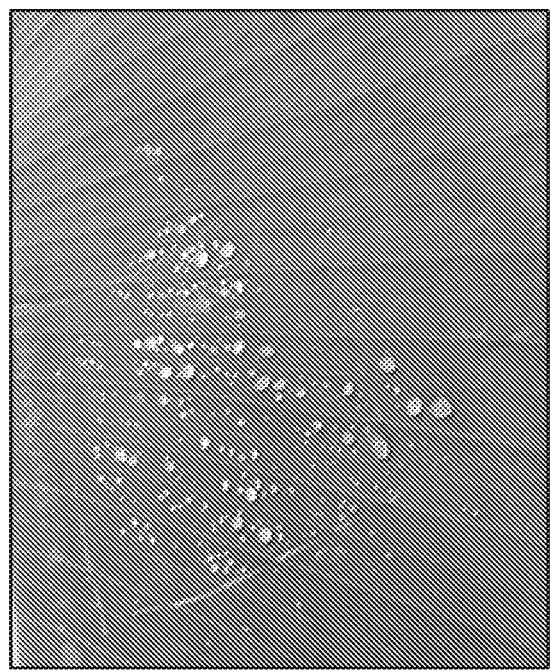

FIGS. 12A-12B show the effect of the application of the adjuvant on the banana leaf and Sigatoka control 18 days after application (FIG. 12A) and 32 days after application (FIG. 12B).

DETAILED DESCRIPTION OF THE INVENTION

One aspect of the present invention is directed to an adjuvant premix composition for use with plant treatment chemicals. The adjuvant premix composition includes a thickener, a water soluble divalent salt, a foam control agent, a complexing agent, and a film forming agent.

Various thickeners are well known in the art and include, for example, associative and non-associative thickeners (see Gregory D. Shay, Chapter 25, "Alkali-Swellable and Alkali-Soluble Thickener Technology A Review", Polymers in Aqueous Media—Performance Through Association, Advances in Chemistry Series 223, J. Edward Glass (ed.), ACS, pp. 457-494, Division Polymeric Materials, Washington, D.C. (1989); Chassenieux et al., "Rheology of Associative Polymer Solutions," *Current Opinion in Colloid & Interface Science* 16(1):18-26 (2011); Winnik et al., "Associative Polymers in Aqueous Solution," *Current Opinion in Colloid & Interface Science* 2(4):424-36 (1997); and Antunes et al., "Gelation of Charged Bio-Nanocompartments Induced by Associative and Non-Associative Polysaccharides," *Colloids Surf B Biointerfaces*. 66(1):134-40 (2008), which are hereby incorporated by reference in their entirety).

As used herein, the term "associative thickener" refers to a water soluble polymer containing hydrophobic groups that interact with each other and the other elements of the composition to create a three-dimensional network. Exemplary associative thickeners include hydrophobically-modified ethoxylated urethane rheology (HEUR) polymers, hydrophobically-modified alkali swellable emulsion (HASE) polymers, hydrophobically-modified polyether (HMPE), hydrophobically-modified hydroxy ethyl cellulose (HMHEC), and hydrophobically modified ethoxylated aminoplast (HEAT) polymers.

As used herein, the term "non-associative thickener" refers to a high molecular weight water soluble polymer containing hydrophobic groups that interact with each other to create a three-dimensional network. Suitable non-associative thickeners include alkali soluble emulsion (ASE) polymers and cellulose ethers.

In one embodiment, the thickener is an associative anionic thickener. Exemplary associative anionic thickeners are described in European Patent Publication EP2542598 A1 to Nguyen et al., which is hereby incorporated by reference in its entirety. In one example, the associative anionic thickener is selected from the group consisting of a hydrophobically-modified alkali swellable emulsion (HASE) polymer, an alkali soluble emulsion (ASE) polymer, and mixtures thereof.

Alternatively, the thickener is an associative nonionic thickener selected from the group consisting of hydrophobically-modified ethoxylated urethane rheology (HEUR) polymers, hydrophobically modified ethoxylated aminoplast (HEAT) polymers, and mixtures thereof.

In one embodiment, the thickener is selected from the group consisting of a hydrophobically-modified alkali polymer, an alkali soluble emulsion polymer, a hydrophobically-modified ethoxylated urethane polymer, and mixtures thereof. Exemplary associative thickeners include, but are not limited to, ACUSOL® 801S, ACUSOL® 805S, ACUSOL® 810A, ACUSOL® 820, ACUSOL® 823, ACUSOL® 830, ACUSOL® 835, ACUSOL® 842, ACUSOL® 880, and ACUSOL® 882. ACUSOL is a trademark of Rohm and Hass Company, Philadelphia, Pa.

The foam control agent may be selected from the group consisting of alkyl poly acrylates, fatty acids, fatty alcohols, monoglycerides, diglycerides, triglycerides, a silicone-based foam control agent, and mixtures thereof.

Fatty acids or fatty alcohols are species which have from 10 to 20 carbon in their alkyl chain. Suitable fatty acids are saturated or unsaturated and can be obtained from natural sources (e.g., palm oil, coconut oil, babassu oil, safflower oil, tall oil, castor oil, tallow and fish oils, grease, and mixtures thereof) or can be synthetically prepared. Examples of suitable fatty acids for use in the present invention include capric acid, lauric acid, myristic acid, palmitic acid, stearic acid, arachidic acid, and behenic acid.

Fatty alcohols derived from the above-mentioned fatty acids are suitable for the foam control agents of the present invention. Exemplary fatty alcohols include, but are not limited to, capryl alcohol, lauryl alcohol, myristyl alcohol, palmitoleyl alcohol, stearyl alcohol, arachidyl alcohol, and behenyl alcohol.

As used herein, the term "glyceride" refers to esters where one, two, or three of the —OH groups of the glycerol have been esterified. Monoglycerides, diglycerides, and triglycerides may comprise esters of any of the fatty acids described above.

As used herein, the term "silicone-based foam control agent" refers to a polymer with a silicon backbone. In one embodiment, the foam control agent is a silicone-based foam control agent. Suitable silicone-based foam control agents include, but are not limited to, polydimethylsiloxane fluid and polydimethylsiloxane-treated silica.

The water soluble divalent salt may be formed from a divalent cation selected from the group consisting of barium, calcium, chromium (II), cobalt (II), copper (II), iron (II), lead (II), magnesium, manganese (II), strontium, zinc (II), tin (II), and mixtures thereof. In one embodiment, the water soluble divalent salt is selected from the group consisting of zinc (II) acetate, zinc (II) bromide, zinc (II) chlorate, zinc (II) chloride, zinc (II) fluoride, zinc (II) formate, zinc (II) iodide, zinc (II) nitrate, zinc (II) sulfate monohydrate, zinc (II) sulfate heptahydrate, zinc (II) sulfate hexahydrate, zinc (II) sulfate anhydrous, and mixtures thereof. In another embodiment, the water soluble divalent salt is a zinc sulfate.

As used herein, the term "complexing agent" refers to a substance that is capable of complexing metal ions. The complexing agent may be selected from the group consisting of diethylenetriaminepentaacetic acid (DTPA), ethyl enedinitrilotetraacetic acid (EDTA), nitrilotriacetic acid (NTA), diethanolamine (DEA), triethanolamine (TEA), and mixtures thereof.

In one embodiment, the complexing agent is triethanolamine (TEA). In another embodiment, the complexing agent is a mixture of triethanolamine (TEA) and diethanolamine (DEA).

As used herein, the term "film forming agent" refers to an agent which functions to enhance film formation. Film forming agents may be selected from the group consisting of polyvinyl alcohol, polyvinyl acetate, and mixtures thereof. In one embodiment, the film forming agent is polyvinyl alcohol having a molecular weight of 25,000 to 175,000. Alternatively, the film forming agent is polyvinyl alcohol having a molecular weight of 80,000 to 150,000. For example, the film forming agent may be polyvinyl alcohol having a molecular weight of 100,000.

The adjuvant premix composition may comprise 30 to 60 wt %, 35 to 60 wt %, 40 to 60 wt %, 40 to 55 wt %, 45 to 60 wt %, 50 to 60 wt %, 55 to 60 wt % thickener; 0.5 to 10 wt %, 0.5 to 15 wt %, 0.5 to 5 wt %, 0.5 to 1.5 wt %, 1.0 to 4.0 wt %, or 2.0 to 3.0 wt % water soluble divalent salt; 0.5 to 10 wt %, 0.5 to 15 wt %, 0.5 to 5, 0.5 to 1.5 wt %, 1.0 to 4.0, 1.5 to 3.5 wt %, 2.0 to 3.0 wt % foam control agent; 30 to 60 wt %, 35 to 60 wt %, 40 to 60 wt %, 45 to 60 wt %, 50 to 60 wt %, 55 to 60 wt % complexing agent; and 0.5 to 10 wt %, 0.5 to 15 wt %; 0.5 to 5, 0.5 to 1.5 wt %, 1.0 to 4.0, 2.0 to 3.0 wt % film forming agent.

In one embodiment, the adjuvant premix composition comprises 30 to 60 wt % of the thickener; 0.5 to 5 wt % of the water soluble divalent salt; 0.5 to 5 wt % of the foam control agent; 30 to 60 wt % of the complexing agent; and 0.5 to 5 wt % of the film forming agent.

In another embodiment, the adjuvant premix composition comprises 45 to 55 wt % of the thickener; 1.8 to 2.8 wt % of the water soluble divalent salt; 1.8 to 2.8 wt % of the foam control agent; 45 to 55 wt % of the complexing agent; and 1.8 to 2.8 wt % of the film forming agent.

Alternatively, the adjuvant premix composition comprises 42 to 50 wt % of the thickener; 2.1 to 2.6 wt % of the water soluble divalent salt; 2.1 to 2.6 wt % of the foam control agent; 42 to 50 wt % of the complexing agent; and 2.1 to 2.6 wt % of the film forming agent.

A further aspect of the present invention relates to an adjuvant composition for use with plant treatment chemicals. This composition includes the adjuvant premix composition of the present invention and water.

In accordance with this aspect of the invention, the thickener, the foam control agent, the water soluble divalent salt, the complexing agent, and the film forming agent of the adjuvant premix composition of the present invention are selected as described above.

The adjuvant composition for use with plant treatment chemicals may comprise 1.00 to 3.00 wt %, 1.00 to 2.50 wt %, 1.00 to 2.00 wt %, 1.50 to 2.00 wt %, or 1.50 to 2.50 wt % thickener; 0.05 to 0.10 wt %, 0.05 to 0.15 wt %, 0.05 to 0.50 wt %, 0.05 to 0.35 wt %, 0.10 to 0.40 wt %, 0.15 to 0.35 wt %, 0.20 to 0.30 wt % water soluble divalent salt; 0.05 to 0.10 wt %, 0.05 to 0.15 wt %, 0.05 to 0.50 wt %, 0.05 to 0.35 wt %, 0.10 to 0.40 wt %, 0.15 to 0.35 wt %, 0.20 to 0.30 wt % foam control agent; 1.00 to 3.00 wt %, 1.00 to 2.50 wt %, 1.00 to 2.00 wt %, 1.50 to 2.00 wt %, or 1.50 to 2.50 wt % complexing agent; 0.05 to 0.10 wt %, 0.05 to 0.15 wt %, 0.05 to 0.50 wt %, 0.05 to 0.35 wt %, 0.10 to 0.40 wt %, 0.15 to 0.35 wt %, 0.20 to 0.30 wt % film forming agent; and 90 to 99 wt %, 92 to 99 wt %, 94 to 99 wt %, 96 to 99 wt %, 97 to 99 wt %, or 98 to 99 wt % water.

In one embodiment, the adjuvant composition for use with plant treatment chemicals comprises 1.00 to 3.00 wt % of the thickener; 0.05 to 0.15 wt % of the water soluble divalent salt; 0.05 to 0.15 wt % of the foam control agent; 1.00 to 3.00 wt % of the complexing agent; 0.05 to 0.15 wt % of a film forming agent; and 90 to 99 wt % water.

In another embodiment, the adjuvant composition for use with the plant treatment chemicals comprises 1.6 to 2.4 wt % of the thickener; 0.08 to 0.12 wt % of the water soluble divalent salt; 0.08 to 0.12 wt % of the foam control agent; 1.6 to 2.4 wt % of the complexing agent; 0.8 to 0.12 wt % of a film forming agent; and 97.6 to 98.4 wt % water.

Alternatively, the adjuvant composition for use with plant treatment chemicals comprises 1.8 to 2.2 wt % of the thickener; 0.09 to 0.11 wt % of the water soluble divalent salt; 0.09 to 0.11 wt % of the foam control agent; 1.8 to 2.2 wt % of the complexing agent; 0.09 to 0.11 wt % of a film forming agent; and 97.8 to 98.2 wt % water.

The present invention also relates to a plant treatment chemical formulation. This formulation includes the adjuvant premix composition of the present invention and one or more plant treatment chemicals.

In accordance with this aspect of the invention, the thickener, the foam control agent, the water soluble divalent salt, complexing agent, and film forming agent of the adjuvant premix composition of the present invention are selected as described above.

The plant treatment chemical may be selected from the group consisting of a pesticide, a fertilizer, and a growth regulating agent.

As used herein, the term "pesticide" refers to an agent that can be used to control and/or kill a pest or organism. Pesticides are well known in the art and include, for example, herbicides, intended for the control of noxious weeds and plants; insecticides, intended for the control of insects; fungicides, intended for the control of fungi; miticides, intended for the control of mites; nematicides, intended for the control of nematodes; acaricides, intended for the control of arachnids or spiders; and virucides intended for the control of viruses. The plant treatment chemical may be a pesticide selected from the group consisting of an herbicide, an insecticide, a fungicide, a miticide, and a nematicide.

In one embodiment, the plant treatment chemical is a herbicide selected from the group consisting of acetyl-CoA carboxylase inhibitors (ACCase), actolactate synthase inhibitors (ALS), microtubule assembly inhibitors (MT), growth regulators (GR), photosynthesis II, binding site A inhibitors (PSII(A)), photosynthesis II, binding site B inhibitors (PSII(B)), photosynthesis II, binding site C inhibitors (PSII(C)), shoot inhibitors (SHT), enolpyruvyl-shikimate-phosphate synthase inhibitors (EPSP), glutamine synthase inhibitors (GS), phytoene desaturase synthase inhibitors (PDS), diterpene inhibitors (DITERP), protoporphyrinogen oxidase inhibitors (PPO), shoot and root inhibitors (SHT/RT), photosystem 1 electron diverters (ED), hydroxyphenlypyruvate dioxygenase synthesis inhibitors (HPPD), and combinations thereof.

Suitable herbicides include, but are not limited to, those listed in Table 1.

TABLE 1

Exemplary Herbicides

| Site of Action of Active Ingredient | Class of Active Ingredient | Common Name of Active Ingredient | Commercial Product |
| --- | --- | --- | --- |
| ACCase | Cyclohexene Oxime | Sethoxydim | Poast ® |
| ACCase | Phenoxy | Quizalofop-P | Assure ® II |
| ALS | Sulfonylurea | Primisulfuron | Beacon ® |
| ALS | Imidazolinone | Imazamox | Raptor ® |
| MT | Dinitroaniline | Trifluralin | Passport ® |
| MT | Dinitroanaline | Pendimethalin | Prowl ® |
| GR | Phenoxy | 2,4-D | Amsol ® |
| GR | Benzoic Acid | Dicamba | Banvel ® |
| PSII(A) | Triazine | Atrazine | Atrazine ® |
| PSII(A) | Triazine | Cynazine | Blandex ® |
| PSII(B) | Nitrite | Bromoxylin | Butracil ® |
| PSII(C) | Phenylurea | Diuron | Karmex ® |
| SHT | Thiocarbamate | EPTC | Eptam ® |
| EPSP | Organophosphorous | Glyphosate | Roundup ® |
| GS | Organophosphorous | Gluphosinate | Liberty ® |
| PDS | Pyridazinone | Norflurazon | Zorial ® |
| DITERP | unclassified | Clomazone | Command ® |
| PPO | Diphenyl ether | Fomesafen | Reflex ® |
| SHT/RT | Chloroacetanilide | Alachor | Lasso ® |
| SHT/RT | Chloroacetanilide | Acetochlor | Surpass ® |
| ED | Quaternary ammonium | Diquat | Reglone ® |
| HPPD | Cyclopropylisoxazole | Isoxaflutole | Balance ® |

In another embodiment, the plant treatment chemical is an insecticide selected from the group consisting of carbamates, organochlorines, nicotinoids, phosphoramidothioates, organophosphates, pyrethroids and combinations thereof.

Suitable insecticides include, but are not limited to, those listed in Table 2.

TABLE 2

Exemplary Insecticides

| Class of Active Ingredient | Common Name of Active Ingredient | Commercial Product |
| --- | --- | --- |
| Carbamate | Aldricarb | Temik ® |
| Organochlorine | Endosulfan | Thidan ® |
| Nicotinoid | Imidacloprid | Merit ® |
| Phosphoramidothioate | Acephate | Orthene ® |
| Organophosphate | Dimethoate | Roxion ® |
| Pyrethroid | Permethrin | Ambush ® |

The plant treatment chemical may be a fungicide selected from the group consisting of aliphatic nitrogens, benzimidazoles, dicarboximides, dithiocarbamates, imidazoles, strobins, anilides, aromatics, sulfur derivatives, copper derivatives, and combinations thereof.

Suitable fungicides include, but are not limited to, those listed in Table 3.

TABLE 3

Exemplary Fungicides

| Class of Active Ingredient | Common Name of Active Ingredient | Commercial Product |
| --- | --- | --- |
| Aromatic | Chlorothalonil | Bravo ® |
| Copper | Copper hydroxide | Kocide ® |
| Sulfur | Flowers of Sulfur | Kumulus ® |
| Aliphatic nitrogen | Cymoxanil | Curzate ® |
| Benzimidazole | Thiabendazole | Thiabendazole ® |
| Dicarboximide | Capatan | Captan ® |
| Dicarboximide | Vinclozolin | Ronilan ® |
| Dicarboximide | Mancozeb | Dithane ® |
| Dicarboximide | Maneb | Manex ® |
| Dicarboximide | Meritram | Polyram ® |
| Dicarboximide | Thiram | Thiram ® |
| Dicarboximide | Ziram | Ziram ® |
| Imidazole, dicarboximide | Iprodione | Rovral ® |
| Organophosphate | Fosetyl-aluminum | Alientte ® |
| Dithiocarbamate | Mancozeb | Dithane ® |
| Strobin | Azoxystrobin | Abound ® |
| Anilide | Metalaxyl | Ridomil ® |

The plant treatment chemical may be a miticide selected from the group consisting of carbamates, carbazates, diphenyl oxazolines, glycides, macrocyclic compounds, METI-acaracides, napthoquinone derivatives, organochlorines, organophosphates, organotins, oils, pyrethroids, pyridazinone, pyrroles, soaps, sulfur, tetrazines, tetronic acids, and combinations thereof.

Suitable miticides include, but are not limited to, those listed in Table 4.

TABLE 4

Exemplary Miticides

| Class of Active Ingredient | Common Name of Active Ingredient | Commercial Product |
| --- | --- | --- |
| Carbamate | Carbaryl | Sevin ® |
| Carbamate | Formetanate | Carzol ® |
| Carbamate | Hexythiazox | Savey ® |
| Carbazate | Bifenazate | Acrimite ® |
| Diphenyl oxazoline | Etoxazol | Tetrasan ® |
| Glycoside | Abamecitin | Avid ® |
| Macrocyclic compound | Abamectin | Affirm ® |
| Macrocyclic compound | Milbemectin | Milbeknock ® |
| METI-acaracide | Fenpyroximate | Akari ® |
| METI-acaracide | Pyridaben | Sanmite ® |
| Napthoquinone derivative | Acequinocyl | Shuttle ® O |

TABLE 4-continued

Exemplary Miticides

| Class of Active Ingredient | Common Name of Active Ingredient | Commercial Product |
|---|---|---|
| Organochlorine | Dicofol | Kethane ® |
| Organophosphate | Diazinon | Spectracide ® |
| Organophosphate | Dimethoate | Cygon ® |
| Organophosphate | Disulfoton | Di-Syston ® |
| Organotin | Fenbutatin oxide | Vendex ® |
| Oil | Clove oil | Pest Out ® |
| Oil | Cottonseed oil | Sea-cide ® OG |
| Oil | Garlic oil | Captiva ® |
| Oil | Mineral oil | Ultra-Pure ® Oil |
| Oil | Neem oil | Triact ® 70 |
| Oil | Peppermint oil | Ecotec ® |
| Oil | Petroleum oil | Biocover ® |
| Oil | Rosemary oil | Captiva ® |
| Oil | Soybean oil | Captiva ® |
| Pyrethroids | Bifenthrin | Talstar ® |
| Pyrethroids | Fenpropathrin | Danitol ® |
| Pyrethroids | Fluvalinate | Yardex ® |
| Pyrethroids | Lambda-Cyhalothrin | Scimitar ® GC |
| Pyridazinone | Pyridaben | Pyramite ® |
| Pyrroles | Chlorfenapyr | Pylon ® |
| Soaps | Potassium salts of fatty acids | Des-X ® |
| Sulfur | Sulfur | Micro Sulf ® |
| Tetrazine | Clofentezine | Apollo ® |
| Tetronic acid | Spiromesifen | Judo ® |
| Tetronic acid | Spirotetramat | Kontos ® |

The plant treatment chemical may be a nematicide selected from the group consisting of carbamates, organophosphates, halogenated hydrocarbons, methyl isothiocyanate liberators, and combinations thereof.

Suitable nematicides include, but are not limited to, those listed in Table 5.

TABLE 5

Exemplary Nematicides

| Class of Active Ingredient | Common Name of Active Ingredient | Commercial Product |
|---|---|---|
| Carbamate | Aldicarb | Temik ® |
| Carbamate | Aldoxycarb | Standak ® |
| Carbamate | Carbofuran | Furadan ® |
| Carbamate | Oxamyl | Vydate |
| Halogenated hydrocarbon | Chloropicrin | Telone ® II |
| Halogenated hydrocarbon | Methyl bromide | Meth-O-Gas ® |
| Methyl isothiocyanate liberator | Dazomet | Basamid ® G |
| Methyl isothiocyanate liberator | Metam sodium | Vapam ® HL |
| Organophosphate | Cadusaphos | Rugby ® |
| Organophosphate | Ethoprop | Mocap ® |
| Organophosphate | Fenamiphos | Nemacur ® |
| Organophosphate | Fensulfothion | Dasanit ® |
| Organophosphate | Terbufos | Plydox ® |

In one embodiment, the plant treatment chemical is a fertilizer containing plant nutrients selected from the group consisting of sulfur, phosphorus, magnesium, calcium, potassium, nitrogen, molybdenum, copper, zinc, manganese, iron, boron, cobalt, chlorine, and combinations thereof.

In an additional embodiment, the plant treatment chemical is a growth regulating agent selected from the group consisting of auxins, cytokinins, defoliants, ethylene releasers, gibberellins, growth inhibitors, growth retardants, growth stimulators, and combinations thereof.

Suitable growth regulators include, but are not limited to, those listed in Table 6.

TABLE 6

Exemplary Growth Regulators

| Class of Active Ingredient | Common Name of Active Ingredient | Commercial Product |
|---|---|---|
| Cytokinin | Zeatin | |
| Defoliant | Thidiazuron (ISO) | Dropp ® |
| Growth stimulator | Forchlorfenuron | |
| Growth inhibitor | Mepiquat (ISO) chloride | Pix ® |
| Growth inhibitor | Maleic hydrazide (ISO-E) | Sprout Stop ® |
| Growth retardant | Palclobutrazol (ISO) | Bonzi ® |
| Difoliant, ethylene releaser | Ethephon (ANSI) | Prep ® |
| Gibberellin | Gibberellic acid | RyzUp ® |
| Gibberellin | BAP + Gibberellic acid | Accel ® |
| Auxin | α-napththaleneacetic acid (ISO) | Tre-Hold ® |
| Auxin | IBA | Seradix ® |

The adjuvant composition for use with plant treatment chemicals may comprise 1.00 to 3.00 wt %, 1.00 to 2.50 wt %, 1.00 to 2.00 wt %, 1.50 to 2.00 wt %, or 1.50 to 2.50 wt % thickener; 0.05 to 0.10 wt %, 0.05 to 0.15 wt %, 0.05 to 0.50 wt %, 0.05 to 0.35 wt %, 0.10 to 0.40 wt %, 0.15 to 0.35 wt %, 0.20 to 0.30 wt % water soluble divalent salt; 0.05 to 0.10 wt %, 0.05 to 0.15 wt %, 0.05 to 0.50 wt %, 0.05 to 0.35 wt %, 0.10 to 0.40 wt %, 0.15 to 0.35 wt %, 0.20 to 0.30 wt % foam control agent; 1.00 to 3.00 wt %, 1.00 to 2.50 wt %, 1.00 to 2.00 wt %, 1.50 to 2.00 wt %, or 1.50 to 2.50 wt % complexing agent; 0.05 to 0.10 wt %, 0.05 to 0.15 wt %, 0.05 to 0.50 wt %, 0.05 to 0.35 wt %, 0.10 to 0.40 wt %, 0.15 to 0.35 wt %, 0.20 to 0.30 wt % film forming agent; and 90 to 99 wt %, 92 to 99 wt %, 94 to 99 wt %, 96 to 99 wt %, 97 to 99 wt %, or 98 to 99 wt % water. In accordance with federal and state regulations, the plant treatment formulation may comprise 0.1 to 1.00 wt %, 0.1 to 0.50 wt %, or 0.10 to 0.25 wt % of the plant treatment chemical.

In one embodiment, the plant treatment chemical formulation comprises 1.00 to 3.0 wt % of the thickener; 0.05 to 0.15 wt % of the water soluble divalent salt; 0.05 to 0.15 wt % of the foam control agent; 3.00 to 6.00 wt % of the complexing agent; 0.05 to 0.15 wt % of a film forming agent; 90 to 99 wt % water; and 0.1 to 1.00 wt % plant treatment chemical.

In another embodiment, the plant treatment chemical formulation comprises 1.6 to 2.4 wt % of the thickener; 0.08 to 0.12 wt % of the water soluble divalent salt; 0.08 to 0.12 wt % of the foam control agent; 1.6 to 2.4 wt % of the complexing agent; 0.8 to 0.12 wt % of a film forming agent; 97.6 to 98.4 wt % water; and 0.10 to 1.00 wt % of a plant treatment chemical.

Alternatively, the plant treatment chemical formulation comprises 1.8 to 2.2 wt % of the thickener; 0.09 to 0.11 wt % of the water soluble divalent salt; 0.09 to 0.11 wt % of the foam control agent; 1.8 to 2.2 wt % of the complexing agent; 0.09 to 0.11 wt % of a film forming agent; 97.8 to 98.2 wt % water; and 0.10 to 1.00 wt % of a plant treatment chemical.

Another aspect of the present invention pertains to a method of treating plants or plant seeds. This method involves providing a plant seed or a growing plant and applying the plant treatment chemical formulation of the present invention to the plant seed or a growing plant.

In accordance with this aspect of the invention, the thickener, the foam control agent, the water soluble divalent salt, the complexing agent, and the film forming agent of the plant treatment chemical formulation of the present invention are selected as described above.

The plant treatment chemical may be selected from the group consisting of a pesticide, a fertilizer, and a growth regulating agent, as described above.

In one embodiment, the plant treatment chemical formulation comprises 1.00 to 3.00 wt % of the thickener; 0.05 to 0.15 wt % of the water soluble divalent salt; 0.05 to 0.15 wt % of the foam control agent; 1.00 to 3.00 wt % of the complexing agent; 0.05 to 0.15 wt % of a film forming agent; 90 to 99 wt % water; and 0.1 to 1.00 wt % plant treatment chemical.

In another embodiment, the plant treatment chemical formulation comprises 1.6 to 2.4 wt % of the thickener; 0.08 to 0.12 wt % of the water soluble divalent salt; 0.08 to 0.12 wt % of the foam control agent; 1.6 to 2.4 wt % of the complexing agent; 0.8 to 0.12 wt % of a film forming agent; 97.6 to 98.4 wt % water; and 0.10 to 1.00 wt % of a plant treatment chemical.

Alternatively, the plant treatment chemical formulation comprises 1.8 to 2.2 wt % of the thickener; 0.09 to 0.11 wt % of the water soluble divalent salt; 0.09 to 0.11 wt % of the foam control agent; 1.8 to 2.2 wt % of the complexing agent; 0.09 to 0.11 wt % of a film forming agent; 97.8 to 98.2 wt % water; and 0.10 to 1.00 wt % of a plant treatment chemical.

As used herein, the term "plant" refers to any living organism belonging to the kingdom Plantae, including, but not limited to, trees, herbs, bushes, grasses, and vines. The term refers to both monocots and dicots. Exemplary plants include, but are not limited to, corn, potatoes, roses, apple trees, sunflowers, wheat, rice, bananas, tomatoes, pumpkins, squash, lettuce, cabbage, oak trees, guzmania, geraniums, hibiscus, *clematis*, poinsettias, sugarcane, taro, duck weed, pine trees, Kentucky blue grass, *zoysia*, coconut trees, *brassica* leafy vegetables (e.g., broccoli, broccoli raab, Brussels sprouts, cabbage, Chinese cabbage (e.g., Bok Choy and Napa), cauliflower, cavalo, collards, kale, kohlrabi, mustard greens, rape greens, and other *brassica* leafy vegetable crops), bulb vegetables (e.g., garlic, leek, onion (dry bulb, green, and Welch), shallot, and other bulb vegetable crops), citrus fruits (e.g., grapefruit, lemon, lime, orange, tangerine, citrus hybrids, pummelo, and other citrus fruit crops), cucurbit vegetables (e.g., cucumber, citron melon, edible gourds, gherkin, muskmelons (including hybrids and/or cultivars of *cucumis* melons), water-melon, cantaloupe, and other cucurbit vegetable crops), fruiting vegetables (including eggplant, ground cherry, pepino, pepper, tomato, tomatillo, and other fruiting vegetable crops), grape, leafy vegetables (e.g., romaine), root/tuber and corm vegetables (e.g., potato), and tree nuts (e.g., almond, pecan, pistachio, and walnut), berries (e.g., tomatoes, barberries, currants, elderberryies, gooseberries, honeysuckles, mayapples, nannyberries, Oregon-grapes, see-buckthorns, hackberries, bearberries, lingonberries, strawberries, sea grapes, lackberries, cloudberries, loganberries, raspberries, salmonberries, thimbleberries, and wineberries), cereal crops (e.g., corn, rice, wheat, barley, sorghum, millets, oats, ryes, triticales, buckwheats, fonio, and *quinoa*), pome fruit (e.g., apples, pears), stone fruits (e.g., coffees, jujubes, mangos, olives, coconuts, oil palms, pistachios, almonds, apricots, cherries, damsons, nectarines, peaches and plums), vines (e.g., table grapes and wine grapes), fibber crops (e.g. hemp and cotton), ornamentals, and the like.

As used herein, the term "growing plant" refers to a plant that is increasing in mass or cell number. Plants may be grown by any means known in the art, including in soil, in water culture (e.g., hydroponically), in media, in sand culture, in gravel culture, and in adsorbed-nutrient culture (see, e.g., McCall W W, Nakagawa Y. 1970. Growing plants without soil. Honolulu (Hi.): University of Hawaii. 22 p. (Circular; 440), which is hereby incorporated by reference in its entirety). In one embodiment, a growing plant is treated.

As used herein, the term "seed" refers to plant propagules including, but not limited to, true seeds, seed pieces, suckers, corms, bulbs, fruits, tubers, grains, cuttings, cut shoots, and the like. In one embodiment, a plant seed is treated.

The growing plant or seed may be selected from the group consisting of canola, alfalfa, rice, wheat, barley, rye, cotton, sunflower, peanut, corn, potato, sweet potato, bean, pea, chicory, lettuce, endive, cabbage, brussel sprout, beet, parsnip, cauliflower, broccoli, turnip, radish, spinach, onion, garlic, eggplant, pepper, celery, carrot, squash, pumpkin, zucchini, cucumber, apple, pear, melon, citrus, strawberry, grape, raspberry, pineapple, soybean, tobacco, tomato, sorghum, and sugarcane.

In one embodiment, the growing plant or plant seed is selected from the group consisting of *Arabidopsis thaliana*, Saintpaulia, *petunia, pelargonium*, poinsettia, *chrysanthemum*, carnation, and *zinnia*.

Methods of applying the plant treatment chemical formulations to growing plants are well known in the art and include, but are not limited to, spraying, wetting, dipping, misting, drenching, showering, fogging, soaking, dampening, drizzling, dousing, and splashing (see, e.g., Matthews, G. A. (2000) Pesticide Application Methods, Third Edition, Blackwell Science Ltd, Oxford, UK, which is hereby incorporated by reference in its entirety).

In one embodiment, the plant seed is treated prior to being planted in a growth medium.

Methods of applying plant treatment chemical formulations to seeds before the seeds are planted in a growth medium include dusting, coating, and spraying (see, e.g., Matthews, G. A. (2000) Pesticide Application Methods, Third Edition, Blackwell Science Ltd, Oxford, UK, which is hereby incorporated by reference in its entirety).

The methods of the present invention are directed to pre-harvest treatment of growing plants and seeds to be planted. The term "pre-harvest" refers to an agricultural commodity such as a plant, plant product (e.g., flower or seed) that is still attached to a tree, shrub, flowering plant, etc. or still in the ground (e.g., a carrot or tuber) at any point in time before being harvested (e.g., detached from a tree, shrub, or flowering plant, or extirpated from the ground or cleaved, cut, or otherwise removed from a stalk, stem, vine, etc.) for sale, trade, consumption, or other human use.

The pre-harvest treatment of the present invention is distinct from a post-harvest treatment (which is not the subject of the present invention). As used herein, the term "post-harvest" refers to the point in time in which an agricultural commodity is harvested for sale, trade, consumption, or other human use. With respect to edible commodities, e.g., fruit and vegetables, or non-edible commodities that are picked, e.g., flowers, the commodity begins its existence as "post-harvest" after picking. For non-edible commodities, e.g., trees, shrubs, flowering plants, and/or seedling stocks, post-harvest is the point at which the commodity is packed, harvested, or otherwise prepared for marketing.

In some embodiments, the growing plant or plant seed is a pre-harvest growing plant or plant seed. Accordingly, the growing plant or plant seed is not a post-harvest plant or post-harvest seed (e.g., a harvested fruit).

Yet another aspect of the present invention relates to a method of treating a plant seed or growing plant. This method involves providing a plant seed or growing plant.

The method further involves applying a mixture of a plant treatment chemical and a coating material to surfaces of the plant seed or plant, where, after the applied coating material dries on the surfaces of the plant seed or growing plant, the dried coating material is characterized by adhering to the surfaces of the plant seed or growing plant and permitting permeation of aqueous material to the plant seed or growing plant while minimizing loss of moisture or loss of plant treatment chemical from the plant seed or growing plant.

In accordance with this aspect of the invention, the coating material is produced from a mixture comprising a thickener, a foam control agent, a water soluble divalent salt, a complexing agent, a film forming agent, and water, as described above. That mixture is formulated and applied to plant seeds and growing plants, as described above.

The plant treatment chemical is selected from the group consisting of a pesticide, a fertilizer, and a growth regulating agent, as described above.

EXAMPLES

Materials and Methods for Examples 1-2
Experimental Locations.

Field studies were conducted at the University of Florida, Southwest Florida Research and Education Center, Immokalee, Fla. For pepper trials, average monthly high and low temperatures were 98° F. and 70° F. in month one; 94° F. and 63° F. in month two; and 94° F. and 51° F. in month three; rainfall totaled 11.02, 0.95, and 2.41 inches for the same monthly periods, respectively. For squash trials, average monthly high and low temperatures were 93° F. and 45° F. in month one; 96° F. and 55° F. in month two; and 96° F. and 55° F. in month three; rainfall totaled 2.00, 3.35, and 5.59 inches for the same monthly periods, respectively.

Transplant Establishment for Field Trials.

In all trials, seedlings were transplanted into Immokalee fine sand on day 0. Treatments were arranged in a complete randomized block treatment design with four replicates. For pepper trials, 'Capistrano' seedlings were arranged in plots comprising 10 plants in a single row spaced 10 inches apart within a 36 inch wide row with 5 feet between each plot and 12 feet center to center between rows. For squash trials, four week old 'Dixie' plants were arranged in plots comprising eight plants spaced 3 feet apart with a 27 foot row and with 10 feet between each plot.

Treatment Application.

Each treatment formulation was spray applied. For pepper trials, treatment formulations were applied using a backpack $CO_2$ sprayer at 40 psi with a single hollow-cone nozzle at 30 gal/A. Silicon was applied as sodium metasilicate nonahydrate ($Na_2SiO_3.9H_2O$). For squash trials, treatment formulations were applied with a high clearance sprayer 2 mph and at 200 psi. A double drop boom equipped with six nozzles delivered a spray volume of 90 gal/A for tomato plants or 80 gal/A for squash plants.

Bacterial Inoculation.

For pepper trials, a suspension of inoculum of bacterial spot containing strains of several races was applied at day 22 and new inoculum was introduced periodically throughout the remainder of the trial.

Data Collection and Analysis.

For each trial, disease severity was assessed by visually estimating the percentage of foliage with symptoms of disease. For pepper trials, plants were examined for symptoms of bacterial spot. For squash trials, plants were examined for powdery mildew. The area under the disease progress curve (AUDPC) was calculated from disease severity ratings. In some trials, fruit was harvested and evaluated for the amount of marketable fruit produced per plot. Data were analyzed within the statistical program of ARM 9.1 (pepper trials) or ARM 9.0 (tomato and squash trials) by ANOVA and means separated by LSD.

Example 1—Evaluation of Chemical Formulations for Management of Bacterial Spot in Pepper Transplanted *Capsicum annuum* 'Capistrano' pepper seedlings were grouped into one of six treatment groups. Group one was an untreated control. The remaining five groups were spray treated with formulations that differed in their chemical compositions (Table 7). The chemical formulations shown in Table 7 were applied to

TABLE 7

Bacterial Spot on Pepper

| | Treatment, Rate, Application Code[a] | | | Disease Severity[b] | | | | | AUDPC[c] |
|---|---|---|---|---|---|---|---|---|---|
| | | | | Day 41 | Day 47 | Day 58 | Day 61 | Day 71 | |
| 1 | Untreated Control | | | 4.8 a[d] | 17.3 a | 27.5 a | 25 a | 25 a | 577.83 ab |
| 2 | Kocide ® 3000 DF | 1.25 LB/A | A-K | 2.8 a | 20.9 a | 20 ab | 16.3 ab | 20 ab | 470.04 b |
| | Manzate ® Pro-Stik 75DF | 1.5 LB/A | A-K | | | | | | |
| 3 | Kocide 3000 DF | 1.25 LB/A | A-K | 12.3 a | 14.1 a | 13.8 bc | 17.5 a | 12 bc | 375.46 b |
| | Adjuvant [e] | 0.25 FL OZ/GAL | A-K | | | | | | |
| | Manzate ® Pro-Stik 75DF | 1.5 LB/A | A-K | | | | | | |
| 4 | Adjuvant [e] | 0.25 FL OZ/GAL | A-K | 16.5 a | 21.6 a | 30 a | 23.3 a | 30 a | 686.71 a |
| 5 | Silicon | 100 mg/L | A-K | 10.3 a | 21.5 a | 21.3 ab | 15 ab | 22.5 ab | 518.42 ab |
| 6 | Adjuvant [e] | 0.25 FL OZ/GAL | A-K | 1.5 a | 3.8 b | 4.3 c | 3 b | 7 c | 94.42 c |
| | Silicon | 100 mg/L | A-K | | | | | | |
| P-value | | | | 0.4562 | 0.0085 | 0.0102 | 0.0498 | 0.0040 | 0.0005 |

[a]Date of application: Application date of treatments made on A = Day 14; B = Day 21; C = Day 28; D = Day 35; E = day 42; F = Day 49; G = Day 56; H = Day 64; I = Day 71; J = Day 77; K = Day 84
[b]Disease severity is an estimate of the percentage of symptomatic foliage
[c]Area under the disease progress curve
[d] Means followed by same letter do not significantly differ at P value indicated in column.
[e] The Adjuvant formulation comprises 95.70 wt % water, 2.00 wt % ACUSOL ® 823, 0.10 wt % PVA (100,000 MW), 0.10 wt % $ZnSO_4$ monohydrate, 0.10 wt % Antifoam ® 8810, and 2.00 wt % TEA plants on days 14, 21, 28, 35, 42, 49, 56, 64, 71, 77, and 84. Plants were inoculated with a bacterial suspension (*Xanthomonas euvesicatoria*) on day 22 and periodically throughout the remainder of the trial. Disease severity was evaluated on days 19, 25, 36, 39, and 49 by estimating the percentage of symptomatic foliage.

As shown in Table 7, plants treated with chemical formulations comprising Adjuvant and silicon (Group 6) showed a significant reduction in disease severity compared to untreated control (Group 1), plants treated with various combinations of commercially available compounds (Groups 2 and 3), plants treated with Adjuvant alone (Group 4), and plants treated with silicon alone (Group 5). Group 6 plants also showed improved growth as compared to those in the silicone alone group (Group 5) (FIGS. 1A-1B).

Fruit was harvested on days 61 and 83. As shown in Table 8 below, plants

TABLE 8

Penner Harvest Data

| Treatment | Day 61 | | Day 83 | | | |
|---|---|---|---|---|---|---|
| | Number of Marketable Fruit per Plot | Marketable Fruit in Pound per Plot | Marketable Number of Fruit per Plot | Marketable Number of Fruit in Pound per Plot | Non-Marketable Fruit per Plot | Non-Marketable Fruit in Pound per Plot |
| 1 Untreated Control | 13 a | 3.25 a | 33.8 a | 10.73 a | 0 b | 0 a |
| 2 Kocide ® 3000 DF Manzate ® Pro-Stik 75DF | 19.3 a | 4.58 a | 40 a | 13.28 a | 2 a | 0.55 a |
| 3 Kocide ® 3000 DF Adjuvant Manzate ® Pro-Stik 75DF | 19.8 a | 4.65 a | 43.8 a | 12.58 a | 0.5 b | 0.18 a |
| 4 Adjuvant | 17.3 a | 2.85 a | 30.3 a | 9.18 a | 0.3 b | 0.18 a |
| 5 Silicon | 12 a | 2.9 a | 26.3 a | 7.38 a | 1 ab | 0.35 a |
| 6 Adjuvant Silicon | 24.5 a | 5.4 a | 38.5 a | 14.63 a | 0.3 b | 0.05 a |
| P-value | 0.5643 | 0.5484 | 0.1299 | 0.086 | 0.0408 | 0.0515 | treated with adjuvant and silicon (Group 6) had the best results for pounds of marketable fruit and the best results for both number of non-marketable fruit and pounds of non-marketable fruit per plot as compared to plants in the untreated control group (Group 1), plants treated with Kocide® 3000 DF and Manzate® Pro-Stik 75DF (Group 2), plants treated with Kocide® 3000 DF, Adjuvant, and Manzate® Pro-Stik 75DF (Group 3), plants treated with adjuvant alone (Group 4), and plants treated with silicon alone (Group 5).

Example 2—Evaluation of Chemical Formulations for Management of Powdery Mildew in Squash Transplanted *Cucurbita pepo* 'Dixie' squash plants were grouped into one of 9 treatment groups. Group 1 was an untreated control; the remaining 8 groups were spray treated with formulations that differed in their chemical compositions (Table 9).

TABLE 9

ANOVA Means Table of Powdery Mildew Disease Severity

| Treatment, Rate, Application code | | | Disease Severity (% leaf covered with powdery mildew) | | | |
|---|---|---|---|---|---|---|
| | | | Day 39 | Day 46 | Day 52 | AUDPC |
| 1 Untreated Control | | | 2.1 | 21.7 a | 19.9 ab | 207 a |
| 2 Rally ® 40WSP | 5 OZ/A | ACE | 1.0 | 3.9 b | 8.5 cd | 54 cd |
| Quintec ® 2SC | 6 OZ/A | BD | | | | |
| 3 Rally ® 40WSP | 5 OZ/A | ACE | 0.1 | 1.3 b | 3.1 cd | 17 d |
| Quintec ® 2SC | 6 OZ/A | BD | | | | |
| Adjuvant | 0.25 FL OZ/GAL | A-E | | | | |
| 4 Rally ® 40WSP | 5 OZ/A | AE | 5.0 | 3.7 b | 14.0 bc | 83 bcd |
| Quintec ® 2SC | 6 OZ/A | C | | | | |

TABLE 9-continued ANOVA Means Table of Powdery Mildew Disease Severity

| | | | | Disease Severity (% leaf covered with powdery mildew) | | | |
|---|---|---|---|---|---|---|---|
| Treatment, Rate, Application code | | | | Day 39 | Day 46 | Day 52 | AUDPC |
| 5 | Rally ® 40WSP | 5 OZ/A | AE | 3.5 | 1.8 b | 2.6 d | 31 d |
| | Quintec ® 2SC | 6 OZ/A | C | | | | |
| | Adjuvant | 0.25 FL OZ/GAL | ACE | | | | |
| 6 | Rally ® 40WSP | 3.333 OZ/A | ACE | 0.3 | 1.4 b | 4.0 cd | 21 d |
| | Quintec ® 2SC | 4 FL OZ/A | BD | | | | |
| 7 | Rally ® 40WSP | 3.333 OZ/A | ACE | 0.7 | 1.1 b | 2.6 d | 17 d |
| | Quintec ® 2SC | 4 FL OZ/A | BD | | | | |
| | Adjuvant | 0.25 FL OZ/GAL | A-E | | | | |
| 8 | Manzate ® | 3 LB/A | A-E | 3.8 | 12.4 ab | 26 a | 171 ab |
| | Pro-Stick 75DF | | | | | | |
| 9 | Manzate ® | 3 LB/A | A-E | 3.9 | 10.2 ab | 19.6 ab | 138 abc |
| | Pro-Stick 75DF | | | | | | |
| | Adjuvant | 0.25 FL OZ/GAL | A-E | | | | |
| LSD P = .05 | | | | 4.43 | 12.25 | 10.95 | 98.007 |
| Standard Deviation | | | | 3.1 | 8.57 | 7.66 | 68.581 |
| Treatment Prob(F) | | | | 0.2003 | 0.0552 | 0.0004 | 0.0019 |

Means followed by the same letter or no letter in a column are not significantly different at P value indicated; applications were conducted on A = Day 24; B = Day 30; C = Day 37; D = Day 44; E = Day 49.
The Adjuvant formulation comprises 95.70 wt % water, 2.00 wt % ACUSOL ® 823, 0.10 wt % PVA (100,000 MW), 0.10 wt % $ZnSO_4$ monohydrate, 0.10 wt % Antifoam ® 8810, and 2.00 wt % TEA.

Plants were treated on days 24, 30, 37, 44, and 49 as indicated in Table 9. Disease severity was evaluated on days 31 and 42 by estimating the percentage of symptomatic foliage.

Fruit was harvested on days 44 and 53. As shown in Table 10 below, plants in Group 6 had increased numbers of marketable fruit per plot and marketable fruit in pound per plot as compared to plants in any other treatment or control group on Day 44.

The control of powdery mildew on squash was measured using different formulations of Rally® and Quintec® with or without adjuvant. The use of 5 oz/gallon of Rally® and 6

TABLE 10

ANOVA Means Table of Squash Harvest

| | | | | Avg # fruit/plant Day 44 | Avg lb/plant Day 44 | Avg # fruit/plant Day 53 | Avg lb/plant Day 53 |
|---|---|---|---|---|---|---|---|
| Treatment, Rate, Application code | | | | | | | |
| 1 | Untreated Contro | | | 3.7 | 1.6 | 1.6 | 0.4 |
| 2 | Rally ® 40WSP | 5 OZ/A | ACE | 3.8 | 2.0 | 1.8 | 0.5 |
| | Quintec ® 2SC | 6 OZ/A | BD | | | | |
| 3 | Rally ® 40WSP | 5 OZ/A | ACE | 2.3 | 1.0 | 1.8 | 0.5 |
| | Quintec ® 2SC | 6 OZ/A | BD | | | | |
| | Adjuvant | 0.25 FL OZ/GAL | A-E | | | | |
| 4 | Rally ® 40WSP | 5 OZ/A | AE | 2.1 | 1.0 | 2.5 | 1.1 |
| | Quintec 2SC | 6 OZ/A | C | | | | |
| 5 | Rally ® 40WSP | 5 OZ/A | AE | 2.9 | 1.4 | 2.2 | 0.8 |
| | Quintec ® 2SC | 6 OZ/A | C | | | | |
| | Adjuvant | 0.25 FL OZ/GAL | ACE | | | | |
| 6 | Rally ® 40WSP | 3.333 OZ/A | ACE | 4.7 | 2.3 | 1.4 | 0.5 |
| | Quintec ® 2SC | 4 FL OZ/A | BD | | | | |
| 7 | Rally 40WSP | 3.333 OZ/A | ACE | 3.1 | 1.7 | 1.4 | 0.4 |
| | Quintec ® 2SC | 4 FL OZ/A | BD | | | | |
| | Adjuvant | 0.25 FL OZ/GAL | A-E | | | | |
| 8 | Manzate ® | 3 LB/A | A-E | 2.9 | 1.3 | 2.0 | 0.8 |
| | Pro-Stick 75DF | | | | | | |
| 9 | Manzate ® | 3 LB/A | A-E | 3.1 | 1.4 | 1.8 | 0.6 |
| | Pro-Stick 75DF | | | | | | |
| | Adjuvant | 0.25 FL OZ/GAL | A-E | | | | |
| LSD P = .05 | | | | 1.439 | 0.982 | 1.396 | 0.522 |
| Standard Deviation | | | | 1.007 | 0.687 | 0.977 | 0.365 |
| Treatment Prob(F) | | | | 0.0376 | 0.3115 | 0.8277 | 0.313 |

Means followed by the same letter or no letter in a column are not significantly different at P value indicated; applications were conducted on A = Day 24; B = Day 30; C = Day 37; D = Day 44; E = Day 49.
The Adjuvant formulation comprises 95.70 wt % water, 2.00 wt % ACUSOL ® 823, 0.10 wt % PVA (100,000 MW), 0.10 wt % $ZnSO_4$ monohydrate, 0.10 wt % Antifoam ® 8810, and 2.00 wt % TEA.

oz/gallon of Quintec® alone or in combination with 0.25 oz/gallon of adjuvant was measured. The addition of weekly applications of Rally® and Quintec® produced an effective 35% reduction in the % of leaf covered with powdery mildew compared to the control. A 14 day application interval with the addition of adjuvant outperformed the fungicides alone at an approximate 30% reduction compared to control. Fungicide rates were reduced by 33% with the addition of adjuvant gave control superior to full label rates by 30% of leaf covered with powdery mildew compared to control.

Materials and Methods for Example 3

Experimental Locations.

Field studies were conducted at the University of Florida, Southwest Florida Research and Education Center ("SWFREC"), Immokalee, Fla. The site was Adams Ranch Block #1 containing three year old grapefruit trees.

Treatment Application.

Each treatment formulation was spray applied using grower equipment to ditch and center sides of the trees.

Data Collection and Analysis.

For each trial, leaves were selected for uniform size and location around individual trees. Approximately ten leaves were collected in a plastic bag from a single tree. Leaves were placed on ice and transported to the lab at SWFREC, Immokalee. Leaves were then washed three times serially in deionized water. A hole punch was used to remove tissue near the center vein from several leaves and a total of 1 gram tissue was combined and placed into an Eppendorf tube and lyophilized overnight. A commercial ELISA kit (Oxytetracycline ELISA Test Kit, Bioo Sientific Corp, Austin, Tex.) for detecting oxytetracycline from various foodstuff was adapted and used for this test using manufacturer's kit instructions. Each sample was run in duplicate and the ELISA plate contained the appropriate positive and negative controls as supplied within kit. Results were read in an ELISA plate reader.

Example 3—Detection of Oxytetracycline Following Spray Applications to Citrus Leaves Each treatment formulation was spray applied on Day 0. The experimental design was a randomized block with four replications. An entire row of trees served as the replication and applications were made to both (ditch and center) sides of the trees. Treatment formulations are shown in Table 11 below. Forty-eight hours after treatment, leaves were collected from trees. Within each repetition, three trees were collected for a total of 12 trees from each treatment group. Three trees within a row (repetition) were selected based upon fairly uniform tree health and location near the east, middle, and west sections of row. As shown in Table 11, leaves from trees in Group 2 (Mycoshield®+Adjuvant) had greater levels of oxytetracycline uptake compared leaves collected from trees in Group 1 (Mycoshield® alone) and Group 3 (Mycoshield®+ Spread® R).

TABLE 11

Oxytetracycline in Citrus Leaf Measurements

| Treatment Groups | | | Repetition | | | | Oxytetracycline present in leaf |
|---|---|---|---|---|---|---|---|
| Group | Treatment | Application Rate | 1 | 2 | 3 | 4 | Day 2 |
| 1 | Mycoshield ® | 4 lb/A | R-3 | R-17 | R-32 | R-44 | 1.05 ppm |
| 2 | Mycoshield ®<br>Adjuvant[x] | 4 lb/A<br>0.25 oz/gal | R-8 | R-28 | R-40 | R-60 | 1.17 ppm |
| 3 | Mycoshield ®<br>Spread ® R | 4 lb/A<br>8 oz/A | R-13 | R-24 | R-36 | R-56 | 1.10 ppm |
| 4 | Untreated control | | Outside Rows | Outside Rows | Outside Rows | Outside Rows | 0.02 ppm |

[x]The Adjuvant formulation comprises 95.70 wt % water, 2.00 wt % ACUSOL ® 823, 0.10 wt % PVA (100,000 MW), 0.10 wt % $ZnSO_4$ monohydrate, 0.10 wt % Antifoam ® 8810, and 2.00 wt % TEA.

The results in Example 3 demonstrate that the use of Mycoshield® in combination with the adjuvant composition of the present application induced roughly 11.5% more "leaf-uptake" of oxytetracycline than when Mycoshield® was applied in the absence of adjuvant and roughly 7% more "leaf-uptake" of oxytetracycline than when Mycoshield® was applied in combination with Spread®R. These results suggest that the adjuvant composition of the present application may enhance the delivery of plant treatment chemicals.

Example 4—Enhanced Herbicide Reduction Test on Woody Shrubs and Mixed Grasses

Plant treatment chemical formulations comprising the herbicides imazapyr and triclopyr were aerially applied to a fenced field of woody shrubs and mixed grasses. The fields either received an herbicide formulation or an adjuvant enhanced herbicide formulation comprising full-strength herbicide volume, 30% reduced herbicide volume, or 30% reduced herbicide volume. Three months post application, woody shrubs sprayed with enhanced herbicide formulations (full strength, 30% reduced, and 15% reduced strength) demonstrated faster reactions to the applied herbicides, even at reduced herbicide volumes, when compared to plants sprayed with the customary herbicide mixture without adjuvant (FIGS. 2A-2H). Imazapyr normally requires 2-5 months to begin to see an effect on grassy plants. On Day 83, mixed grasses treated with adjuvant formulations showed yellowing and degradation. This efficacy and speed of action in both woody shrubs and mixed grasses is attributed to the polymers within the adjuvant composition (FIGS. 2A-2H).

The results of Example 4 demonstrate that the use of an adjuvant in combination with an herbicide formulation at full strength and at reduced strength provided a more rapid response to the applied herbicide.

Example 5—Evaluation of Fungicides to Control Multiple Diseases in Annual Strawberry On Day 0, *Fragaria* x *ananassa* 'Strawberry Festival' runner plants from Canada were transplanted into methyl bromide:chloropicrin (50:50) fumigated soil in plastic-mulched, raised beds. Transplants were irrigated by overhead sprinklers for 10 days to aid establishment, then irrigated and fertilized through drip tape. The beds were 28-in. wide on 4-ft centers. Each bed contained two staggered rows of plants spaced 15-in. apart within rows and 12-in. between rows. Treatments were arranged in a randomized complete block design with four blocks, each in a separate bed. Fungicide applications were made weekly from Day 67 to Day 162 (15 applications) using a $CO_2$ backpack sprayer calibrated to deliver 100 gal/A at 40 psi through a boom with two TeeJet hollow-cone nozzles spaced 12 in. apart. Experimental products were applied alone, in tank mixes, or in blocking programs with other products. Fruit were harvested twice weekly from Day 92 through Day 172 (24 harvests). Marketable fruit were counted and weighed to determine yield. Small fruit weighing less than 10 g, anthracnose (*Colletotrichum acutatum*) and *Botrytis* diseased fruit, and other unmarketable fruit were also counted. Disease incidence expressed as a percentage of the total number of marketable and unmarketable fruit. Angular leaf spot (ALS; *Xanthomonas fragariae*) severity was determined in selected treatments at the end of the season by examining six central plants per plot. The number of leaves killed or partially blighted by ALS was expressed as a percentage of the total number of leaves per plant. Experimental variables were analyzed by two-way ANOVA.

Unusually dry weather during the bloom period (weeks 6-9) and later in the season (weeks 10-15) contributed to low fruit rot incidence this season. *Botrytis* fruit rot was less than 1.0% in all treatments. The incidence of anthracnose fruit rot was low and all treatments reduced anthracnose incidence except Actinovate® alone and Free-Flow® soil drench alone. However, none of the treatments provided better control of anthracnose than a standard captan only treatment or a standard treatment consisting of Captevate® alternated with Switch during bloom followed by late season applications of Abound® alternated with captan (Table 12). ALS severity was high due to frequent

TABLE 12

Strawberry Disease Severity

| Treatment (products and rates/A)[z] | Schedule (wk)[y] | ALS severity (%)[x] | AFR incidence (%)[x] | Yield (lb/A) |
|---|---|---|---|---|
| Captan ® 80WDG (1.5 lb) early | 1-5 | 41.0 abc | 0.3 a | 26,400 a |
| Captan ® 80WDG (3.0 lb) bloom and late | 6-15 | | | |
| Thiram ® Granuflo (2.0 lb) | 1-15 | — | 0.3 a | 26,300 a |
| Captan ® 80WDG (1.5 lb) early | 1-5 | — | 0.4 a | 25,700 abc |
| Thiram ® Granuflo 75WDG (3.4 lb) bloom | 6-9 | | | |
| Captan ® 80WDG (3.0 lb) late | 10-15 | | | |
| Captan ® 80WDG (1.5 lb) early | 1-5 | 42.0 a-d | 0.4 a | 25,600 abc |
| Captevate ® 68WDG (4.38 lb) alt Switch 62.5WG (14 oz) bloom | 6-9 | | | |
| Abound ® 2.08F (15.4 fl oz) alt Captan 80WDG (3.0 lb) late | 10-15 | | | |
| Captan ® 80WDG (1.5 lb) early | 1-5 | 48.3e | 0.3 a | 25,000 abc |
| Captevate ® 68WDG (4.38 lb) alt Switch 62.5WG (14 oz) bloom | 6-9 | | | |
| Evito ® 480SC (5.0 fl oz) + Induce adjuvant (0.25%) | 10, 12, 14 | | | |
| Captan ® 80WDG (3.0 lb) late | 11, 13, 15 | | | |
| Cabrio ® EG (14 oz) | 1, 3, 6, 8 | — | 0.6 ab | 26,300 a[w] |
| Captevate ® 68WDG (4.38 lb) | 7, 9 | | | |
| Captan ® 80WDG (3.0 lb) | 2, 4, 5, 11-15 | | | |
| Capta®n 80WDG (1.5 lb) early | 1-5 | — | 0.4 a[w] | 25,000 abc |
| Cabrio ® EG (14 oz) alt Captevate 68WDG (4.38 lb) bloom | 6-10 | | | |
| Captan ® 80WDG (3.0 lb) late | 11-15 | | | |
| Captan ® 80WDG (1.5 lb) early | 1-5 | — | 0.2 a | 23,400 cd |
| Scala ® (18 fl oz) bloom | 6-9 | | | |
| Flint ® 50WG (3 oz) late | 12-15 | | | |
| Captan ® 80WDG (1.5 lb) early | 1-5 | — | 0.5 ab | 24,400 abc |
| Captevate ® 68WDG (4.38 lb) alt Scala (18 fl oz) bloom | 6-9 | | | |
| Flint ® 50WG (3 oz) alt Captan 80WDG (3.0 lb) late | 10-15 | | | |
| Captan ® 80WDG (1.5 lb) early | 1-5 | — | 0.4 a | 26,400 a |
| Captevate ® 68WDG (4.38 lb) bloom | 6, 8 | | | |
| Scala ® (18 fl oz) + Captan 80WDG (1.5 lb) bloom | 7, 9 | | | |
| Flint ® 50WG (3.0 oz) alt Captan 80WDG (3.0 lb) late | 10-15 | | | |
| Actinovate ® (6 oz) + Induce ® adjuvant (1.0 pt) | 1-15 | 46.8 cde | 1.8 bc | 21,800 d |
| Actinovate ® (12 oz) + Induce ® adjuvant (1.0 pt) | 1-15 | 44.4 bcd | 1.0 abc | 23,500 bcd |

TABLE 12-continued

Strawberry Disease Severity

| Treatment (products and rates/A)$^z$ | Schedule (wk)$^y$ | ALS severity (%)$^x$ | AFR incidence (%)$^x$ | Yield (lb/A) |
|---|---|---|---|---|
| Actinovate ® (6 oz) + Captan 80WDG (1.5 lb) early | 1-5 | 39.4 ab | 0.4 a | 26,600 a |
| Actinovate ® (12 oz) + Captan 80WDG (3.0 lb) bloom and late | 6-15 | | | |
| MOI-106 (0.5% = 2 qt) early | 1-5 | 47.4 de | 0.3 a | 25,300 abc |
| MOI-106 (2 qt) + Captevate ® 68WDG (4.38 lb) bloom | 6-9 | | | |
| Abound (15.4 oz) alt MOI-106 (2 qt) late | 10-15 | | | |
| Adjuvant (1:250 w:v) + Captan 80WDG (1.0 lb) early | 1-5 | 38.1 a | 0.8 ab | 26,000 abc |
| Captevate ® 68WDG (2.9 lb) alt Switch ® 62.5WG (9.3 oz) bloom$^v$ | 6-9 | | | |
| Abound ® 2.08F (10.3 fl oz) alt Captan ® (2.0 lb) late | 10-15 | | | |
| Free-Flow ™ bacterial soil drench | 1-15 | 36.5 a | 2.3 cd | 24,700 abc |
| Free-Flow ™ bacterial soil drench | 1-15 | — | 0.6 ab | 25,100 abc |
| Captan ® 80WDG (3.0 lb) | 1-15 | | | |
| Nontreated control | — | 36.9 a | 2.3 cd | 23,600 bcd |

$^z$Tank mixes of products indicated by plus "+" signs; alternations of products indicated by "alt".
$^y$Week of application a series of 15 weekly applications.
$^x$ALS = angular leaf spot; AFR = anthracnose fruit rot.
$^w$Means within a column followed by the same letter are not significantly different by Fisher's protected LSD test (P ≤ 0.05).
$^v$All fungicides in this treatment were tank mixed with adjuvant at 1:250 w:v of final solution. The adjuvant formulation comprised 95.70 wt % water, 2.00 wt % ACUSOL ® 823, 0.10 wt % PVA (100,000 MW), 0.10 wt % ZnSO$_4$ monohydrate, 0.10 wt % Antifoam ® 8810, and 2.00 wt % TEA.

overhead irrigation for freeze protection. ALS was not reduced by any of the treatments and actually was increased by MOI-10$^6$ and treatments containing Induce® adjuvant. Several treatments increased marketable yield relative the non-treated control, but no treatment significantly increased marketable yield compared to the standards. Treatment with Actinovate® plus Induce®, and Scala® at bloom followed by Flint produced lower marketable yields than the standard captan treatment. Marketable yield and anthracnose incidence in the adjuvant treatment was similar to the corresponding standard treatment, but with one-third less of each fungicide.

Figure 1A:
Figure 1B:
Figure 2A:
Figure 2B:
Figure 2C:
Figure 2D:
Figure 2E:
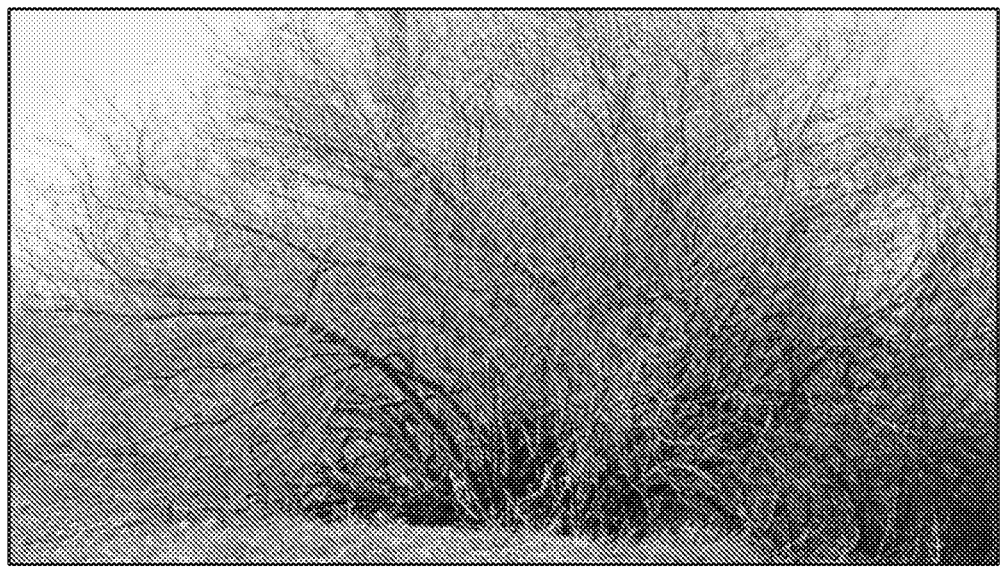
Figure 2F:
Figure 2G:
Figure 2H:
Figure 3:
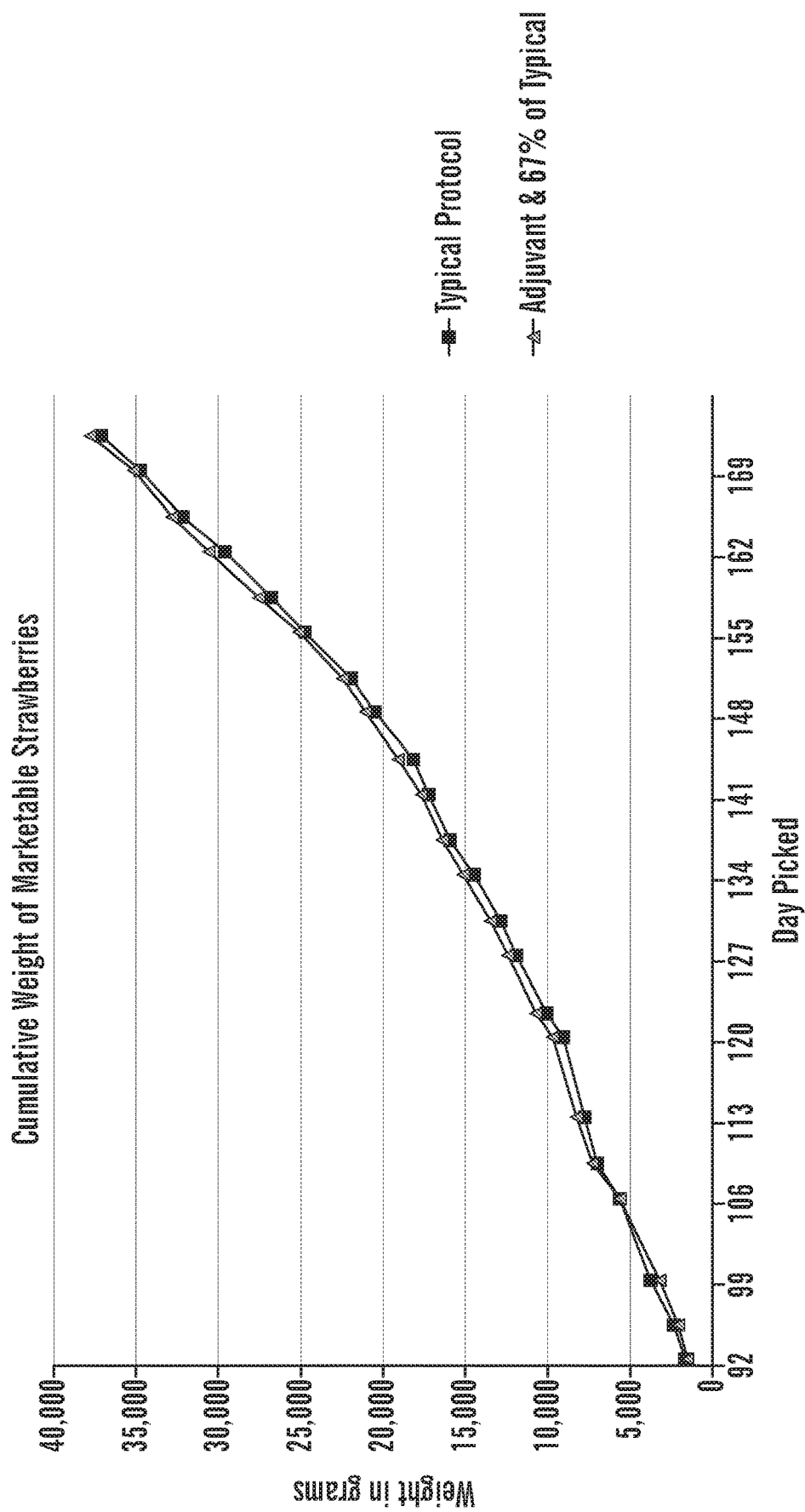
FIG. 3 is a graph comparing the cumulative weight of marketable strawberries harvested from plants treated with a typical protocol and an adjuvant enhanced protocol comprising adjuvant and 67% of the typical products.

Example 5 shows that the use of plant treatment chemical formulations comprising ⅓ less than the typical spray protocol of a pesticide and in the presence of adjuvant resulted in slightly higher yields (approximately 2% more marketable fruit) and no significant difference in disease control (FIG. 3). In addition to a more rapid response, there is more complete desiccation and mortality of the target weeds and brush. The adjuvant enables commercial control of hard to control weeds and brush at rate reductions of 15% and 30%.

Example 6—Tomato Growth Chamber Assay

Chemical treatments were applied to 18 five week-old tomato plants using a hand-held sprayer and allowed to air dry completely. Nine additional plants were included as a non-treated control. After the chemical treatments dried, the plants in each treatment were split into two groups of nine for a wash and no-wash group. The no-wash group was set aside. To test for rain-fastness, individual plants in the wash group were completely dipped 4 times at 1 second intervals in separate 5 gal volumes of water with a continuous flow to exchange water. After the wash group dried, plants in both groups and all treatments were arranged in a completely randomized design and inoculated with a spray application of a 1×106 cfu/ml suspension of X. perforans. Plants were allowed to air dry following inoculation before being incubated at 25° C. with 100% relative humidity for 48 hrs and then further maintained at 25° C. with 65% RH for another 4-6 days to encourage infection and symptom development. Disease severity was assessed as the total number of leaf lesions per cm$^2$ leaf area as measured with a LICOR leaf meter.

The inoculation procedure led to excellent disease pressure that ranged from 6.9 to 60.9 lesions per cm$^2$ leaf area. There was a significant difference among treatments with a P value less than 0.0001 for the experiment. Adjuvant alone with and without washing statistically reduced bacterial spot relative to the non-treated control (Table 13). While not significant, higher copper rates equated to better bacterial spot

TABLE 13

Effect of PDS on rain-fastness of Cuprofix (copper sulfate) and the severity of bacterial leaf spot (BLS) caused by Xanthomonas perforans.

| Treatments: | BLS lesions/cm$^2$ leaf area: Non-washed plants | Washed plants |
|---|---|---|
| Adjuvant* (250:1) | 45.8 (35.5-56.2) | 36.9 (26.6-47.3) |
| Adjuvant* (250:1) + Cuprofix (3 lbs/A) | 8.2 (0-18.5) | 18.3 (8.0-28.7) |
| Adjuvant* (250:1) + Cuprofix (1.5 lbs/A) | 10.7 (0.3-21) | 21.9 (11.5-32.2) |
| Cuprofix (3 lbs/A) | 6.9 (0-17.3) | 23.7 (13.3-34.1) |
| Cuprofix (1.5 lbs/A) | 8.8 (0-19.2) | 23.9 (13.5-34.3) |
| Control | 60.9 (50.5-71.2) | |
| | P > F < 0.0001 | |

*The Adjuvant formulation comprises 95.70 wt % water, 2.00 wt % ACUSOL ® 823, 0.10 wt % PVA (100,000 MW), 0.10 wt % ZnSO$_4$ monohydrate, 0.10 wt % Antifoam ® 8810, and 2.00 wt % TEA suppression as measured by a reduction in lesions per leaf area. Significant differences were observed among washed and non-washed treatments for copper treatments. Adjuvant did not have a significant effect on bacterial spot in copper treatments, regardless if the leaves were washed or not. However, both copper rates with Adjuvant did numerically better than copper alone in the wash treatments. Over time, this difference could potentially be amplified under field conditions.

The adjuvant did not have a significant effect on bacterial spot in copper treatments, regardless if the leaves were washed or not. However, both copper rates with adjuvant did numerically better than copper alone in the wash treatments. Over time, this difference could potentially be amplified under field conditions.

Example 7—Citrus Disease Field Tests

Adjuvant was incorporated in the spraying program for approximately 70% of the grapefruit and orange acreage managed by a single grower in the Vero Beach/Fort Pierce area. In addition, side-by-side field spray tests were conducted using adjuvant with Glyphosate. Adjuvant was added to the normal spray program for roughly 1,485 out of the total 2,105 acres (70%) involved in the trial. Spraying activities in all areas of the groves were identical in all aspects other than the use of adjuvant (ie., Equipment used, personnel, what was sprayed, when sprayed, etc.). The differences seen from the adjuvant-treated fruit, compared to the non-adjuvant-treated fruit include: (i) a significant improvement in the control of Canker, Melanose, Leafminer, and Alternaria; (ii) the ability of adjuvant formulations to keep spray products on the fruity and leaves longer allowing for the grower to go longer between sprays and/or cutback on some of the products used (ex. Copper); and (iii) approximately 20% higher yields from adjuvant-treated fruit trees (Table 14).

TABLE 14

Harvested Citrus Fruit Yield

| Harvest No. | Fruit Yield with Adjuvant* Treatment | Fruit Yield without Adjuvant Treatment |
|---|---|---|
| 1 | 90% | 65% |
| 2 | 88% | 68% |
| 3 | 87% | 64% |

*The Adjuvant formulation comprises 95.70 wt % water 2.00 wt % ACUSOL ® 823, 0.10 wt % PVA (100,000 MW), 0.10 wt % ZnSO4 monohydrate, 0.10 wt % Antifoam ® 8810, and 2.00 wt % TEA.

Side-by-side field tests were conducted using adjuvant with different dilutions of Glyphosate. Varying levels of Glyphosate were sprayed and observed starting from the typical dilution rate and comparing that to 5 lesser levels ranging from 89% down to 44% of the base. Based upon 16 weeks of observation and the "kill" results, it appears that using adjuvant allows the grower to reduce the amount of Glyphosate material by 50% going forward (which is significant considering the recent doubling of the cost for Glyphosate materials to the growers).

Materials and Methods for Example 8

Experimental Design.

The experimental design involves the application of the various treatments specified in Table 15. Fungicides were applied 8 times in 10 day intervals, whereas protectant treatments were applied 12 times in 5 day intervals. Each treatment group comprised an individual plot of banana plants. Trials were performed in triplicate.

Oil Amounts Applied in Each of the Treatments.

The amount of oil applied during each of the treatments is shown in Table 16.

TABLE 15

Treatment Groups

| Trt No. | Type | Treatment Name | | Form Conc | Form Unit | Form Type | Rate l/ha | Rate g ai/ha | Dif ai | % | No Appl |
|---|---|---|---|---|---|---|---|---|---|---|---|
| 1 | CHK | Untreated Check | | | | | | | | | |
| 2 | ADJ | Spraytex M 100% S.L | Mineral oil | 100 | % | SL | 5 | 5000 | | | 8 |
|  | ADJ | IMBIREX CR 80 SL | 'Alcohol Graso Etoxilado | 800 | GA/L | SL | 0.05 | 40 | | | 8 |
| 3 | FUNG | Volley 88 OL | Fenpropimorf | 880 | GA/L | OL | 0.7 | 616 | | | 8 |
|  | FUNG | BANAZEB 60 SC | mancozeb | 600 | GA/L | SC | 2 | 1200 | | | 8 |
|  | ADJ* | Adjuvant | Acrylic Polymer Sosium Salt | 6 | % | SL | 0.1 | 6 | 6 | | 8 |
|  | ADJ | IMBIREX CR 80 SL | Alcohol Graso Etoxilado | 800 | GA/L | SL | 0.05 | 40 | | | 8 |
|  | ADJ | Spraytex M 100% S.L | Mineral oil | 100 | % | SL | 5 | 5000 | 2500 | 50 | 8 |
| 4 | FUNG | Volley 88 OL | Fenpropimorf | 880 | GA/L | OL | 0.7 | 616 | | | 8 |
|  | FUNG | BANAZEB 60 SC | mancozeb | 600 | GA/L | SC | 2 | 1200 | | | 8 |
|  | ADJ | IMBIREX CR 80 SL | Alcohol Graso Etoxilado | 800 | GA/L | SL | 0.05 | 40 | | | 8 |
|  | ADJ | Spraytex M 100% S.L | Mineral oil | 100 | % | SL | 5 | 5000 | 2500 | 50 | 8 |
| 5 | FUNG | Volley 88 OL | Fenpropimorf | 880 | GA/L | OL | 0.7 | 616 | | | 8 |
|  | FUNG | BANAZEB 60 SC | mancozeb | 600 | GA/L | SC | 2 | 1200 | | | 8 |
|  | ADJ* | Adjuvant | Acrylic Polymer Sosium Salt | 6 | % | SL | 0.1 | 6 | 6 | | 8 |
|  | ADJ | IMBIREX CR 80 SL | Alcohol Graso Etoxilado | 800 | GA/L | SL | 0.025 | 20 | | | 8 |
|  | ADJ | Spraytex M 100% S.L | Aceite de Petroleo | 100 | % | SL | 2.5 | 2500 | | | 8 |
| 6 | FUNG | BANAZEB 60 SC | mancozeb | 600 | GA/L | SC | 1.5 | 900 | | | 12 |
|  | ADJ* | Adjuvant | Acrylic Polymer Sosium Salt | 6 | % | SL | 0.1 | 6 | 6 | | 12 |
| 7 | FUNG | BANAZEB 60 SC | mancozeb | 600 | GA/L | SC | 2 | 1200 | 300 | 33 | 12 |
| 8 | FUNG | Volley 88 OL | Fenpropimorf | 880 | GA/L | OL | 0.5 | 440 | | | 8 |
|  | ADJ* | Adjuvant | Acrylic Polymer Sosium Salt | 6 | % | SL | 0.1 | 6 | 6 | | 8 |
|  | ADJ | IMBIREX CR 80 SL | Alcohol Graso Etoxilado | 800 | GA/L | SL | 0.05 | 40 | | | 8 |
|  | ADJ | Spraytex M 100% S.L | Mineral oil | 100 | % | SL | 5 | 5000 | | | 8 |
| 9 | FUNG | Volley 88 OL | Fenpropimorf | 880 | GA/L | OL | 0.7 | 616 | 176 | 40 | 8 |
|  | ADJ | IMBIREX CR 80 SL | Alcohol Graso Etoxilado | 800 | GA/L | SL | 0.05 | 40 | | | 8 |
|  | ADJ | Spraytex M 100% S.L | Mineral oil | 100 | % | SL | 5 | 5000 | | | 8 |

*The Adjuvant formulation comprises 95.70 wt % water, 2.00 wt % ACUSOL 823, 0.10 wt % PVA (100,000 MW), 0.10 wt % ZnSO4 monohydrate, 0.10 wt % Antifoam 8810, and 2.00 wt % TEA.

TABLE 16

| Untreated Check | Banazeb rate | Fungicide No Appl | Spraytex Oil QT liter | Banazeb Oil QT liter | Total Oil | Dif with treatment with less oil |
|---|---|---|---|---|---|---|
| Mineral oil | | 8 | 40 | | 40.0 | 30.46 |
| Volley 88 OL + Banazeb 60 SC + Adjuvant* + Spraytex | 2 | 8 | 40 | 8.48 | 48.5 | 38.94 |
| Volley 88 OL + Banazeb 60 SC + Spraytex | 2 | 8 | 40 | 8.48 | 48.5 | 38.94 |
| Volley 88 OL + Banazeb 60 SC + Adjuvant + Spraytex | 2 | 8 | 20 | 8.48 | 28.5 | 18.94 |
| Banazeb 60 SC + Adjuvant* | 1.5 | 12 | | 9.54 | 9.5 | 0 |
| Banazeb | 2 | 12 | | 12.72 | 12.7 | 3.18 |
| Volley 88 OL + Adjuvant* + Spraytex | | 8 | 40 | | 40.0 | 30.46 |
| Volley 88 OL + Spraytex | | 8 | 40 | | 40.0 | 30.46 |

*The Adjuvant formulation comprises 95.70 wt % water, 2.00 wt % ACUSOL ® 823, 0.10 wt % PVA (100,000 MW), 0.10 wt % $ZnSO_4$ monohydrate, 0.10 wt % Antifoam ® 8810, and 2.00 wt % TEA.

Equipment and Weather Conditions During the Applications.

Treatments were applied to banana trees as shown in Tables 17 and 18. Climate conditions during

TABLE 17

Treatment Applications

| | Number of Application | | | | | | |
|---|---|---|---|---|---|---|---|
| | 1 | 2 | 3 | 4 | 5 | 6 | 7 |
| Application Date: | Day 0 | Day 5 | Day 10 | Day 15 | Day 20 | Day 25 | Day 30 |
| App. Start Time: | 6:30 a.m. | 7:00 a.m. | 6:20 a.m. | 6:40 a.m. | 7:00 a.m. | 7:15 a.m. | 7:30 a.m. |
| Appl. Stop Time: | 7:25 a.m. | 7:20 a.m. | 7:45 a.m. | 7:05 a.m. | 7:20 a.m. | 7:30 a.m. | 8:30 a.m. |
| Application Method: | SPRAY | SPRAY | SPRAY | SPRAY | SPRAY | SPRAY | SPRAY |
| Application Placement: | FOLIAR | FOLIAR | FOLIAR | FOLIAR | FOLIAR | FOLIAR | FOLIAR |
| Applied By: | J. G. Cubillo | J. G. Cubillo | J. G. Cubillo | J. G. Cubillo | J. G. Cubillo | J. G. Cubillo | J. G. Cubillo |
| Air Temperature, Unit: | 26 | 26 | 25.6 | 26.2 | 26 | 26 | 26 |
| % Relative Humidity: | 90 | 90 | 92 | 90 | 89 | 90 | 89 |
| Wind Velocity, KPH: | 0 | 0 | 0 | 0 | 0 | 0 | 0 |
| Appl. Equipment: | Solo Port423 | Solo Port423 | Solo Port423 | Solo Port423 | Solo Port423 | Solo Port423 | Solo Port423 |
| Equipment Type: | backpack | backpack | backpack | backpack | backpack | backpack | backpack |
| Nozzle Type: | Micronair | Micronair | Micronair | Micronair | Micronair | Micronair | Micronair |
| Nozzle Size: | AU 8000 | AU 8000 | AU 8000 | AU 8000 | AU 8000 | AU 8000 | AU 8000 |
| Nozzle Calibration, ml/min: | 150 | 150 | 150 | 150 | 150 | 150 | 150 |
| Time to Treat 1 Plot, SEC: | 45 | 45 | 45 | 45 | 45 | 45 | 45 |

TABLE 18

Treatment Applications

| | Number of Application | | | | | | |
|---|---|---|---|---|---|---|---|
| | 8 | 9 | 10 | 11 | 12 | 13 | 14 |
| Application Date: | Day 35 | Day 40 | Day 45 | Day 50 | Day 55 | Day 60 | Day 70 |
| App. Start Time: | 7:15 a.m. | 7:15 a.m. | 7:00 a.m. | 6:20 a.m. | 6:25 a.m. | 7:20 a.m. | 7:15 a.m. |
| Appl. Stop Time: | 7:30 a.m. | 8:00 a.m. | 7:20 a.m. | 7:45 a.m. | 7:45 a.m. | 7:55 a.m. | 8:20 a.m. |
| Application Method: | SPRAY | SPRAY | SPRAY | SPRAY | SPRAY | SPRAY | SPRAY |
| Application Placement: | FOLIAR | FOLIAR | FOLIAR | FOLIAR | FOLIAR | FOLIAR | FOLIAR |
| Applied By: | J. G. Cubillo | J. G. Cubillo | J. G. Cubillo | J. G. Cubillo | J. G. Cubillo | J. G. Cubillo | J. G. Cubillo |
| Air Temperature, Unit: | 26.2 | 24.7 | 26.1 | 25.9 | 26 | 26.3 | 26 |
| % Relative Humidity: | 90 | 82 | 90 | 90 | 95 | 90 | 92 |
| Wind Velocity, KPH: | 0 | 0 | 0 | 0 | 0 | 0 | 0 |
| Appl. Equipment: | Solo Port423 | Solo Port423 | Solo Port423 | Solo Port423 | Solo Port423 | Solo Port423 | Solo Port423 |
| Equipment Type: | backpack | backpack | backpack | backpack | backpack | backpack | backpack |

TABLE 18-continued

Figure 4:
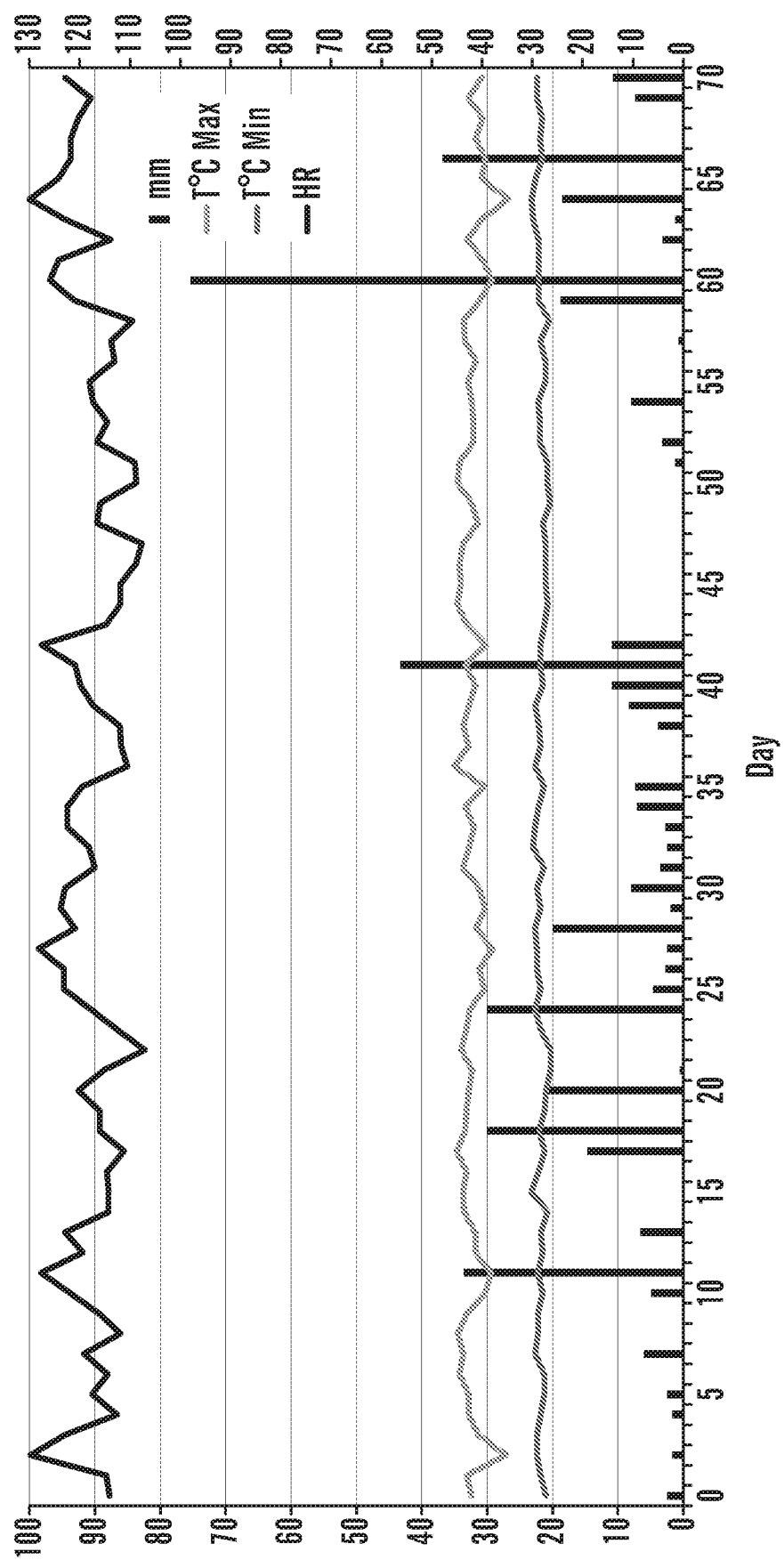
FIG. 4 shows the climate conditions during the performance of field tests.

| | Treatment Applications | | | | | | |
|---|---|---|---|---|---|---|---|
| | Number of Application | | | | | | |
| | 8 | 9 | 10 | 11 | 12 | 13 | 14 |
| Nozzle Type: | Micronair | Micronair | Micronair | Micronair | Micronair | Micronair | Micronair |
| Nozzle Size: | AU 8000 | AU 8000 | AU 8000 | AU 8000 | AU 8000 | AU 8000 | AU 8000 |
| Nozzle Calibration, ml/min: | 150 | 150 | 150 | 150 | 150 | 150 | 150 |
| Time to Treat 1 Plot, SEC: | 45 | 45 | 45 | 45 | 45 | 45 | 45 | the field tests were as shown in FIG. 4.

Data Collection and Analysis.

The youngest leaves with infection (YLI), youngest leaves with spot (YLS), infection index, and total leaf numbers were evaluated every 15 days. Analysis was performed using an analysis under the curve of the variable.

Example 8—Banana Field Trials

Banana trees were treated with various plant treatment formulations, as described in Table 18. Throughout the field trial, trees were evaluated for the total leaves (FIG. 5A), youngest leaves with infection (FIG. 5B), and youngest leaves with spot (FIG. 5C). The distribution of the treatments over time is shown in FIGS. 6A-6B. FIG. 7A shows the control of Black Sigatoka (*Mycosphaerella fijiensis*) in banana plants treated with various chemical formulations (Table 19).

TABLE 19

| Control of Black Sigatoka | | | | | | | |
|---|---|---|---|---|---|---|---|
| Rating Date | | | Day 0 | Day 15 | Day 30 | Day 45 | Day 60 | Day75 |
| Rating Timing | | | A0 | A1 | A2 | A3 | A4 | A5 |
| Days After First/Last Application | | | 0 0 | 15 5 | 30 5 | 45 5 | 60 5 | 75 5 |
| Trt-Eval Interval | | | 0 | 15 | 15 | 15 | 15 | 15 |
| Treatment | Rate | Unit | Code | | | | | |
| Untreated Check | | | | 18.53 a | 40.77 a | 54.00 a | 50.30 a | 60.20 a | 59.33 a |
| Spraytex/IMBIREX | 5/0.05 | l/ha | 8 | 12.60 a | 31.27 cd | 41.50 bc | 44.33 ab | 48.20 b | 49.37 b |
| Volley/BANAZEB/Adjuvant*/IMBIREX/Spraytex | 0.7/2/0.1/0.05/5 | l/ha | 8 | 13.70 a | 27.93 d | 34.00 d | 35.23 cd | 33.30 e | 36.47 d |
| Volley/BANAZEB/IMBIREX/Spraytex | 0.7/2/0.05/5 | l/ha | 8 | 18.17 a | 30.30 cd | 33.93 d | 34.67 d | 36.77 de | 33.63 d |
| Volley/BANAZEB/Adjuvant*/IMIREX/Spraytex | 0.7/2/0.1/0.025/2.5 | l/ha | 8 | 11.77 a | 27.90 d | 36.07 d | 34.77 d | 33.03 e | 33.73 d |
| BANAZEB/Adjuvant | 1.5/0.1 | l/ha | 12 | 14.47 a | 34.20 bc | 44.40 b | 37.77 bcd | 34.10 e | 37.50 cd |
| BANAZEB 60 SC | 2 | l/ha | 12 | 14.10 a | 36.83 ab | 43.97 b | 34.53 d | 32.37 e | 34.13 d |
| Volley/Adjuvant*/IMBIREX/Spraytex | 0.5/0.1/0.05/5 | l/ha | 8 | 12.97 a | 30.80 cd | 41.43 bc | 43.20 abc | 46.17 bc | 48.33 b |
| Volley/IMBIREX/Spraytex | 0.7/0.05/5 | l/ha | 8 | 13.33 a | 32.60 bc | 37.07 cd | 39.90 bcd | 40.57 cd | 43.87 bc |
| | LSD P = .05 | | | 4.774 | 4.307 | 4.656 | 8.278 | 5.668 | 7.084 |
| | Standard Deviation | | | 2.783 | 2.51 | 2.714 | 4.825 | 3.304 | 4.129 |
| | CV | | | 19.32 | 7.72 | 6.69 | 12.24 | 8.15 | 9.87 |

Means followed by same letter do not significantly differ (P = 0.5, LSD)

*The Adjuvant formulation comprises 95.70 wt % water, 2.00 wt % ACUSOL ® 823, 0.10 wt % PVA (100,000 MW), 0.10 wt % $ZnSO_4$ monohydrate, 0.10 wt % Antifoam ® 8810, and 2.00 wt % TEA.

Control of Black Sigatoka in each treatment group is shown in FIG. 7B. The analysis of variance and mean separation of infection index (II), YLI, YLS, and total leaves (HT) for each fungicide treatment is shown in Table 20.

TABLE 20

Means Table

| Treatment | II | YLI | YLS | HT |
|---|---|---|---|---|
| Untreated Check | 3663.00 e | 254 a | 315 a | 650 a |
| Mineral oil | 2943.67 d | 295 b | 360 b | 720 bcd |
| Volley 88 OL + Banazeb 60 SC + Adjuvant* + Spraytex | 2332.67 a | 321 c | 407 d | 754 cd |
| Volley 88 OL +Banazeb 60 SC + Spraytex | 2422.67 ab | 322 c | 402 d | 755 d |
| Volley 88 OL + Banazeb 60 SC + Adjuvant* + Spraytex | 2302.67 a | 323 c | 396 cd | 736 cd |
| Banazeb 60 SC + Adjuvant* | 2647.33 bcd | 312 be | 388 cd | 714 bc |
| Banazeb | 2577.67 abc | 321 c | 377 bc | 686 ab |
| Volley 88 OL + Adjuvant* + Spraytex | 2884.33 cd | 292 b | 359 b | 730 cd |
| Volley 88 OL + Spraytex | 2682.00 bcd | 296 b | 378 bc | 742 cd |

Means in the same column with the same letter are not significantly different (p > 0.01) Test: Fisher LSD alpha = 0.01
*The Adjuvant formulation comprises 95.70 wt % water, 2.00 wt % ACUSOL ® 823, 0.10 wt % PVA (100,000 MW), 0.10 wt % ZnSO$_4$ monohydrate, 0.10 wt % Antifoam ® 8810, and 2.00 wt % TEA.

FIG. 8 shows banana plants 75 days after the first application, 20 days after last protectant fungicide application, and 5 days after the last systemic fungicide application. The effect of treatments on the spot and necrotic tissue with and without TPS (30 days after last application) is shown in FIGS. 9A-9B.

The effect of applying adjuvant on wet banana leaves is shown in FIGS. 10A-10G. FIG. 10A shows the effect of applying Banazeb®60SC alone (top left square), Banazeb®60SC plus Adjuvant (top right square), and Vondozeb® 62 SC (bottom square) to wet banana leaves. Detailed images of leaves treated with Banazeb®60SC plus Adjuvant (FIG. 10B) and Banazeb®60SC in the absence of Adjuvant (FIG. 10C) are also shown.

The effect of washing water on the application of Banazeb®60SC plus Adjuvant (FIG. 10D) and Banazeb®60SC in the absence of Adjuvant (FIG. 10E) is also shown. FIGS. 10F-10G show the effect of washing water on the use of Banazeb®60SC (FIG. 10F) and Banazeb®60SC plus Adjuvant (FIG. 10G) on sunburned banana leaves.

A representative mixture of oil with adjuvant is shown in FIG. 11A, while FIG. 11B shows a mixture of water with adjuvant.

The effect of applying an Adjuvant formulation to banana leaves is shown at 18 days following application in FIG. 12A and at 32 days following application in FIG. 12B.

The results of Example 8 show that there is no direct fungicidal effect of adjuvant on Sigatoka either pre- or post-infection. These results also indicate that the adjuvant does not mix well with crop oil. Therefore, an emulsifier is needed to ensure a homogenous mixture. The adjuvant has a strong "rainfastness" effect, as it does not readily wash off after it has dried. The adjuvant also improves the redistribution of active ingredients on wet leaves, which is especially effective for protectants. Treatment with adjuvant compositions maintained satisfactory control with 50% reductions in crop oil volumes. Thus, the adjuvant works better with low doses of oil. Field test application was under 626.2 mm rainfall, an extremely wet year. The adjuvant gave equivalent control with 30% reduction in rate of both systemic and contact fungicides.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed:

1. An adjuvant premix composition comprising:
   (i) 30 to 60 wt % of a thickener selected from the group consisting of a hydrophobically-modified ethoxylated urethane rheology (HEUR) polymer, a hydrophobically-modified alkali swellable emulsion (HASE) polymer, a hydrophobically-modified polyether (HMPE) polymer, a hydrophobically modified ethoxylated aminoplast (HEAT) polymer, and an alkali soluble emulsion (ASE) polymer;
   (ii) 0.5 to 5 wt % of a water soluble divalent salt, wherein the water soluble divalent salt comprises a divalent cation selected from the group consisting of barium, calcium, cobalt (II), copper (II), iron (II), magnesium, manganese (II), strontium, zinc (II), and mixtures thereof;
   (iii) 0.5 to 5 wt % of a foam control agent;
   (iv) 30 to 60 wt % of a metal ion complexing agent; and
   (v) 0.5 to 5 wt % of a film forming agent, wherein, after the adjuvant premix composition is applied with a plant treatment chemical formulation to surfaces of a plant seed or a growing plant and dries on the surfaces of the plant seed or the growing plant as a dried coating material, the dried coating material adheres to the surfaces of the plant seed or the growing plant and permits permeation of aqueous material to the plant seed or growing plant while minimizing loss of moisture or loss of the plant treatment chemical from the plant seed or the growing plant.

2. The adjuvant premix composition of claim 1, wherein the thickener is an associative thickener.

3. The adjuvant premix composition of claim 1, wherein the foam control agent is selected from the group consisting of alkyl poly acrylates, fatty acids, fatty alcohols, monoglycerides, diglycerides, triglycerides, a silicone-based foam control agent, and mixtures thereof.

4. The adjuvant premix composition of claim 3, wherein the foam control agent is a silicone-based foam control agent.

5. The adjuvant premix composition of claim 1, wherein the water soluble divalent salt is selected from the group consisting of zinc (II) acetate, zinc (II) bromide, zinc (II) chlorate, zinc (II) chloride, zinc (II) fluoride, zinc (II) formate, zinc (II) iodide, zinc (II) nitrate, zinc (II) sulfate monohydrate, zinc (II) sulfate heptahydrate, zinc (II) sulfate hexahydrate, zinc (II) sulfate anhydrous, and mixtures thereof.

6. The adjuvant premix composition of claim 1, wherein the water soluble divalent salt is a zinc sulfate.

7. The adjuvant premix composition of claim 1, wherein the metal ion complexing agent is selected from the group consisting of diethylenetriaminepentaacetic acid, ethylenedinitrilotetraacetic acid, nitrilotriacetic acid, diethanolamine, triethanolamine, and mixtures thereof.

8. The adjuvant premix composition of claim 7, wherein the metal ion complexing agent is triethanolamine.

9. The adjuvant premix composition of claim 1, wherein the film forming agent is selected from the group consisting of polyvinyl alcohol, polyvinyl acetate, and mixtures thereof.

10. The adjuvant premix composition of claim 1, wherein the film forming agent is polyvinyl alcohol having a molecular weight of 25,000 to 175,000.

11. The adjuvant premix composition of claim 1, wherein the composition comprises 45 to 55 wt % of the thickener; 1.8 to 2.8 wt % of the water soluble divalent salt; 1.8 to 2.8 wt % of the foam control agent; 45 to 55 wt % of the metal ion complexing agent; and 1.8 to 2.8 wt % of the film forming agent.

12. An adjuvant composition comprising:
the adjuvant premix composition of claim 1 and water.

13. The adjuvant composition of claim 12, wherein the thickener is an associative thickener.

14. The adjuvant composition of claim 12, wherein the foam control agent is selected from the group consisting of alkyl polyacrylates, fatty acids, fatty alcohols, monoglycerides, diglycerides, triglycerides, a silicone-based foam control agent, and mixtures thereof.

15. The adjuvant composition of claim 12, wherein the water soluble divalent salt is a zinc sulfate.

16. The adjuvant composition of claim 12, wherein the metal ion complexing agent is selected from the group consisting of diethylenetriaminepentaacetic acid, ethylenedinitrilotetraacetic acid, nitrilotriacetic acid, diethanolamine, triethanolamine, and mixtures thereof.

17. The adjuvant composition of claim 12, wherein the film forming agent is selected from the group consisting of polyvinyl alcohol, polyvinyl acetate, and mixtures thereof.

18. The adjuvant composition of claim 12, wherein the composition comprises 1.00 to 3.00 wt % of the thickener; 0.05 to 0.15 wt % of the water soluble divalent salt; 0.05 to 0.15 wt % of the foam control agent; 1.00 to 3.00 wt % of the metal ion complexing agent; 0.05 to 0.15 wt % of the film forming agent; and 90.00 to 99.00 wt % water.

19. A plant treatment chemical formulation comprising:
the adjuvant composition of claim 12 and one or more plant treatment chemicals.

20. The plant treatment chemical formulation of claim 19, wherein the thickener is an associative thickener.

21. The plant treatment chemical formulation of claim 19, wherein the foam control agent is selected from the group consisting of alkyl polyacrylates, fatty acids, fatty alcohols, monoglycerides, diglycerides, triglycerides, a silicone-based foam control agent, and mixtures thereof.

22. The plant treatment chemical formulation of claim 19, wherein the water soluble divalent salt is a zinc sulfate.

23. The plant treatment chemical formulation of claim 19, wherein the metal ion complexing agent is selected from the group consisting of diethylenetriaminepentaacetic acid, ethylenedinitrilotetraacetic acid, nitrilotriacetic acid, diethanolamine, triethanolamine, and mixtures thereof.

24. The plant treatment chemical formulation of claim 19, wherein the film forming agent is selected from the group consisting of polyvinyl alcohol, polyvinyl acetate, and mixtures thereof.

25. The plant treatment chemical formulation of claim 19, wherein the one or more plant treatment chemicals is selected from the group consisting of a pesticide, a fertilizer, and a growth regulating agent.

26. The plant treatment chemical formulation of claim 25, wherein the one or more plant treatment chemicals is a pesticide selected from the group consisting of a herbicide, an insecticide, a fungicide, a miticide, and a nematicide.

27. The plant treatment chemical formulation of claim 26, wherein the one or more plant treatment chemicals is a herbicide selected from the group consisting of acetyl-CoA carboxylase (ACCase) inhibitors; actolactate synthase (ALS) inhibitors; microtubule assembly (MT) inhibitors; growth regulators (GR); photosynthesis II, binding site A (PSII(A)) inhibitors; photosynthesis II, binding site B (PSII(B)) inhibitors; photosynthesis II, binding site C (PSII(C)) inhibitors; shoot (SHT) inhibitors; enolpyruvyl-shikimate-phosphate synthase (EPSP) inhibitors; glutamine synthase (GS) inhibitors; phytoene desaturase synthase (PDS) inhibitors; diterpene (DITERP) inhibitors; protoporphyrinogen oxidase (PPO) inhibitors; shoot and root (SHT/RT) inhibitors; photosystem 1 electron diverters (ED); hydroxyphenlypyruvate dioxygenase synthesis (HPPD) inhibitors; and combinations thereof.

28. The plant treatment chemical formulation of claim 26, wherein the one or more plant treatment chemicals is an insecticide selected from the group consisting of carbamates, organochlorines, nicotinoids, phosphoramidothioates, organophosphates, pyrethroids and combinations thereof.

29. The plant treatment chemical formulation of claim 26, wherein the one or more plant treatment chemicals is a fungicide selected from the group consisting of aliphatic nitrogens, benzimidazoles, dicarboximides, dithiocarbamates, imidazoles, strobins, anilides, aromatics, and combinations thereof.

30. The plant treatment chemical formulation of claim 26, wherein the one or more plant treatment chemicals is a miticide selected from the group consisting of carbamates, carbazates, diphenyl oxazolines, glycides, macrocylic compounds, METI-acaracides, napthoquinone derivatives, organochlorines, organophosphates, organotins, oils, pyrethroids, pyridazinone, pyrroles, soaps, sulfur, tetrazines, tetronic acids, and combinations thereof.

31. The plant treatment chemical formulation of claim 26, wherein the one or more plant treatment chemicals is a nematicide selected from the group consisting of carbamates, organophosphates, halogenated hydrocarbons, methyl isothiocyanate liberators, and combinations thereof.

32. The plant treatment chemical formulation of claim 25, wherein the one or more plant treatment chemicals is a fertilizer containing plant nutrients selected from the group consisting of sulfur, phosphorus, magnesium, calcium, potassium, nitrogen, molybdenum, copper, zinc, manganese, iron, boron, cobalt, chlorine, and combinations thereof.

33. The plant treatment chemical formulation of claim 25, wherein the one or more plant treatment chemicals is a growth regulating agent selected from the group consisting of auxins, cytokinins, defoliants, ethylene releasers, gibberellins, growth inhibitors, growth retardants, growth stimulators, and combinations thereof.

34. A method of treating plants or plant seeds, said method comprising:
 providing a plant seed or a growing plant and
 applying the plant treatment chemical formulation of claim 19 to the plant seed or the growing plant.

35. The method of claim 34, wherein the thickener is an associative thickener.

36. The method of claim 34, wherein the foam control agent is selected from the group consisting of alkyl polyacrylates, fatty acids, fatty alcohols, monoglycerides, diglycerides, triglycerides, a silicone-based foam control agent, and mixtures thereof.

37. The method of claim 34, wherein the water soluble divalent salt is a zinc sulfate.

38. The method of claim 34, wherein the metal ion complexing agent is selected from the group consisting of diethylenetriaminepentaacetic acid, ethylenedinitrilotetraacetic acid, nitrilotriacetic acid, diethanolamine, triethanolamine, and mixtures thereof.

39. The method of claim 34, wherein the film forming agent is selected from the group consisting of polyvinyl alcohol, polyvinyl acetate, and mixtures thereof.

40. The method of claim 34, wherein the one or more plant treatment chemicals is selected from the group consisting of a pesticide, a fertilizer, and a growth regulating agent.

41. The method of claim 34, wherein the one or more plant treatment chemicals is a pesticide selected from the group consisting of a herbicide, an insecticide, a fungicide, a miticide, and a nematicide.

42. The method of claim 41, wherein the one or more plant treatment chemicals is a herbicide selected from the group consisting of acetyl-CoA carboxylase (ACCase) inhibitors; actolactate synthase (ALS) inhibitors;
 microtubule assembly (MT) inhibitors; growth regulators (GR); photosynthesis II, binding site A (PSII(A)) inhibitors; photosynthesis II, binding site B (PSII(B)) inhibitors;
 photosynthesis II, binding site C (PSII(C)) inhibitors; shoot (SHT) inhibitors; enolpyruvyl-shikimate-phosphate synthase (EPSP) inhibitors; glutamine synthase (GS) inhibitors;
 phytoene desaturase synthase (PDS) inhibitors; diterpene (DITERP) inhibitors;
 protoporphyrinogen oxidase (PPO) inhibitors; shoot and root (SHT/RT) inhibitors;
 photosystem 1 electron diverters (ED); hydroxyphenlypyruvate dioxygenase synthesis (HPPD) inhibitors; and combinations thereof.

43. The method of claim 41, wherein the one or more plant treatment chemicals is an insecticide selected from the group consisting of carbamates, organochlorines, nicotinoids, phosphoramidothioates, organophosphates, pyrethroids and combinations thereof.

44. The method of claim 41, wherein the one or more plant treatment chemicals is a fungicide selected from the group consisting of aliphatic nitrogens, benzimidazoles, dicarboximides, dithiocarbamates, imidazoles, strobins, anilides, aromatics, and combinations thereof.

45. The method of claim 41, wherein the one or more plant treatment chemicals is a miticide selected from the group consisting of carbamates, carbazates, diphenyl oxazolines, glycides, macrocylic compounds, METI-acaracides, napthoquinone derivatives, organochlorines, organophosphates, organotins, oils, pyrethroids, pyridazinone, pyrroles, soaps, sulfur, tetrazines, tetronic acids, and combinations thereof.

46. The method of claim 41, wherein the one or more plant treatment chemicals is a nematicide selected from the group consisting of carbamates, organophosphates, halogenated hydrocarbons, methyl isothiocyanate liberators, and combinations thereof.

47. The method of claim 40, wherein the one or more plant treatment chemicals is a fertilizer containing plant nutrients selected from the group consisting of sulfur, phosphorus, magnesium, calcium, potassium, nitrogen, molybdenum, copper, zinc, manganese, iron, boron, cobalt, chlorine, and combinations thereof.

48. The method of claim 40, wherein the one or more plant treatment chemicals is a growth regulating agent selected from the group consisting of auxins, cytokinins, defoliants, ethylene releasers, gibberellins, growth inhibitors, growth retardants, growth stimulators, and combinations thereof.

49. The method of claim 40, wherein the growing plant is treated.

50. The method of claim 34, wherein the plant seed is treated prior to being planted in a growth medium.

51. The method of claim 34, wherein the growing plant or plant seed is selected from the group consisting of canola, alfalfa, rice, wheat, barley, rye, cotton, sunflower, peanut, corn, potato, sweet potato, bean, pea, chicory, lettuce, endive, cabbage, brussel sprout, beet, parsnip, cauliflower, broccoli, turnip, radish, spinach, onion, garlic, eggplant, pepper, celery, carrot, squash, pumpkin, zucchini, cucumber, apple, pear, melon, citrus, strawberry, grape, raspberry, pineapple, soybean, tobacco, tomato, sorghum, sugarcane, Arabidopsis thaliana, Saintpaulia, petunia, pelargonium, poinsettia, chrysanthemum, carnation, and zinnia.

* * * * *